United States Patent
Alshina et al.

(10) Patent No.: US 12,477,131 B2
(45) Date of Patent: Nov. 18, 2025

(54) METHOD AND APPARATUS FOR ENCODING OR DECODING A PICTURE USING A NEURAL NETWORK

(71) Applicant: HUAWEI TECHNOLOGIES CO., LTD., Shenzhen (CN)

(72) Inventors: Elena Alexandrovna Alshina, Munich (DE); Han Gao, Shenzhen (CN); Semih Esenlik, Munich (DE)

(73) Assignee: Huawei Technologies Co., Ltd, Shenzhen (CN)

( * ) Notice: Subject to any disclaimer, the term of this patent is extended or adjusted under 35 U.S.C. 154(b) by 88 days.

(21) Appl. No.: 18/338,092

(22) Filed: Jun. 20, 2023

(65) Prior Publication Data

US 2024/0015314 A1 Jan. 11, 2024

Related U.S. Application Data

(63) Continuation of application No. PCT/EP2020/087333, filed on Dec. 18, 2020.

(51) Int. Cl.
*H04N 19/30* (2014.01)
*H04N 19/42* (2014.01)

(52) U.S. Cl.
CPC ............. *H04N 19/30* (2014.11); *H04N 19/42* (2014.11)

(58) Field of Classification Search
None
See application file for complete search history.

(56) References Cited

U.S. PATENT DOCUMENTS

| | | | |
|---|---|---|---|
| 5,781,136 A | 7/1998 | Imanaka et al. | |
| 8,634,474 B2 | 1/2014 | Matsuba et al. | |
| 9,729,169 B2 | 8/2017 | Kalevo et al. | |
| 9,892,188 B2 | 2/2018 | Sullivan et al. | |
| 10,205,965 B2 | 2/2019 | Hannuksela | |
| 10,944,914 B1* | 3/2021 | Le | H04N 25/58 |
| 10,986,356 B2 | 4/2021 | Kim et al. | |
| 11,475,542 B2* | 10/2022 | Munkberg | G06T 5/70 |
| 12,190,231 B2* | 1/2025 | Choi | G06N 3/08 |

(Continued)

FOREIGN PATENT DOCUMENTS

| | | |
|---|---|---|
| CN | 109672885 A | 4/2019 |
| JP | 2019531036 A | 10/2019 |

(Continued)

OTHER PUBLICATIONS

Guo et al., "3-D Context Entropy Model for Improved Practical Image Compression," arXiv:2004.08273v1 [eess.IV], XP033798962, Total 4 pages (Apr. 17, 2020).

(Continued)

*Primary Examiner* — Stefan Gadomski
(74) *Attorney, Agent, or Firm* — Leydig, Voit & Mayer, Ltd.

(57) ABSTRACT

Disclosed herein are methods and systems for encoding a picture and decoding a bitstream that may represent an encoded picture. During encoding and decoding, rescaling operations are applied to rescale an input to a size that can be processed by a layer of a neural network. Embodiments disclosed herein provide methods for rescaling that achieve a reduced size of the bitstream, thereby improving compression.

18 Claims, 24 Drawing Sheets

(56) References Cited

U.S. PATENT DOCUMENTS

| | | | |
|---|---|---|---|
| 2016/0104056 A1* | 4/2016 | He | G06N 3/04 |
| | | | 382/158 |
| 2018/0107926 A1* | 4/2018 | Choi | G06N 3/047 |
| 2019/0132591 A1* | 5/2019 | Zhang | H04N 19/59 |
| 2019/0230349 A1 | 7/2019 | Mao | |
| 2019/0387209 A1* | 12/2019 | Yang | G06F 18/214 |
| 2020/0162751 A1* | 5/2020 | Kim | H04N 19/14 |
| 2020/0218948 A1* | 7/2020 | Mao | G06V 30/274 |
| 2021/0344967 A1 | 11/2021 | Kudo et al. | |
| 2022/0076411 A1* | 3/2022 | Georgescu | G06V 10/82 |
| 2022/0174328 A1* | 6/2022 | Toderici | G06N 3/088 |
| 2022/0180476 A1* | 6/2022 | Poddar | G06V 10/48 |
| 2022/0249031 A1* | 8/2022 | Clifton | A61B 5/7264 |

FOREIGN PATENT DOCUMENTS

| | | | |
|---|---|---|---|
| WO | 2016054779 A1 | 4/2016 | |
| WO | 2018120013 A1 | 7/2018 | |
| WO | 2020059581 A1 | 3/2020 | |
| WO | 2020146547 A1 | 7/2020 | |

OTHER PUBLICATIONS

Hashemi, "Enlarging smaller images before inputting into convolutional neural network: zero-padding vs. interpolation," Journal of Big Data, vol. 6, No. 98, pp. 1-13, XP55725533 (Nov. 14, 2019).

Chen et al., "An Overview of Core Coding Tools in the AV1 Video Codec," 2018 Picture Coding Symposium (PCS), pp. 41-45, Institute of Electrical and Electronics Engineers, New York, New York (Jun. 2018).

Tousi, "Deep Fully Residual Convolutional Neural Network for Semantic Image Segmentation," Department of Computer Science and Engineering, Graduate School of UNIST, Total 54 pages (Issue Date: Aug. 2018).

Cui et al., "G-VAE: a Continuously Variable Rate Deep Image Compression," arXiv:2003.02012v2 [eess. IV], Total 8 pages (Apr. 22, 2020).

Sze et al. (eds.), "High Efficiency Video Coding (HEVC): Algorithms and Architectures," Integrated Circuits and Systems, Total 384 pages, Springer International Publishing Switzerland (eBook Published: Aug. 2014).

"Image resizing and padding for CNN," Data Science Stack Exchange, Total 2 pages (Practicable advise: Apr. 25, 2018).

Bross et al., "Versatile Video Coding (Draft 7)," Joint Video Experts Team (JVET) of ITU-T SG 16 WP 3 and ISO/IEC JTC 1/SC 29/WG 11, 16th Meeting: Geneva, CH, Document: JVET-P2001-vE, Total 489 pages (Oct. 1-11, 2019).

Fernandez Afonso, "Intelligent Resampling Methods for Video Compression," A dissertation submitted to the University of Bristol in accordance with the requirements for award of the degree of Doctor of Philosophy in the Faculty of Engineering, Total 194 pages (May 2019).

Hassaballah et al., "Recent Advances in Computer Vision, Theories and Applications," Studies in Computational Intelligence 804, Total 430 pages, Springer (Jan. 2019).

Balle et al., "Variational Image Compression With a Scale Hyperprior," arXiv:1802.01436v2 [eess.IV], Total 23 pages (May 1, 2018).

Kirchhoffe et al., "[NNR] HLS for parallel CABAC decoding including parameter optimizations," International Organisation for Standardisation Organisation Internationale de Normalisation ISO/IEC JTC1/SC29/WG 4 Coding of Moving Pictures and Audio, ISO/IEC JTC1/SC29/WG 4 m55066, Total 5 pages (Online—Oct. 2020).

"Test Model of Essential Video Coding (ETM 4.0)," International Organisation for Standardisation Organisation Internationale de Normalisation ISO/IEC JTC 1/SC 29/WG 11 Coding of Moving Pictures and Audio, ISO/IEC JTC 1/SC 29/WG 11 N18775, Geneva, CH, Total 24 pages (Oct. 2019).

* cited by examiner

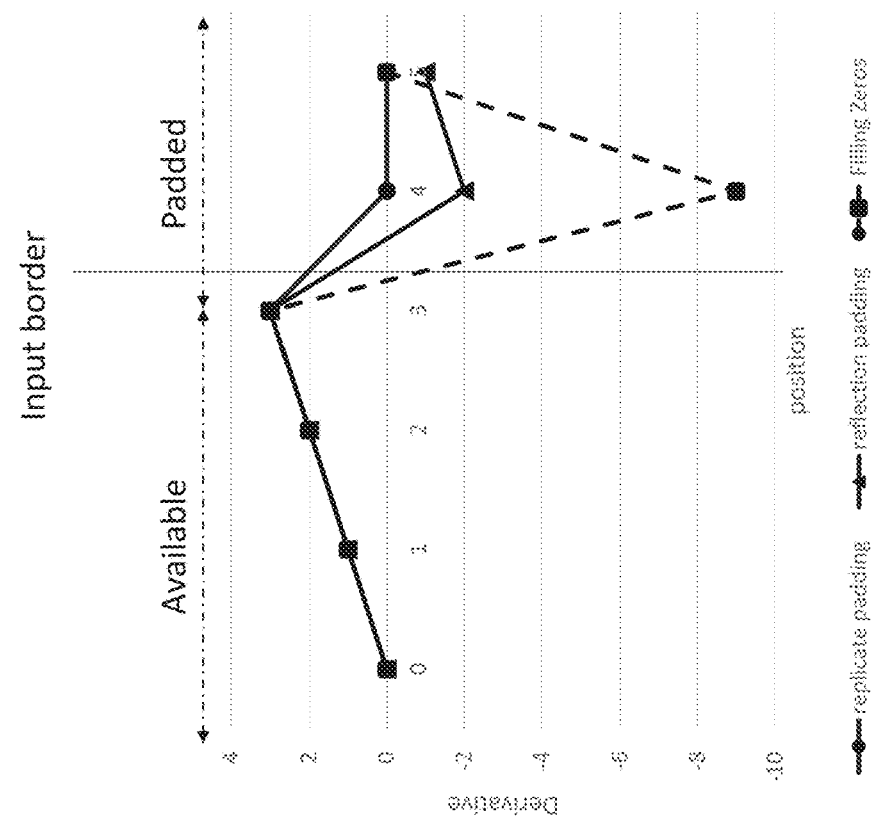
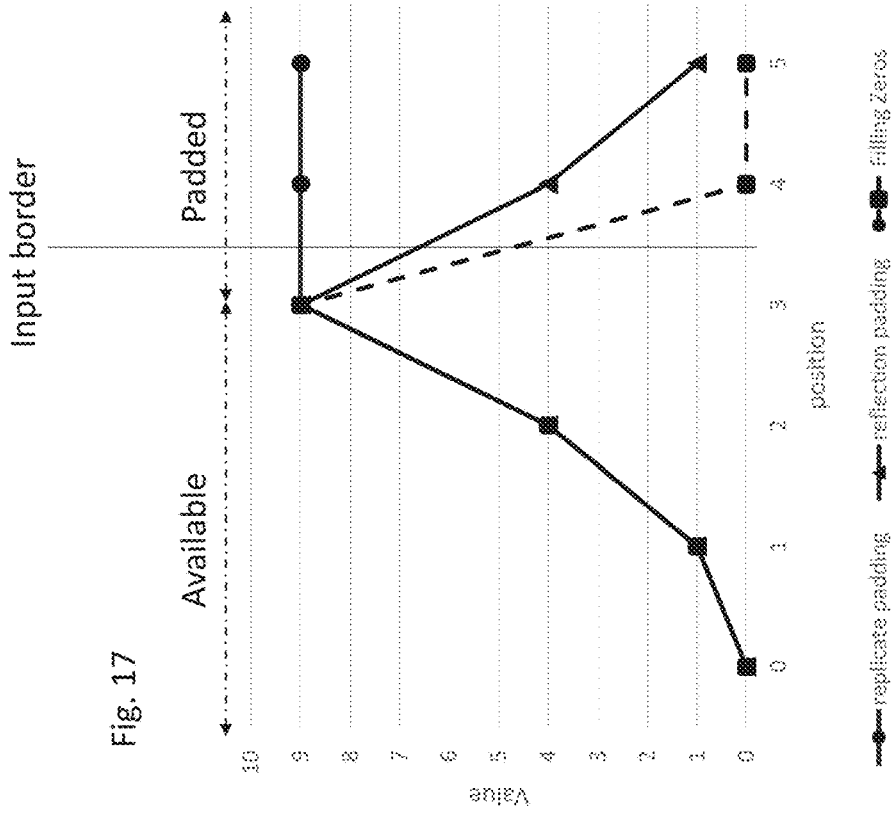
Fig. 17

METHOD AND APPARATUS FOR ENCODING OR DECODING A PICTURE USING A NEURAL NETWORK

CROSS-REFERENCE TO RELATED APPLICATIONS

This application is a continuation of International Application No. PCT/EP2020/087333, filed on Dec. 18, 2020, the disclosure of which is hereby incorporated by reference in its entirety.

FIELD

The present disclosure relates to a method for encoding a picture using a neural network and a method for decoding a picture using a neural network. The disclosure further refers to an encoder for encoding a picture and a decoder for decoding a picture as well as a computer readable storage medium.

BACKGROUND

Video coding (video encoding and decoding) is used in a wide range of digital video applications, for example broadcast digital TV, video transmission over internet and mobile networks, real-time conversational applications such as video chat, video conferencing, DVD and Blu-ray discs, video content acquisition and editing systems, and camcorders of security applications.

The amount of video data needed to depict even a relatively short video can be substantial, which may result in difficulties when the data is to be streamed or otherwise communicated across a communications network with limited bandwidth capacity. Thus, video data is generally compressed before being communicated across modern day telecommunications networks. The size of a video could also be an issue when the video is stored on a storage device because memory resources may be limited. Video compression devices often use software and/or hardware at the source to code the video data prior to transmission or storage, thereby decreasing the quantity of data needed to represent digital video images. The compressed data is then received at the destination by a video decompression device that decodes the video data. With limited network resources and ever increasing demands of higher video quality, improved compression and decompression techniques that improve compression ratio with little to no sacrifice in picture quality are desirable.

Neural networks and deep-learning techniques making use of neural networks have now been used for some time, also in the technical field of encoding and decoding of videos, images and the like.

In such cases, the bitstream usually represents or is data that can reasonably be represented by a two-dimensional matrix of values. For example, this holds for bitstreams that represent or are images, video sequences or the like data. Apart from 2D data, the neural network and the framework referred to in the present disclosure may be applied to further source signals such as audio signals, which are typically represented as a 1D signal, or other signals.

For example, neural networks comprising a plurality of downsampling layers may apply a downsampling (convolution, in the case of the downsampling layer being a convolution layer) to an input to be encoded, like a picture. By applying this downsampling to the input picture, its size is reduced and this can be repeated until a final size is obtained. Such neural networks can be used for both, image recognition with deep-learning neural networks and encoding of pictures. Correspondingly, such networks can be used to decode an encoded picture. Other source signals such as signals with less or more than two dimensions may be also processed by similar networks.

It may be desirable to provide a neural network framework which may be efficiently applied to various different signals possibly differing in size.

SUMMARY

Embodiments of the disclosure may allow reducing the size of a bitstream that carries information while still ensuring that the original information can be reconstructed with least loss of information as possible.

A method for encoding a picture is provided, using a neural network (NN), wherein the NN comprises a plurality of layers comprising at least one downsampling layer that applies a downsampling to an input representing a matrix having a size S in at least one dimension, the method comprising, applying, before processing the input with the at least one downsampling layer, a rescaling to the input, wherein the rescaling comprises changing the size S in the at least one dimension so that $\overline{S}=n \cdot r$, with $n \in \mathbb{N}$ and $r>1$, $r \in \mathbb{N}$, where r is the downsampling ratio of the layer; after the rescaling, processing the input by the downsampling layer and providing an output with the size $S_1<S$; providing, after processing the picture using the NN (e.g. after processing the picture with each layer of the NN), a bitstream as output of the NN.

In the context of the present disclosure, the picture may be understood as a still picture or a moving picture in the sense of a video or a video sequence. Furthermore, a picture in the present disclosure may also pertain to only a section of a bigger (total) picture. Furthermore, the picture may also be referred to as image or a frame. In any case, a picture may be considered to be or be representable by a two- or more dimensional array of values (typically referred to as samples) in the form of a matrix, which can then be processed by the neural network and specifically by the downsampling layer in the manner as explained above.

The bitstream according to this disclosure may be or may comprise the encoded picture. The bitstream can comprise additional information (side information) that, for example, pertains to information necessary for decoding the bitstream to reconstruct the picture.

In this context, the bitstream may have a size that, when seen in the representation of the bitstream as a matrix, is smaller than the size of the picture originally input in at least one dimension. The term size here refers to, e.g. number of samples in one or more dimensions (such as width and height). The size may also represent resolution which is typically characterized by number of samples per picture or picture area.

It is noted that the disclosure is not limited to the case when all of the dimensions of the input picture are reduced at the output of the encoder. For example, the input picture may be reduced in size in only one of its dimensions.

Further, the bitstream might have a third dimension, for example, wherein the third dimension might have a bigger size than the corresponding dimension of the input picture. The third dimension might represent the number of feature maps which may be also referred to as channels. In one specific example, the size of the third dimension might be 3 at the input (picture) and 192 at the output (bitstream). The size of feature maps is typically increased by the encoder in order to classify the input more efficiently according to their importance.

The downsampling may be achieved in any known or technically reasonable way. It may, for example, comprise a downsampling by applying a convolution to the input of the respective downsampling layer. In that context, the downsampling layer may specifically be implemented as a convolution layer that applies a convolution to an input.

The downsampling may be performed in only one dimension of the input picture when represented in the form of a matrix. It can also be applied to more than one or all dimensions of the matrix. However, the present disclosure is not limited to any particular downsampling. One or more of the processing layers may apply downsampling other than convolution, e.g. by deleting (removing) every second, third, or the like row and/or column of the input picture or input feature map.

Embodiments of the disclosure provided herein are to be understood so that the rescaling is applied immediately before the processing of the input by the respective downsampling layer. If there are more than one downsampling layer in the neural network, a rescaling will be applied before each of the respective downsampling layers but after the processing of the input by the previous layer. The rescaling will thus depend on the downsampling ratio of the respective downsampling layer in line with the above.

It is noted that the rescaling is, in some embodiments, only applied to the input if a preceding determination shows that this rescaling is necessary. Before applying a rescaling operation to an input, it can be checked whether the rescaling is to be applied. For example, it can be checked whether S=n·r. In that case, it can then be determined that a rescaling is not necessary, because the input to the downsampling layer already has a size that is a multiple integer of the downsampling ratio.

By applying the rescaling on a per-layer-basis, the rescaling is performed so that as few as possible modifications are applied to the input as possible. Thereby, the reduction in quality and/or an increase in the size of the input can be kept as low as possible.

In one embodiment, the NN comprises a number of $M \in \mathbb{N}$ downsampling layers, wherein each downsampling layer m, m≤M, m∈ $\mathbb{N}$ has an associated downsampling ratio $r_m$>1, $r_m \in \mathbb{N}$ and the method further comprises: before processing an input representing a matrix having a size $S_m$ in at least one dimension with a downsampling layer m, applying, if the size $S_{is}$ not an integer multiple of the downsampling ratio $r_m$ of the downsampling layer m, a rescaling to the input, wherein the rescaling comprises changing the size $S_m$ in the at least one dimension so that $\overline{S_m}$=n·$r_m$, n∈ $\mathbb{N}$. More specifically, the rescaling applied to an input of a downsampling layer m may be independent from the downsampling ratios $r_k$, k≠m of other downsampling layers.

In a further embodiment, the input to a downsampling layer m has a size $S_m$ in the at least one dimension that has a value that is not an integer multiple of the downsampling ratio $r_m$ of the downsampling layer m, wherein the size $S_m$ of the input is changed during the rescaling to either match the closest smaller integer multiple of the downsampling ratio $r_m$ or to match the closest larger integer multiple of the downsampling ratio $r_m$.

With this embodiment, it is specified that the rescaling depending on a downsampling ratio of an immediately proceeding (or subsequent or consecutive, which will be used interchangeably here) downsampling layer is performed before this specific downsampling layer only. This may ensure that the size of the encoded bitstream is reduced to a minimum even in cases where the rescaling comprises an increasing of the size of the input.

As for the above embodiment, it can be provided that, before applying a rescaling to an input to a downsampling layer, it is (explicitly or implicitly) determined or checked whether the rescaling is necessary. It can be provided that, if it is determined that a rescaling is not necessary (for example because the size of the input is already an integer multiple of the respective downsampling ratio), no rescaling is applied.

In one embodiment, it is provided that, before applying the rescaling to the input with the size $S_m$, a determination is made whether $S_m$ is an integer multiple of the downsampling ratio $r_m$ and, if it is determined that $S_m$ is not an integer multiple of the downsampling ratio $r_m$, the rescaling is applied to the input so that the size $S_m$ is changed in the at least one dimension so that $\overline{S_m}$=n·$r_m$, n∈ $\mathbb{N}$. This determination can be an explicit determination in the sense of an additional step in the method or this determination can be part of an otherwise performed calculation and, therefore, an implicit determination. It is not necessary that a result (in the sense of a number indicating a difference between the size $S_m$ and the integer multiple) is actually obtained by this determination.

Applying such a determination before performing a rescaling can reduce the computational complexity of the encoding as not necessary rescalings can be avoided.

In one embodiment, it is provided that, if the size $S_m$ of the input is an integer multiple of the downsampling ratio $r_m$ of the downsampling layer m, no rescaling to a size $\overline{S_m} \neq S_m$ is applied to the input before processing the input by the downsampling layer m. This embodiment does not exclude that a rescaling step would be applied that does not change the size $S_m$. For example, if the size $S_m$=n·$r_m$, the "rescaled" size would be $\overline{S_m}$, if the rescaling comprises increasing the size $S_m$ based on $$\overline{S_m} = \text{ceil}\left(\frac{S_m}{r_m}\right) r_m$$

because, here, $S_m = \overline{S_m}$. While the rescaling could thus be performed as some default step in this embodiment, the rescaling would not result in a change in the size $S_m$ of the input. By preventing a rescaling to a size $\overline{S_m} \neq S_m$ in case $S_m$ is already an integer multiple of the downsampling ratio, loss of information due to an unnecessary decrease in size or adding of redundant or irrelevant information due to an unnecessary increase in size are avoided.

In a further embodiment, the determination whether $S_m$ is an integer multiple of the downsampling ratio $r_m$ comprises comparing the size $S_m$ to an allowed input size of the downsampling layer m. The allowed input size may be predefined or it may be any size as long as this size is an integer multiple of the downsampling ratio. Specifically, the allowed input size may depend on the size $S_m$ or may, in case it is not predefined, be determined (dynamically) using $S_m$.

In one embodiment, the allowed input size of the downsampling layer m is calculated based on at least one of the downsampling ratio $r_m$ and the size $S_m$.

With this, the determination is specific to the respective downsampling layer and/or its input, thereby making the determination of the potentially necessary rescaling reliable and specifically suited for neural networks with downsampling layers having varying downsampling ratios.

More specifically, the comparing may comprise calculating a difference between $S_m$ and the allowed input size of the downsampling layer m.

In one embodiment, the comparing comprises determining $$\operatorname{ceil}\left(\frac{S_m}{r_m}\right) \cdot r_m - S_m \text{ or floor}\left(\frac{S_m}{r_m}\right) \cdot r_m - S_m.$$

In this context, $$\operatorname{ceil}\left(\frac{S_m}{r_m}\right) \cdot r_m \text{ and floor}\left(\frac{S_m}{r_m}\right)$$

may be considered as "allowed input size" as referred to above.

In a more specific embodiment, $$\operatorname{ceil}\left(\frac{S_m}{r_m}\right) \cdot r_m - S_m$$

is determined and, if $$\operatorname{ceil}\left(\frac{S_m}{r_m}\right) \cdot r_m - S_m \neq 0,$$

the rescaling is applied to the input with the size $S_m$.

Alternatively or additionally, $$\operatorname{floor}\left(\frac{S_m}{r_m}\right) \cdot r_m - S_m$$

may be determined and, if $$\operatorname{floor}\left(\frac{S_m}{r_m}\right) \cdot r_m - S_m \neq 0,$$

the rescaling is applied to the input with the size $S_m$. By making the determination in line with the above equations, it is also possible to, at the same time, obtain the necessary amount that needs to be added to $S_m$ or removed from $S_m$ during the rescaling, $$\operatorname{ceil}\left(\frac{S_m}{r_m}\right) \cdot r_m \text{ or floor}\left(\frac{S_m}{r_m}\right)$$

if constitute the allowed input size and are used as $\overline{S_m}$. This provides a reliable way of obtaining the rescaling and can further provide a rescaling that changes the input size $S_m$ as little as possible.

In a further embodiment, the size $\overline{S_m}$ is determined using at least one of the downsampling ratio $r_m$ and the size $S_m$.

Specifically, the size $\overline{S_m}$ can be determined using a function comprising at least one of ceil, int, floor.

More specifically, the size $\overline{S_m}$ may be determined in one of the following ways:

the size $\overline{S_m}$ is determined using $$\operatorname{floor}\left(\frac{S_m}{r_m}\right) \cdot r_m = \overline{S_m};$$

or the size $\overline{S_m}$ is determined using $$\operatorname{ceil}\left(\frac{S_m}{r_m}\right) \cdot r_m = \overline{S_m};$$

or the size $\overline{S_m}$ is determined using $$\operatorname{int}\left(\frac{S_m}{r_m}\right) \cdot r_m = \overline{S_m}.$$

Using these ways to calculate $\overline{S_m}$ results in as little as possible changes to the input with the size $S_m$ as the closest smaller integer multiple of the downsampling ratio or the closest larger integer multiple of the downsampling ratio constitutes the size $\overline{S_m}$. Thereby, as few as possible redundant information is added to the input during the rescaling (for example if the rescaling is done by padding the input to increase its size) or as few as possible relevant information is removed (for example by cropping the input to decrease its size) during the rescaling.

In one embodiment, the input to a downsampling layer m has a size $S_m$ in the at least one dimension that has a value that is between a closest smaller integer multiple of the downsampling ratio $r_m$ of the downsampling layer m and a closest larger integer multiple of the downsampling ratio $r_m$ of the downsampling layer m and wherein, depending on a condition, the size $S_m$ of the input is changed during the rescaling to either match the closest smaller integer multiple of the downsampling ratio $r_m$ or to match the closest larger integer multiple of the downsampling ratio $r_m$. The condition can be any appropriate condition and may comprise, for example, avoiding removal of information from the input or adding as few as possible redundant or meaningless information to the input as possible. By basing the decision whether to increase the size or decrease the size of the input during the rescaling on such a condition, not only mathematical but potentially also computational constraints or requirements can be met. Further, with this it is possible to ensure that the quality of the encoding meets given requirements, for example with respect to the achievable quality during a decoding of the encoded picture.

In one embodiment, the input to a downsampling layer m has a size S m in the at least one dimension, wherein $lr_m \leq S_m \leq r_m(l+1), l, m \in \mathbb{N}$ and $r_m$ is the downsampling ratio of the downsampling layer m and wherein the size $S_m$ is either rescaled to $\overline{S_m} = lr_m$ or to $\overline{S_m} = r_m(l+1)$ depending on a condition. Preferably, l is a small natural number so that l and l+1 refer to the "nearest" integer multiples of the downsampling ratio with respect to the size S.

As the computational efficiency of the rescaling may depend on whether the original input is increased in size or reduced in size, either of these rescaled sizes may have advantages. Specifically, reducing the size to $lr_m$ could result in a loss of information though the encoded bitstream will be smaller in the end. Increasing the size to $r_m(l+1)$ results in more entropy being provided to the input and an increased size of the encoded picture with less significant information. However, at least no information is lost and it is therefore possible to decode the encoded picture at high quality.

In one embodiment, if the size $S_m$ of the input is closer to the closest smaller integer multiple of the downsampling ratio $r_m$ of the downsampling layer m than to the closest larger integer multiple of the downsampling ratio $r_m$, the size $S_m$ of the input is reduced to a size $\overline{S_m}$ that matches the closest smaller integer multiple of the downsampling ratio $r_m$. Thereby, only few information is removed from the input while adding a comparably large amount of redundant or useless information is avoided.

In one embodiment, reducing the size $S_m$ of the input to the size $\overline{S_m}$ comprises cropping the input. This results in a removal of information but can be implemented efficiently in encoding methods. Further, it may be that borders of the input do not provide highly relevant information of the picture and can thus be removed without significant quality losses during a reconstruction of the picture.

In a further embodiment it is provided that, if the size $S_m$ of the input is closer to the closest larger integer multiple of the downsampling ratio $r_m$ of the downsampling layer m than to the closest smaller integer multiple of the downsampling ratio $r_m$, the size $S_m$ of the input is increased to a size $\overline{S_m}$ that matches the closest larger integer multiple of the downsampling ratio $r_m$. With this, the amount of redundant or useless information can be kept small and no information of the input is lost.

Specifically, increasing the size $S_m$ of the input to the size $\overline{S_m}$ may comprise padding the input with the size $S_m$ with zeros or with padding information obtained from the input with the size $S_m$. Both ways of padding can be implemented computationally efficient.

In a more specific embodiment, the padding information obtained from the input with the size $S_m$ is applied as redundant padding information to increase the size $S_m$ of the input to the size $\overline{S_m}$.

More specifically, the padding with redundant padding information can comprise at least one of reflection padding and repetition padding. With these methods of padding, information already part of the input can be used, reducing distortions at the border of the picture when reconstructing it.

In one embodiment, the padding information is or comprises at least one value of the input with the size $S_m$ that is closest to a region in the input to which the redundant padding information is to be added.

In one embodiment, the size $S_m$ of the input to the downsampling layer m is increased to a size $\overline{S_m}$ that matches the closest larger integer multiple of the downsampling ratio $r_m$. This can be provided as a default option, meaning that irrespective of whether the size $S_m$ of the input is closer to the smaller integer multiple of the downsampling ratio of the layer m than to the closest larger integer multiple of the downsampling ratio $r_m$, the size $S_m$ is increased by, for example, using padding as in the above embodiments. Thereby, loss of information contained in the input is avoided.

In one embodiment, the condition makes use of Min(|S−$lr_m$|,|$r_m$(l+1)|) and wherein the condition comprises, if Min throws or selects |$S_m$−$lr_m$|, then the size $S_m$ of the input is reduced to $\overline{S_m}=lr_m$ and, if Min throws or selects |$S_m$−(l+1) $r_m$|, then the size $S_m$ of the input is increased to $\overline{S_m}=(l+1)r_m$. By using this condition, it is ensured that the computationally more efficient rescaling is applied.

Specifically, l may be determined using at least one of the size $S_m$ of the input to the downsampling layer m and the downsampling ratio $r_m$ of the downsampling layer m.

In one specific embodiment, l is determined by $$l = \text{floor}\left(\frac{s_m}{r_m}\right)$$

and/or wherein l+1 is determined by $$l + 1 = \text{ceil}\left(\frac{s_m}{r_m}\right).$$

This allows obtaining the above values in a computationally efficient manner. As can be seen from the above embodiments, l is not necessarily explicitly obtained in the form of an output of some calculation but can directly be used during the calculation of $\overline{S_m}$.

In another specific realization of this, the condition is selecting of an $\overline{S}$ from a set of values {$kr_m$} in order to minimize |$\overline{S}$−S| wherein k is a positive integer and S is the size of the input before rescaling. By using this condition, it may be ensured that the computationally more efficient rescaling is applied.

In one embodiment, at least one of the downsampling layers applies a downsampling to the input in the two dimensions and the downsampling ratio in the first dimension is equal to the downsampling ratio in the second dimension. This embodiment realizes a significant reduction of the size of the picture. The size of a picture is, for example, defined by its width and height, for example, by the number of samples in width and height direction.

In a further embodiment, the downsampling ratios of all downsampling layers are equal. In case the downsampling ratios of all downsampling ratios are equal, it is computationally easier to determine the rescaling that is necessary.

According to the method for decoding a bitstream representing a picture using a neural network (NN) in line with one embodiment, the NN comprises a plurality of layers comprising at least two upsampling layers that apply an upsampling to an input representing a matrix having a size T in at least one dimension, the method comprising processing the input by the first upsampling layer and providing an output of the first upsampling layer, wherein the output has a size $\overline{T_1}=T\cdot u_1$, $u_1>1$, $u_1\in \mathbb{N}$, wherein $u_1$ is the upsampling ratio of the first upsampling layer; applying, before processing the output of the first upsampling layer by the second upsampling layer, a rescaling to the output of the first upsampling layer, wherein the rescaling comprises changing the size $\overline{T_1}$ of the output in the at least one dimension to a size $\hat{T_1}$ in the at least one dimension based on information obtained; processing the rescaled (resized) output by the second upsampling layer and providing an output of the second upsampling layer, wherein or such that the output has a size $\overline{T_2}=\hat{T_1}\cdot u_2$, $u_2>1$, $u_2\in \mathbb{N}$ in the at least one dimension, wherein $u_2$ is the upsampling ratio of the second upsampling layer; providing, after processing the bitstream using the NN (e.g. after processing the bitstream with each layer of the NN), a decoded picture as output of the NN.

The decoded picture may also be referred to as a reconstructed picture, as the picture that was decoded is reconstructed with this method of decoding the bitstream. The decoded picture may be presented or representable in the form of a matrix and in that sense may have a width W and a height H.

Furthermore, the size $\bar{T}_1$ may be referred to as a target output size of the output of the first upsampling layer and/or a target input size for the second upsampling layer.

The obtained information can comprise, for example, information pertaining to the target output size of the decoded bitstream or a matrix it represents. This information can be information that assists in or is necessary for performing the decoding at the decoder. Also other information, like a specific size required for the output $\bar{T}_2$ may be part of or the obtained information. The present disclosure is further not limited to a specific way of how the information is obtained. For example, the information may already be available to the decoder or it may be provided to the decoder with the encoded bitstream or an additional bitstream. Also combinations thereof are possible.

Like for the encoding, the bitstream may be provided in any reasonable form. With this method, it is possible to decode a bitstream in order to reconstruct information that is encoded in the bitstream from a bitstream that has reduced size.

It can be provided that the upsampling layer comprises a transposed convolution (deconvolution) layer.

The transposed convolution may also be referred to as a "deconvolution". This is the inverted operation compared to the convolution that could be applied by an encoder and comprises a discrete expansion of the input in order to obtain the decoded bitstream at the end.

In one embodiment, the information comprises at least one of a target size of a matrix represented by the bitstream, a height H of a matrix represented by the bitstream, a width W of a matrix represented by the bitstream, the upsampling ratio $u_1$, the upsampling ratio $u_2$, a target output size $\bar{T}_2$ of the second upsampling layer, the size $\hat{T}_1$. This information can be necessary in order to reliably obtain a decoded bitstream with a given target size.

In a further embodiment, the information is obtained from at least one of: the bitstream, a second bitstream, information available at the decoder. The information can already be known to the decoder and therefore be available at the decoder as far as it, for example, pertains to the upscaling ratios. Further information like the target size could also be available to the decoder already. However, the size of intermediate steps, for example, might not be known to the decoder and may therefore be provided by the bitstream itself or in a separate bitstream, as it may depend on specifics of the decoding. This specifically pertains or may be specifically advantageous in cases where the decoder is implemented as the "inverse" of the encoder also with respect to the used upsampling and downsampling layers. With this, the amount of information that is necessary for the decoder can be provided and can be computationally efficient while, at the same time, reducing or keeping the size of the bitstream at a minimum.

It can also be envisaged that the rescaling for changing the size $\bar{T}_1$ in the at least one dimension to a size $\hat{T}_1$ is determined based on a formula depending on $\bar{T}_2$ and $u_2$, wherein $\bar{T}_2$ is a target output size of the output of the second upsampling layer and $u_2$ is the upsampling ratio of the second upsampling layer.

As the upsampling ratio $u_2$, is fixed but the size of the input to this second upsampling layer depends on the rescaling, also the output size after the upsampling depends on the rescaling actually applied. In turn, if the target size of the output is fixed (for example due to requirements for input in the subsequent layer), these conditions can be used to determine the rescaling. Thereby, information that is usually available to the decoder itself (specifically the final target size) can be used for determining the necessary rescaling which can further reduce the amount of information that has to be included in the bitstream, thereby reducing its size.

In a further embodiment, the rescaling for changing the size $\bar{T}_1$ in the at least one dimension to a size $\hat{T}_1$ is determined based on a formula depending on, $u_2$ and N, where N is the total number of upsampling layers proceeding the first upsampling layer in processing order of the bitstream through the NN.

In this embodiment, each of the upsampling layers has the same upsampling ratio and with this embodiment, a computationally efficient calculation of the rescaling required is possible. Specifically, the rescaling of each layer solely depends on the upsampling ratio, the final target size and the number N of remaining layers that need to be processed. However, this embodiment is not limited to the case when all upsampling layers have the same upsampling ratio. In one example, the upsampling ratios of the layers proceeding the first upsampling layer might be 2 and 8. In this case for the sake of computational simplicity, it is possible to consider the number of remaining layers N equal to 2 and upsampling ratio $u_2$ equal to 4.

In one embodiment, the formula is given by $$\hat{T}_1 = \operatorname{ceil}\left(\frac{T_{output}}{u_2^N}\right),$$

wherein $T_{output}$ is the target size of the output of the NN.

This formula ensures that the rescaling is always an integer value that can be added to or subtracted from the output of the previous layer so as to obtain a reasonably processable rescaled input for the subsequent layer. It is noted that, for the last upsampling layer, the upsampling will, in some embodiments, always lead to the target size $T_{output}$ of the output of the NN. Specifically for the last layer of the NN of the decoder, there may thus be no checking whether the input to the last layer has appropriate size or whether the output of the last layer has appropriate size.

More specifically, an indication for indicating the size $T_3$ may be included in the bitstream.

In an alternative embodiment, the formula is given by $$\hat{T}_1 = \operatorname{ceil}\left(\frac{\bar{T}_2}{u_2}\right)$$

or the formula is given by $$\hat{T}_1 = \operatorname{floor}\left(\frac{\bar{T}_2}{u_2}\right).$$

Thereby, the rescaling is provided so as to depend only on the output size of the subsequent layer. This can reduce the computational complexity in determining a necessary rescaling.

It can also be provided that an indication is obtained from the bitstream that indicates which of the multiple predefined formulas are selected. The multiple predefined formulas may encompass the formulas for determining $\hat{T}_1$ as mentioned above and as referred to below.

In one embodiment, the method further comprises, before the rescaling to the output with the size $\overline{T}_1$, determining whether the size $\overline{T}_1$ of the output matches the size $\hat{T}_1$. Such determination can be used to potentially avoid unnecessary rescaling of the output with the size $\overline{T}_1$.

It can further be provided that, if it is determined that the size $\overline{T}_1$ matches the size $\hat{T}_1$, no rescaling changing the size $\overline{T}_1$ is applied. This means that no rescaling is applied to the size $\overline{T}_1$ that results in rescaling to the size $\hat{T}_1 \neq \overline{T}_1$. However, "identical transformations" that formally apply a rescaling without changing the size may still be applied even if it is determined that the size $\overline{T}_1$ matches the size $\hat{T}_1$. For example, if the size $$\hat{T}_1 = \mathrm{ceil}\left(\frac{\overline{T}_2}{u_2}\right) \text{ and } \overline{T}_1 = \frac{\overline{T}_2}{u_2},$$

this will result in $\hat{T}_1 = \overline{T}_1$ and a rescaling applied based on this will not change $\overline{T}_1$.

In a further embodiment, the method further comprises determining whether $\overline{T}_1$ is larger than $\hat{T}_1$ or whether $\overline{T}_1$ is smaller than $\hat{T}_1$. Based on this determination, further actions may be taken regarding the rescaling. For example, based on this determination, the size $\overline{T}_1$ may be reduced using one specific technique or $\overline{T}_1$ may be increased using another technique.

In a further embodiment, it is provided that, if it is determined that $\overline{T}_1$ is larger than $\hat{T}_1$, the rescaling comprises applying a cropping to the output with the size $\overline{T}_1$ such that the size $\overline{T}_1$ is reduced to the size $\hat{T}_1$. The cropping results in a loss of information but is a computationally efficient way to reduce the size $\overline{T}_1$.

In one embodiment, it is provided that, if it is determined that $\overline{T}_1$ is smaller than $\hat{T}_1$, the rescaling comprises applying a padding to the output with the size $\overline{T}_1$ such that the size $\overline{T}_1$ is increased to the size $\hat{T}_1$. The padding can be realized in different ways. Specifically, the padding may be provided in a way that additional information is only added to one or more borders of the output with the size $\overline{T}_1$. Thereby, only regions that may be of lesser relevance in the reconstructed picture are influenced by the padding, resulting in higher quality of the reconstructed picture.

In a more specific embodiment, the padding comprises padding the output with the size $\overline{T}_1$ with zeros or with padding information obtained from the output with the size $\overline{T}_1$. Both alternatives can have advantages. Padding with zeros can be realized in a computationally efficient manner as it is independent of information of the output. Padding the output with information obtained from the output with the size $\overline{T}_1$ is computationally usually more complex, but allows for controlling the transition between the actual information in the output and the added information, thereby allowing for reducing processing artifacts in the reconstructed picture.

In a further more specific embodiment, the padding information obtained from the output with the size $\overline{T}_1$ is applied as redundant padding information to increase the size $\overline{T}_1$ of the output to the size $\hat{T}_1$.

In one embodiment, the padding comprises reflection padding or repetition padding.

In a further embodiment, the padding information is or comprises at least one value of the output with the size $\overline{T}_1$ that is closest to a region in the output to which the redundant padding information is to be added. This results in reduced distortions at the transition between the actual output and the information added by the padding.

It can further be provided that, if it is determined that $\overline{T}_1$ is not equal to $\hat{T}_1$, the rescaling comprises applying an interpolation filter.

In general the resizing formula to compute the size $\hat{T}_1$ might have the following form: $\hat{T}_1 = f(\overline{T}_2, u_2)$. For example $$\hat{T}_1 = \mathrm{floor}\left(\frac{\overline{T}_2}{u_2}\right).$$

In one example the formula to calculate size after each upsampling layer might be different. Such as:

$$\hat{T}_1 = \mathrm{ceil}\left(\frac{\overline{T}_2}{u_2}\right), \text{ and } \hat{T}_2 = \mathrm{floor}\left(\frac{\overline{T}_3}{u_3}\right).$$

It can also be provided that the information is provided in the bitstream or a further bitstream and comprises a downsampling ratio $r_m$ of at least one downsampling layer of an encoder that encoded the bitstream, wherein the downsampling layer corresponds, in the order of processing the input, to the upsampling layer of the decoder.

This embodiment is specifically advantageous in case the encoder and the decoder correspond to each other by being the exact inverse of each other.

In one embodiment, at least one of the upsampling layers applies an upsampling in the two dimensions and the upsampling ratio in the first dimension is equal to the upsampling ratio in the second dimension.

In a further embodiment, the upsampling ratios of all upsampling layers are equal.

This reduces the computational complexity of the decoder.

Furthermore, it can be provided that the bitstream represents a matrix comprising a first dimension with a width W and a second dimension with a height H and/or the decoded bitstream is a reconstructed picture, e.g. a still picture and/or video picture. For such bitstreams, applying the method of decoding is specifically advantageous.

In a further embodiment, the rescaling comprises a rescaling operation that is or comprises at least one of applying an interpolation, a padding, a cropping to the input so as to change the size of the input in line with the rescaling. These rescaling operations can be applied advantageously in case the rescaling comprises an increase in the size of the original input or a decrease of the size of the original input.

In one embodiment, the NN comprises, in the processing order of the bitstream through the NN, a further unit that applies a transformation to the input that does not change the size of the input in the at least one dimension, wherein the method comprises applying the rescaling after the processing of the input by the further unit and before processing the input by the following layer, if the rescaling results in an increase of the size of the input in the at least one dimension, and/or wherein the method comprises applying the rescaling before the processing of the input by the further unit, if the rescaling comprises a decrease of the size of the input in the at least one dimension.

Thereby, the processing necessary in each layer or step of the neural network is kept at a minimum.

The further unit can be or can comprise a batch normalizer and/or a rectified linear unit, ReLU.

Such further units apply modifications to the entries of the matrix which can make it computationally more efficient if the rescaling is done after these units or before them. Thereby, unnecessary processing of redundant or useless information is avoided.

Even further, the bitstream may comprise sub-bitstreams corresponding to distinct color channels of the bitstream and the NN may comprise sub-neural networks, sNN, that are each adapted to apply a method according to any of the above embodiments to the sub-bitstream provided as input to the sNN.

This makes the disclosure applicable also to cases where, for example, different color channels of the underlying bitstream are to be taken into account but these are encoded independent from each other.

In a further embodiment, it is provided that, if the rescaling comprises increasing the size S to the size $\bar{S}$, the size $\bar{S}$ is given by $$\bar{S} = \text{Int}\left(\frac{S+r-1}{r}\right) r$$

and, if the rescaling comprises reducing the size S to the size $\bar{S}$, the size $\bar{S}$ is given by $$\bar{S} = \text{Int}\left(\frac{S}{r}\right) r.$$

With these rescalings, it is ensured that the size of the rescaled input to the subsequent downsampling layer always is an integer multiple of the downsampling ratio r of the subsequent downsampling layer that processes the input with the size S.

In another embodiment, it is provided that, if the rescaling comprises increasing the size $\bar{T}_1$ to the size $\hat{T}_1$, the size $\hat{T}_1$, is given by $$\hat{T}_1 = \text{Int}\left(\frac{\bar{T}_1 + u_2 - 1}{u_2}\right) u_2$$

and, it the rescaling comprises reducing the size $\bar{T}_1$ to the size $\hat{T}_1$, the size $\hat{T}_1$, is given by $$\hat{T}_1 = \text{Int}\left(\frac{T_1}{u_2}\right) u_2.$$

With this, it is ensured that the output of the upsampling layer has a size that can be reasonably processed by the following upsampling layer.

According to one embodiment, an encoder for encoding a picture is provided, wherein the encoder comprises a receiver or interface for receiving (obtaining) a picture and one or more processors configured to implement a neural network (NN), the NN comprising, in a processing order of a picture through the NN, a plurality of layers comprising at least one downsampling layer that is adapted to apply a downsampling to an input, and transmitter or interface for outputting a bitstream, wherein the encoder is adapted to perform a method according to any of the above embodiments. This encoder advantageously implements the method according to the above embodiments for encoding pictures.

In a further embodiment, an encoder for encoding a picture is provided, wherein the encoder comprises one or more processors for implementing a neural network (NN), wherein the one or more processors are adapted to perform a method according to any of the above embodiments.

Accordingly, for example, an encoder for encoding a picture using a neural network (NN), is provided, wherein the encoder comprises one or more processors for implementing the NN, wherein the NN comprises a plurality of layers comprising at least one downsampling layer that applies a downsampling to an input representing a matrix having a size S in at least one dimension, and wherein the one or more processors are adapted to: apply, before processing the input with the at least one downsampling layer, a rescaling to the input, wherein the rescaling comprises changing the size S in the at least one dimension so that that $\bar{S}=n\cdot r$, with $n\in \mathbb{N}$ and $r>1$, $r\in \mathbb{N}$, where r is the downsampling ratio of the layer; after the rescaling, process the input by the downsampling layer and provide an output with the size $S_1<S$; and provide, after processing the picture using the NN (e.g. after processing the picture with each layer of the NN), a bitstream as output of the NN.

In one embodiment, a decoder for decoding a bitstream representing a picture is provided, wherein the decoder comprises a receiver or interface for receiving a bitstream and one or more processors configured to implement a neural network (NN), the NN comprising, in a processing order of a bitstream through the NN, a plurality of layers comprising at least two upsampling layers that are adapted to apply upsampling to an input, and a transmitter or interface for outputting a decoded picture, wherein the decoder is adapted to perform any of the methods of the above embodiments. This decoder realizes the advantages of the above methods for decoding bitstreams that represent pictures.

In one embodiment, a decoder for decoding a bitstream representing a picture is provided, wherein the decoder comprises one or more processors for implementing a neural network (NN), wherein the one or more processors are adapted to perform a method according to any of the above embodiments.

Accordingly, for example, a decoder for decoding a bitstream representing a picture is provided, wherein the decoder comprises one or more processors for implementing a neural network (NN), wherein the NN comprises a plurality of layers comprising at least a first upsampling layer and a second upsampling layer that apply an upsampling to an input representing a matrix having a size T in at least one dimension, wherein the one or more processors are adapted to: process the input by the first upsampling layer and provide an output of the first upsampling layer, wherein the output has a size $\bar{T}_1 = T\cdot u_1$, $u_1>1$, $u_1\in \mathbb{N}$, wherein $u_1$ is the upsampling ratio of the first upsampling layer; apply, before processing the output of the first upsampling layer by the second upsampling layer, rescaling to the output of the first upsampling layer, wherein the rescaling comprises changing the size $\bar{T}_1$ of the output in the at least one dimension to a size $\hat{T}_1$ in the at least one dimension based on information obtained; process the rescaled output by the second upsampling layer and provide an output of the second upsampling layer, wherein the output has a size $\bar{T}_2 = \hat{T}_1 \cdot u_2$, $u_2 > 1$, $u_2 \in \mathbb{N}$ in the at least one dimension, wherein $u_2$ is the upsampling ratio of the second upsampling layer; and provide, after processing the bitstream using the NN (e.g. after processing the bitstream with each layer of the NN), a decoded picture as output of the NN.

In an embodiment, a computer program is provided which is adapted, e.g. when executed on a computing system or by one or more processors, to perform a method according to any of the above embodiments.

In another embodiment a computer-readable storage medium is provided which comprises computer executable instructions that, when executed on a computing system, cause the computing system to execute a method according to any of the above embodiments. Specifically, the computer-readable storage medium can be a non-transitory medium.

BRIEF DESCRIPTION OF THE DRAWINGS

FIG. 17 shows a further comparison of different possibilities of padding operations;

DETAILED DESCRIPTION

Figure 1A:
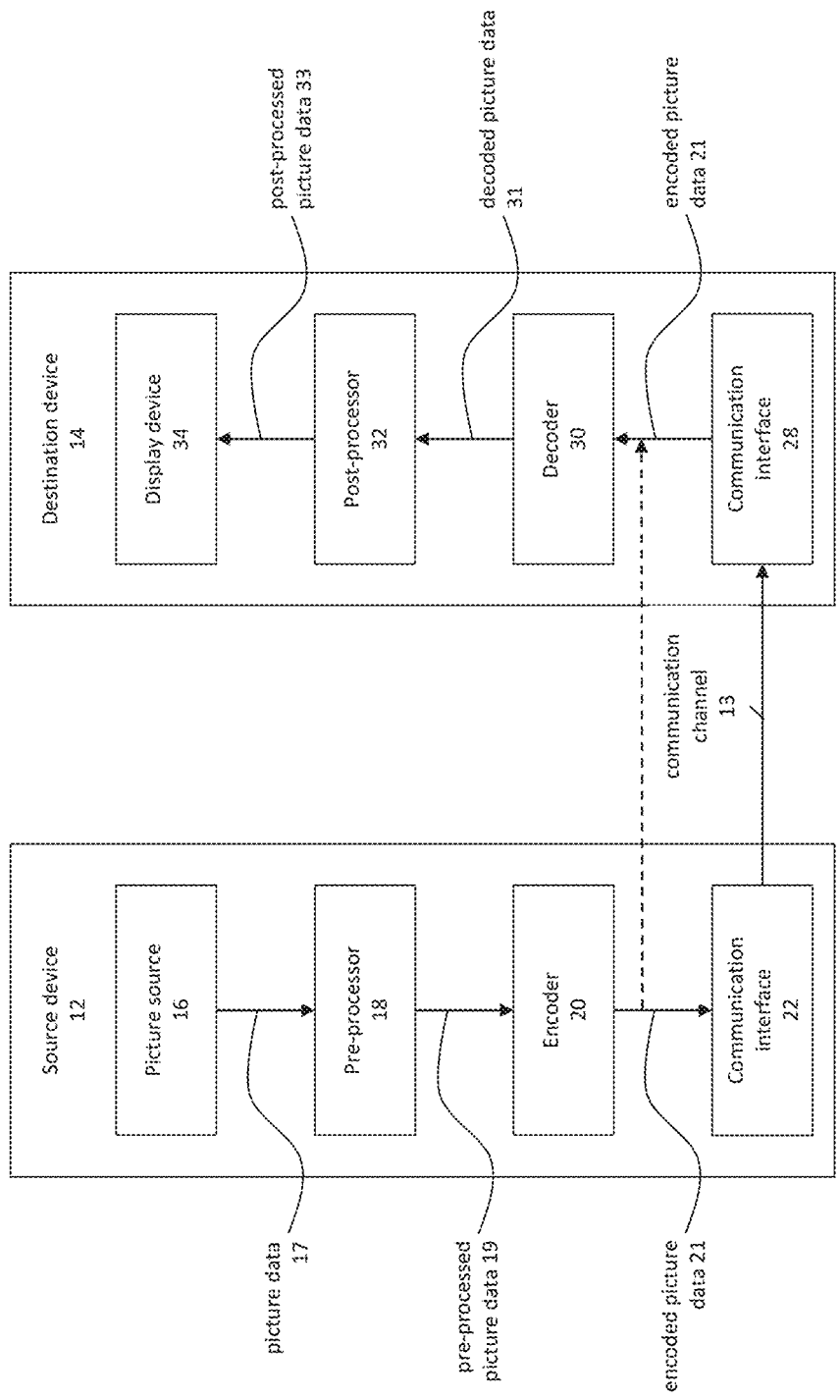
FIG. 1A is a block diagram showing an example of a video coding system configured to implement an embodiments of the present disclosure.

In the following, some embodiments are described with reference to the Figs. The FIGS. 1 to 3 refer to video coding systems and methods that may be used together with more specific embodiments described in the further Figs. Specifically, the embodiments described in relation to FIGS. 1 to 3 may be used with encoding/decoding techniques described further below that make use of a neural network for encoding a bitstream and/or decoding a bitstream.

In the following description, reference is made to the accompanying Figs., which form part of the disclosure, and which show, by way of illustration, specific aspects of the present disclosure or specific aspects in which embodiments of the present disclosure may be used. It is understood that the embodiments may be used in other aspects and comprise structural or logical changes not depicted in the Figs. The following detailed description, therefore, is not to be taken in a limiting sense, and the scope of the present disclosure is defined by the appended claims.

For instance, it is understood that a disclosure in connection with a described method may also hold true for a corresponding device or system configured to perform the method and vice versa. For example, if one or a plurality of specific method steps are described, a corresponding device may include one or a plurality of units, e.g. functional units, to perform the described one or plurality of method steps (e.g. one unit performing the one or plurality of steps, or a plurality of units each performing one or more of the plurality of steps), even if such one or more units are not explicitly described or illustrated in the Figs. On the other hand, for example, if a specific apparatus is described based on one or a plurality of units, e.g. functional units, a corresponding method may include one step to perform the functionality of the one or plurality of units (e.g. one step performing the functionality of the one or plurality of units, or a plurality of steps each performing the functionality of one or more of the plurality of units), even if such one or plurality of steps are not explicitly described or illustrated in the Figs. Further, it is understood that the features of the various exemplary embodiments and/or aspects described herein may be combined with each other, unless specifically noted otherwise.

Video coding typically refers to the processing of a sequence of pictures, which form the video or video sequence. Instead of the term "picture" the term "frame" or "image" may be used as synonyms in the field of video coding. Video coding (or coding in general) comprises two parts video encoding and video decoding. Video encoding is performed at the source side, typically comprising processing (e.g. by compression) the original video pictures to reduce the amount of data required for representing the video pictures (for more efficient storage and/or transmission). Video decoding is performed at the destination side and typically comprises the inverse processing compared to the encoder to reconstruct the video pictures. Embodiments referring to "coding" of video pictures (or pictures in general) shall be understood to relate to "encoding" or "decoding" of video pictures or respective video sequences. The combination of the encoding part and the decoding part is also referred to as CODEC (Coding and Decoding).

In case of lossless video coding, the original video pictures can be reconstructed, i.e. the reconstructed video pictures have the same quality as the original video pictures (assuming no transmission loss or other data loss during storage or transmission). In case of lossy video coding, further compression, e.g. by quantization, is performed, to reduce the amount of data representing the video pictures, which cannot be completely reconstructed at the decoder, i.e. the quality of the reconstructed video pictures is lower or worse compared to the quality of the original video pictures.

Several video coding standards belong to the group of "lossy hybrid video codecs" (i.e. combine spatial and temporal prediction in the sample domain and 2D transform coding for applying quantization in the transform domain). Each picture of a video sequence is typically partitioned into a set of non-overlapping blocks and the coding is typically performed on a block level. In other words, at the encoder the video is typically processed, i.e. encoded, on a block (video block) level, e.g. by using spatial (intra picture) prediction and/or temporal (inter picture) prediction to generate a prediction block, subtracting the prediction block from the current block (block currently processed/to be processed) to obtain a residual block, transforming the residual block and quantizing the residual block in the transform domain to reduce the amount of data to be transmitted (compression), whereas at the decoder the inverse processing compared to the encoder is applied to the encoded or compressed block to reconstruct the current block for representation. Furthermore, the encoder duplicates the decoder processing loop such that both will generate identical predictions (e.g. intra- and inter predictions) and/or re-constructions for processing, i.e. coding, the subsequent blocks. Recently, some parts or the entire encoding and decoding chain has been implemented by using a neural network or, in general, any machine learning or deep learning framework.

In the following embodiments of a video coding system 10, a video encoder 20 and a video decoder 30 are described based on FIG. 1.

FIG. 1A is a schematic block diagram illustrating an example coding system 10, e.g. a video coding system 10 (or short coding system 10) that may utilize techniques of this present application. Video encoder 20 (or short encoder 20) and video decoder 30 (or short decoder 30) of video coding system 10 represent examples of devices that may be configured to perform techniques in accordance with various examples described in the present application.

As shown in FIG. 1A, the coding system 10 comprises a source device 12 configured to provide encoded picture data 21 e.g. to a destination device 14 for decoding the encoded picture data 13.

The source device 12 comprises an encoder 20, and may additionally, i.e. optionally, comprise a picture source 16, a pre-processor (or pre-processing unit) 18, e.g. a picture pre-processor 18, and a communication interface or communication unit 22. Some embodiments of the present disclosure (e.g. relating to an initial rescaling or rescaling between two proceeding layers) may be implemented by the encoder 20. Some embodiments (e.g. relating to an initial rescaling) may be implemented by the picture pre-processor 18.

The picture source 16 may comprise or be any kind of picture capturing device, for example a camera for capturing a real-world picture, and/or any kind of a picture generating device, for example a computer-graphics processor for generating a computer animated picture, or any kind of other device for obtaining and/or providing a real-world picture, a computer generated picture (e.g. a screen content, a virtual reality (VR) picture) and/or any combination thereof (e.g. an augmented reality (AR) picture). The picture source may be any kind of memory or storage storing any of the aforementioned pictures.

In distinction to the pre-processor 18 and the processing performed by the pre-processing unit 18, the picture or picture data 17 may also be referred to as raw picture or raw picture data 17.

Pre-processor 18 is configured to receive the (raw) picture data 17 and to perform pre-processing on the picture data 17 to obtain a pre-processed picture 19 or pre-processed picture data 19. Pre-processing performed by the pre-processor 18 may, e.g., comprise trimming, color format conversion (e.g. from RGB to YCbCr), color correction, or de-noising. It can be understood that the pre-processing unit 18 may be optional component.

The video encoder 20 is configured to receive the pre-processed picture data 19 and provide encoded picture data 21.

Communication interface 22 of the source device 12 may be configured to receive the encoded picture data 21 and to transmit the encoded picture data 21 (or any further processed version thereof) over communication channel 13 to another device, e.g. the destination device 14 or any other device, for storage or direct reconstruction.

The destination device 14 comprises a decoder 30 (e.g. a video decoder 30), and may additionally, i.e. optionally, comprise a communication interface or communication unit 28, a post-processor 32 (or post-processing unit 32) and a display device 34.

The communication interface 28 of the destination device 14 is configured receive the encoded picture data 21 (or any further processed version thereof), e.g. directly from the source device 12 or from any other source, e.g. a storage device, e.g. an encoded picture data storage device, and provide the encoded picture data 21 to the decoder 30.

The communication interface 22 and the communication interface 28 may be configured to transmit or receive the encoded picture data 21 or encoded data 13 via a direct communication link between the source device 12 and the destination device 14, e.g. a direct wired or wireless connection, or via any kind of network, e.g. a wired or wireless network or any combination thereof, or any kind of private and public network, or any kind of combination thereof.

The communication interface 22 may be, e.g., configured to package the encoded picture data 21 into an appropriate format, e.g. packets, and/or process the encoded picture data using any kind of transmission encoding or processing for transmission over a communication link or communication network.

The communication interface 28, forming the counterpart of the communication interface 22, may be, e.g., configured to receive the transmitted data and process the transmission data using any kind of corresponding transmission decoding or processing and/or de-packaging to obtain the encoded picture data 21.

Both, communication interface 22 and communication interface 28 may be configured as unidirectional communication interfaces as indicated by the arrow for the communication channel 13 in FIG. 1A pointing from the source device 12 to the destination device 14, or bi-directional communication interfaces, and may be configured, e.g. to send and receive messages, e.g. to set up a connection, to acknowledge and exchange any other information related to the communication link and/or data transmission, e.g. encoded picture data transmission.

The decoder 30 is configured to receive the encoded picture data 21 and provide decoded picture data 31 or a decoded picture 31 (further details will be described below, e.g., based on FIG. 3).

The post-processor 32 of destination device 14 is configured to post-process the decoded picture data 31 (also called reconstructed picture data), e.g. the decoded picture 31, to obtain post-processed picture data 33, e.g. a post-processed picture 33. The post-processing performed by the post-processing unit 32 may comprise, e.g. color format conversion (e.g. from YCbCr to RGB), color correction, trimming, or re-sampling, or any other processing, e.g. for preparing the decoded picture data 31 for display, e.g. by display device 34.

Some embodiments of the disclosure may be implemented by the decoder 30 or by the post-processor 32.

The display device 34 of the destination device 14 is configured to receive the post-processed picture data 33 for displaying the picture, e.g. to a user or viewer. The display device 34 may be or comprise any kind of display for representing the reconstructed picture, e.g. an integrated or external display or monitor. The displays may, e.g. comprise liquid crystal displays (LCD), organic light emitting diodes (OLED) displays, plasma displays, projectors, micro LED displays, liquid crystal on silicon (LCoS), digital light processor (DLP) or any kind of other display.

Although FIG. 1A depicts the source device 12 and the destination device 14 as separate devices, embodiments of devices may also comprise both or both functionalities, the source device 12 or corresponding functionality and the destination device 14 or corresponding functionality. In such embodiments the source device 12 or corresponding functionality and the destination device 14 or corresponding functionality may be implemented using the same hardware and/or software or by separate hardware and/or software or any combination thereof.

As will be apparent for the skilled person based on the description, the existence and (exact) split of functionalities of the different units or functionalities within the source device 12 and/or destination device 14 as shown in FIG. 1A may vary depending on the actual device and application.

Figure 1B:
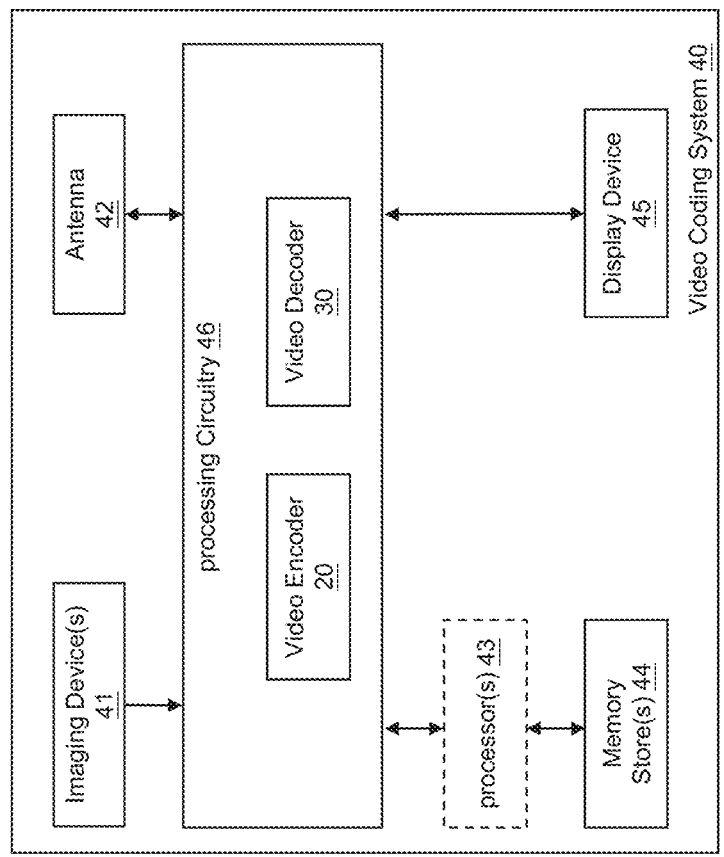
FIG. 1B is a block diagram showing another example of a video coding system configured to implement some embodiments of the present disclosure.

The encoder 20 (e.g. a video encoder 20) or the decoder 30 (e.g. a video decoder 30) or both encoder 20 and decoder 30 may be implemented via processing circuitry as shown in FIG. 1B, such as one or more microprocessors, digital signal processors (DSPs), application-specific integrated circuits (ASICs), field-programmable gate arrays (FPGAs), discrete logic, hardware, video coding dedicated or any combinations thereof. The encoder 20 may be implemented via processing circuitry 46 to embody various modules and/or any other encoder system or subsystem described herein. The decoder 30 may be implemented via processing circuitry 46 to embody various modules and/or any other decoder system or subsystem described herein. The processing circuitry may be configured to perform the various operations as discussed later. As shown in FIG. 3, if the techniques are implemented partially in software, a device may store instructions for the software in a suitable, non-transitory computer-readable storage medium and may execute the instructions in hardware using one or more processors to perform the techniques of this disclosure. Either of video encoder 20 and video decoder 30 may be integrated as part of a combined encoder/decoder (CODEC) in a single device, for example, as shown in FIG. 1B.

Source device 12 and destination device 14 may comprise any of a wide range of devices, including any kind of handheld or stationary devices, e.g. notebook or laptop computers, mobile phones, smart phones, tablets or tablet computers, cameras, desktop computers, set-top boxes, televisions, display devices, digital media players, video gaming consoles, video streaming devices (such as content services servers or content delivery servers), broadcast receiver device, broadcast transmitter device, or the like and may use no or any kind of operating system. In some cases, the source device 12 and the destination device 14 may be equipped for wireless communication. Thus, the source device 12 and the destination device 14 may be wireless communication devices.

In some cases, video coding system 10 illustrated in FIG. 1A is merely an example and the techniques of the present application may apply to video coding settings (e.g., video encoding or video decoding) that do not necessarily include any data communication between the encoding and decoding devices. In other examples, data is retrieved from a local memory, streamed over a network, or the like. A video encoding device may encode and store data to memory, and/or a video decoding device may retrieve and decode data from memory. In some examples, the encoding and decoding is performed by devices that do not communicate with one another, but simply encode data to memory and/or retrieve and decode data from memory.

For convenience of description, some embodiments are described herein, for example, by reference to High-Efficiency Video Coding (HEVC) or to the reference software of Versatile Video coding (VVC), the next generation video coding standard developed by the Joint Collaboration Team on Video Coding (JCT-VC) of ITU-T Video Coding Experts Group (VCEG) and ISO/IEC Motion Picture Experts Group (MPEG). One of ordinary skill in the art will understand that embodiments are not limited to HEVC or VVC.

Figure 2:
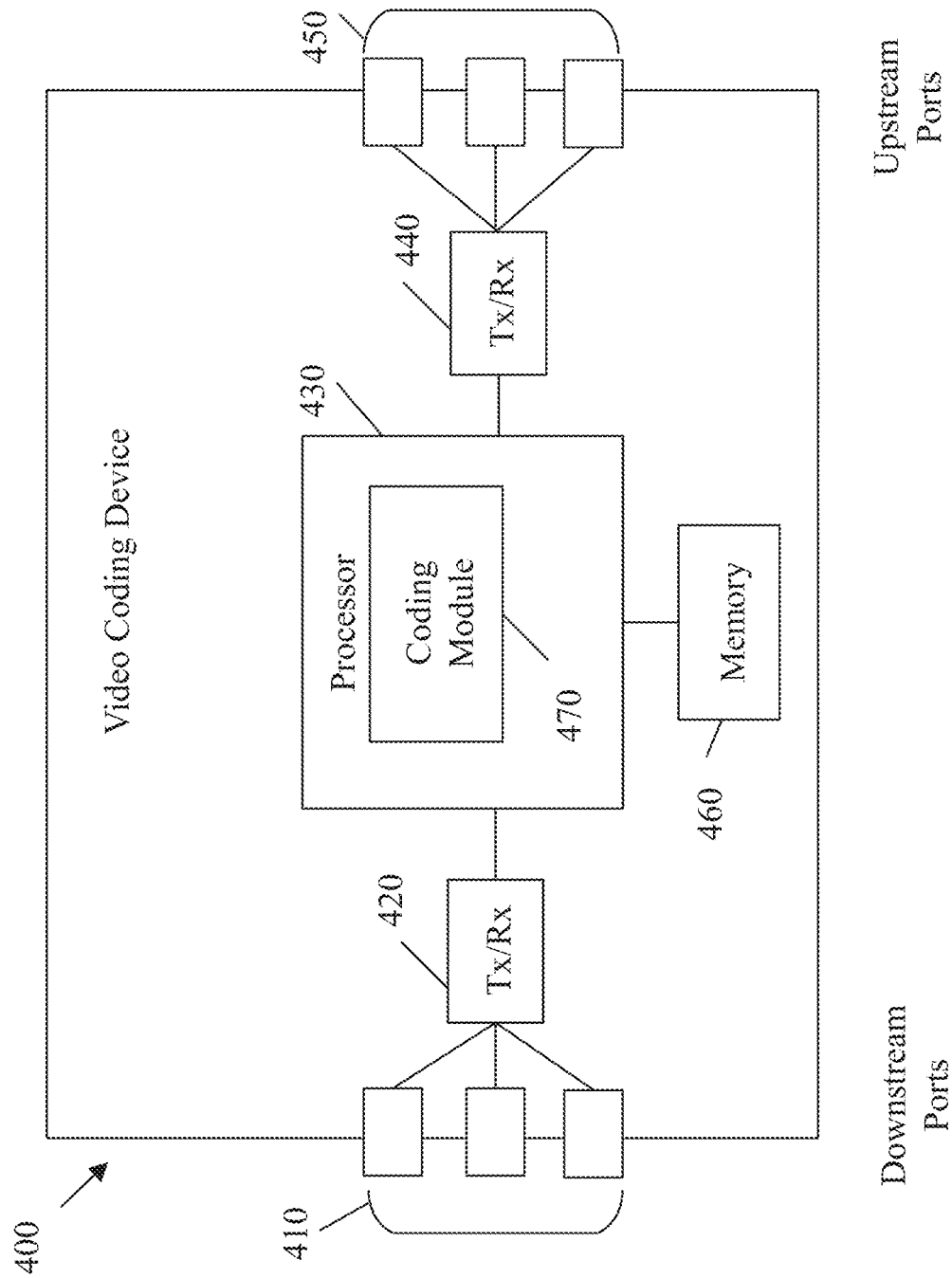
FIG. 2 is a block diagram illustrating an example of an encoding apparatus or a decoding apparatus.

FIG. 2 is a schematic diagram of a video coding device 400 according to an embodiment of the disclosure. The video coding device 400 is suitable for implementing the disclosed embodiments as described herein. In an embodiment, the video coding device 400 may be a decoder such as video decoder 30 of FIG. 1A or an encoder such as video encoder 20 of FIG. 1A.

The video coding device 400 comprises ingress ports 410 (or input ports 410) and receiver units (Rx) 420 for receiving data; a processor, logic unit, or central processing unit (CPU) 430 to process the data; transmitter units (Tx) 440 and egress ports 450 (or output ports 450) for transmitting the data; and a memory 460 for storing the data. The video coding device 400 may also comprise optical-to-electrical (OE) components and electrical-to-optical (EO) components coupled to the ingress ports 410, the receiver units 420, the transmitter units 440, and the egress ports 450 for egress or ingress of optical or electrical signals.

The processor 430 is implemented by hardware and software. The processor 430 may be implemented as one or more CPU chips, cores (e.g., as a multi-core processor), FPGAs, ASICs, and DSPs. The processor 430 is in communication with the ingress ports 410, receiver units 420, transmitter units 440, egress ports 450, and memory 460. The processor 430 comprises a coding module 470. The coding module 470 implements the disclosed embodiments described above. For instance, the coding module 470 implements, processes, prepares, or provides the various coding operations. The inclusion of the coding module 470 therefore provides a substantial improvement to the functionality of the video coding device 400 and effects a transformation of the video coding device 400 to a different state. Alternatively, the coding module 470 is implemented as instructions stored in the memory 460 and executed by the processor 430.

The memory 460 may comprise one or more disks, tape drives, and solid-state drives and may be used as an overflow data storage device, to store programs when such programs are selected for execution, and to store instructions and data that are read during program execution. The memory 460 may be, for example, volatile and/or non-volatile and may be a read-only memory (ROM), random access memory (RAM), ternary content-addressable memory (TCAM), and/or static random-access memory (SRAM).

Figure 3:
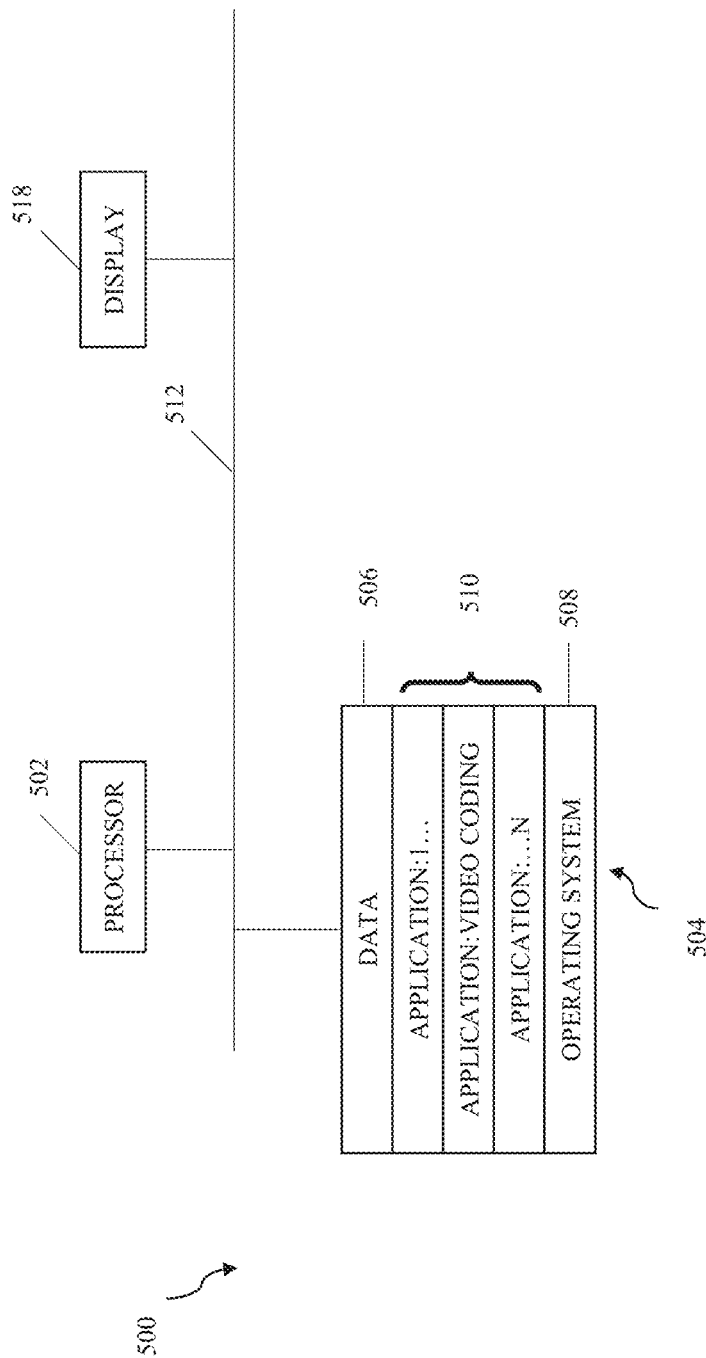
FIG. 3 is a block diagram illustrating another example of an encoding apparatus or a decoding apparatus.

FIG. 3 is a simplified block diagram of an apparatus 500 that may be used as either or both of the source device 12 and the destination device 14 from FIG. 1 according to an exemplary embodiment.

A processor 502 in the apparatus 500 can be a central processing unit. Alternatively, the processor 502 can be any other type of device, or multiple devices, capable of manipulating or processing information now-existing or hereafter developed. Although the disclosed implementations can be practiced with a single processor as shown, e.g., the processor 502, advantages in speed and efficiency can be achieved using more than one processor.

A memory 504 in the apparatus 500 can be a read only memory (ROM) device or a random access memory (RAM) device in an implementation. Any other suitable type of storage device can be used as the memory 504. The memory 504 can include code and data 506 that is accessed by the processor 502 using a bus 512. The memory 504 can further include an operating system 508 and application programs 510, the application programs 510 including at least one program that permits the processor 502 to perform the methods described here. For example, the application programs 510 can include applications 1 through N, which further include a video coding application that performs the methods described here.

The apparatus 500 can also include one or more output devices, such as a display 518. The display 518 may be, in one example, a touch sensitive display that combines a display with a touch sensitive element that is operable to sense touch inputs. The display 518 can be coupled to the processor 502 via the bus 512.

Although depicted here as a single bus, the bus 512 of the apparatus 500 can be composed of multiple buses. Further, the secondary storage 514 can be directly coupled to the other components of the apparatus 500 or can be accessed via a network and can comprise a single integrated unit such as a memory card or multiple units such as multiple memory cards. The apparatus 500 can thus be implemented in a wide variety of configurations.

In the following, more specific, non-limiting, and exemplary embodiments are described. Before that, some explanations will be provided aiding in the understanding of the disclosure:

Artificial neural networks (ANN) or connectionist systems are computing systems vaguely inspired by the biological neural networks that constitute animal brains. An ANN is based on a collection of connected units or nodes called artificial neurons, which loosely model the neurons in a biological brain. Each connection, like the synapses in a biological brain, can transmit a signal to other neurons. An artificial neuron that receives a signal then processes it and can signal neurons connected to it. In ANN implementations, the "signal" at a connection is a real number, and the output of each neuron can be computed by some non-linear function of the sum of its inputs. The connections are called edges. Neurons and edges typically have a weight that adjusts as learning proceeds. The weight increases or decreases the strength of the signal at a connection. Neurons may have a threshold such that a signal is sent only if the aggregate signal crosses that threshold. Typically, neurons are aggregated into layers. Different layers may perform different transformations on their inputs. Signals travel from the first layer (the input layer), to the last layer (the output layer), possibly after traversing the layers multiple times.

The original goal of the ANN approach was to solve problems in the same way that a human brain would. Over time, attention moved to performing specific tasks, leading to deviations from biology. ANNs have been used on a variety of tasks, including computer vision.

Figure 6:
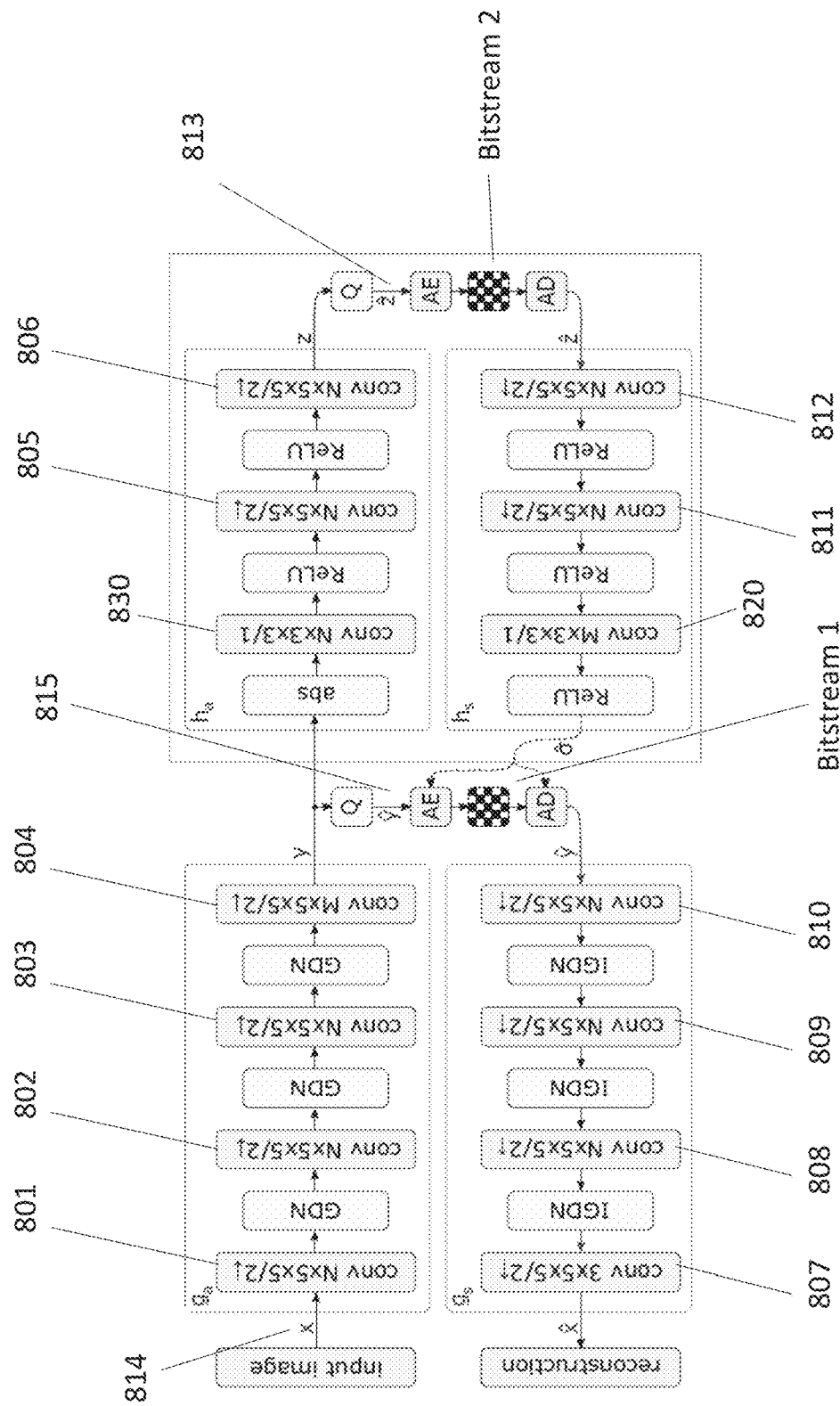
FIG. 6 shows an encoder and a decoder in line with a VAE framework.

The name "convolutional neural network" (CNN) indicates that the network employs a mathematical operation called convolution. Convolution is a specialized kind of linear operation. Convolutional networks are simply neural networks that use convolution in place of general matrix multiplication in at least one of their layers. A convolutional neural network consists of an input and an output layer, as well as multiple hidden layers. Input layer is the layer to which the input is provided for processing. For example, the neural network of FIG. 6 is a CNN. The hidden layers of a CNN typically consist of a series of convolutional layers that convolve with a multiplication or other dot product. The result of a layer is one or more feature maps, sometimes also referred to as channels. There may be a subsampling involved in some or all of the layers. As a consequence, the feature maps may become smaller. The activation function in a CNN may be a RELU (Rectified Linear Unit) layer or a GDN layer as already exemplified above, and is subsequently followed by additional convolutions such as pooling layers, fully connected layers and normalization layers, referred to as hidden layers because their inputs and outputs are masked by the activation function and final convolution. Though the layers are colloquially referred to as convolutions, this is only by convention. Mathematically, it is technically a sliding dot product or cross-correlation. This has significance for the indices in the matrix, in that it affects how weight is determined at a specific index point.

When programming a CNN for processing pictures or images, the input is a tensor with shape (number of images)×(image width)×(image height)×(image depth). Then, after passing through a convolutional layer, the image becomes abstracted to a feature map, with shape (number of images)×(feature map width)×(feature map height)×(feature map channels). A convolutional layer within a neural network should have the following attributes. Convolutional kernels defined by a width and height (hyper-parameters). The number of input channels and output channels (hyper-parameter). The depth of the convolution filter (the input channels) should be equal to the number channels (depth) of the input feature map.

In the past, traditional multilayer perceptron (MLP) models have been used for image recognition. However, due to the full connectivity between nodes, they suffered from high dimensionality, and did not scale well with higher resolution images. A 1000×1000-pixel image with RGB color channels has 3 million weights, which is too high to feasibly process efficiently at scale with full connectivity. Also, such network architecture does not take into account the spatial structure of data, treating input pixels which are far apart in the same way as pixels that are close together. This ignores locality of reference in image data, both computationally and semantically. Thus, full connectivity of neurons is wasteful for purposes such as image recognition that are dominated by spatially local input patterns. CNN models mitigate the challenges posed by the MLP architecture by exploiting the strong spatially local correlation present in natural images. The convolutional layer is the core building block of a CNN. The layer's parameters consist of a set of learnable filters (the above-mentioned kernels), which have a small receptive field, but extend through the full depth of the input volume. During the forward pass, each filter is convolved across the width and height of the input volume, computing the dot product between the entries of the filter and the input and producing a 2-dimensional activation map of that filter. As a result, the network learns filters that activate when it detects some specific type of feature at some spatial position in the input.

Stacking the activation maps for all filters along the depth dimension forms the full output volume of the convolution layer. Every entry in the output volume can thus also be interpreted as an output of a neuron that looks at a small region in the input and shares parameters with neurons in the same activation map. A feature map, or activation map, is the output activations for a given filter. Feature map and activation has same meaning. In some papers it is called an activation map because it is a mapping that corresponds to the activation of different parts of the image, and also a feature map because it is also a mapping of where a certain kind of feature is found in the image. A high activation means that a certain feature was found.

Another important concept of CNNs is pooling, which is a form of non-linear downsampling. There are several non-linear functions to implement pooling among which max pooling is the most common. It partitions the input image into a set of non-overlapping rectangles and, for each such sub-region, outputs the maximum. Intuitively, the exact location of a feature is less important than its rough location relative to other features. This is the idea behind the use of pooling in convolutional neural networks. The pooling layer serves to progressively reduce the spatial size of the representation, to reduce the number of parameters, memory footprint and amount of computation in the network, and hence to also control overfitting. It is common to periodically insert a pooling layer between successive convolutional layers in a CNN architecture. The pooling operation provides another form of translation invariance.

The above-mentioned ReLU is the abbreviation of rectified linear unit, which applies the non-saturating activation function. It effectively removes negative values from an activation map by setting them to zero. It increases the nonlinear properties of the decision function and of the overall network without affecting the receptive fields of the convolution layer. Other functions are also used to increase nonlinearity, for example the saturating hyperbolic tangent and the sigmoid function. ReLU is often preferred to other functions because it trains the neural network several times faster without a significant penalty to generalization accuracy.

After several convolutional and max pooling layers, the high-level reasoning in the neural network is done via fully connected layers. Neurons in a fully connected layer have connections to all activations in the previous layer, as seen in regular (non-convolutional) artificial neural networks. Their activations can thus be computed as an affine transformation, with matrix multiplication followed by a bias offset (vector addition of a learned or fixed bias term).

An autoencoder is a type of artificial neural network used to learn efficient data codings in an unsupervised manner. The aim of an autoencoder is to learn a representation (encoding) for a set of data, typically for dimensionality reduction, by training the network to ignore signal "noise". Along with the reduction side, a reconstructing side is learnt, where the autoencoder tries to generate from the reduced encoding a representation as close as possible to its original input, hence its name.

Picture size: refers to the width or height or the width-height pair of a picture. Width and height of an image is usually measured in number of luma samples.

Downsampling: Downsampling is a process, where the sampling rate (sampling interval) of the discrete input signal is reduced. For example if the input signal is an image which has a size of height h and width w (or H and W as referred to below likewise), and the output of the downsampling is a height h2 and a width w2, at least one of the following holds true:

$$h2<h$$

$$w2<w$$

In one example implementation, downsampling can be implemented as keeping only each m-th sample, discarding the rest of the input signal (which, in the context of the invention, basically is a picture).

Upsampling: Upsampling is a process, where the sampling rate (sampling interval) of the discrete input signal is increased. For example if the input image has a size of h and w (or H and W as referred to below likewise), and the output of the downsampling is h2 and w2, at least one of the following holds true:

$$h<h2$$

$$w<w2$$

Resampling: downsampling and upsampling processes are both examples of resampling. Resampling is a process where the sampling rate (sampling interval) of the input signal is changed.

Interpolation filtering: During the upsampling or downsampling processes, filtering can be applied to improve the accuracy of the resampled signal and to reduce the aliasing affect. An interpolation filter usually includes a weighted combination of sample values at sample positions around the resampling position. It can be implemented as:

$$f(x_r, y_r) = \Sigma s(x,y) C(k)$$

Where f( ) is the resampled signal, $(x_r, y_r)$ are the resampling coordinates, $C(k)$ are interpolation filter coefficients and $s(x,y)$ are or is the input signal. The summation operation is performed for $(x,y)$ that are in the vicinity of $(x_r, y_r)$.

Cropping: Trimming off the outside edges of a digital image. Cropping can be used to make an image smaller (in number of samples) and/or to change the aspect ratio (length to width) of the image.

Padding: padding refers to increasing the size of the input image (or image) by generating new samples at the borders of the image. This can be done, for example, by either using sample values that are predefined or by using sample values of the positions in the input image.

Resizing: Resizing is a general term where the size of the input image is changed. It might be done using one of the methods of padding or cropping. It can be done by a resizing operation using interpolation. In the following, resizing may also be referred to as rescaling.

Integer division: Integer division is division in which the fractional part (remainder) is discarded.

Convolution: convolution is given by the following general equation. Below f( ) can be defined as the input signal and go can be defined as the filter.

$$(f*g)[n] = \sum_{m=-\infty}^{\infty} f[m]g[n-m]$$

Downsampling layer: A processing layer, such as a layer of a neural network that results in a reduction of at least one of the dimensions of the input. In general, the input might have 3 or more dimensions, where the dimensions might comprise number of channels, width and height. However, the present disclosure is not limited to such signals. Rather, signals which may have one or two dimensions (such as audio signal or an audio signal with a plurality of channels) may be processed. The downsampling layer usually refers to reduction of the width and/or height dimensions. It can be implemented with convolution, averaging, max-pooling etc. operations. Also other ways of downsampling are possible and the invention is not limited in this regard.

Upsampling layer: A processing layer, such as a layer of a neural network that results in an increase of one of the dimensions of the input. In general, the input might have 3 or more dimensions, where the dimensions might comprise number of channels, width and height. The upsampling layer usually refers to increase in the width and/or height dimensions. It can be implemented with de-convolution, replication etc operations. Also, other ways of upsampling are possible and the invention is not limited in this regard.

Some deep learning based image and video compression algorithms follow the Variational Auto-Encoder framework (VAE), e.g. G-VAE: A Continuously Variable Rate Deep Image Compression Framework, (Ze Cui, Jing Wang, Bo Bai, Tiansheng Guo, Yihui Feng), available at: https://arxiv.org/abs/2003.02012.

The VAE framework could be counted as a nonlinear transforming coding model.

Figure 4:
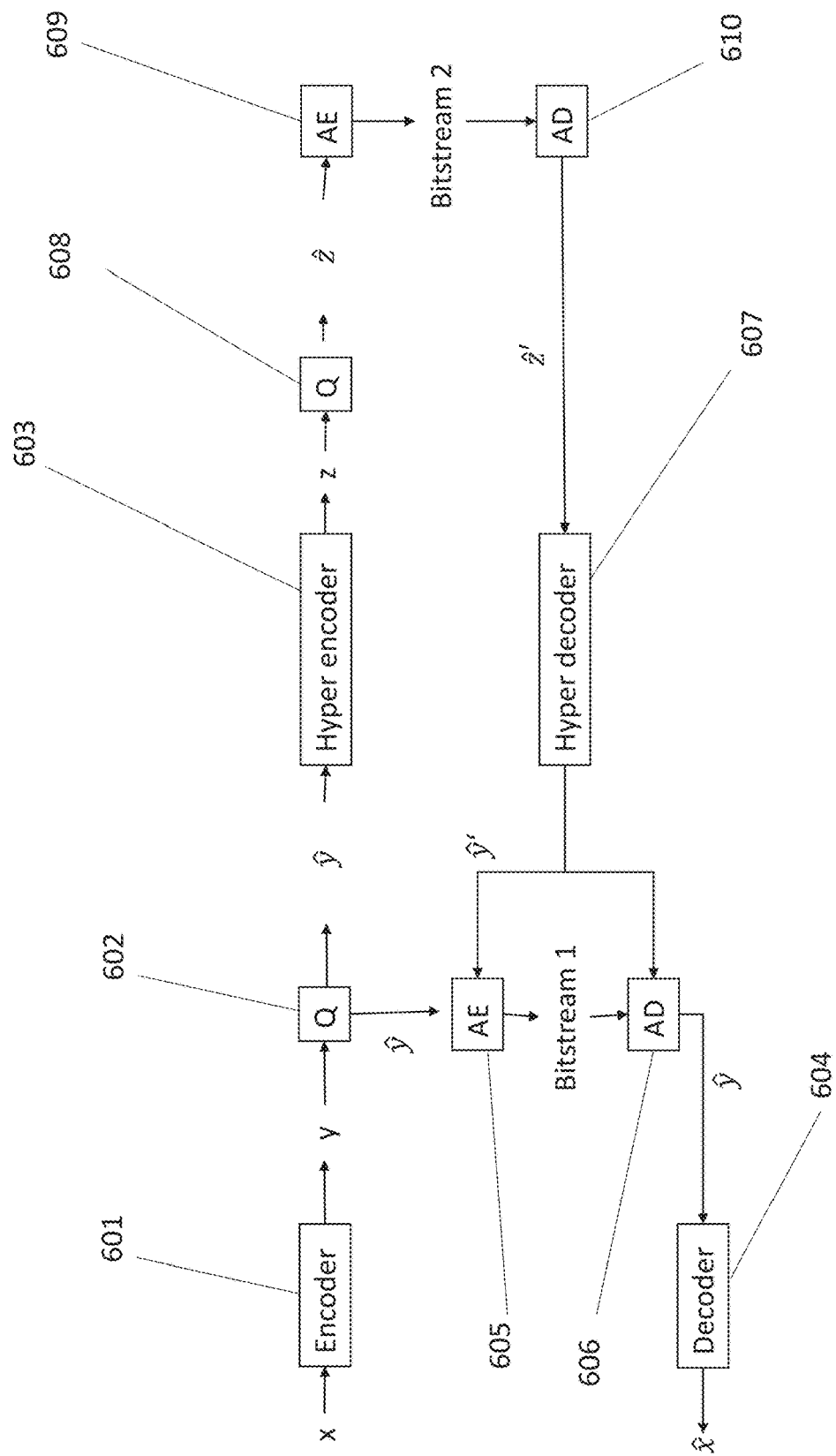
FIG. 4 shows an encoder and a decoder together according to one embodiment.

The transforming process can be mainly divided into four parts: FIG. 4 exemplifies the VAE framework. In the FIG. 4, the encoder 601 maps an input image x into a latent representation (denoted by y) via the function y=f(x). This latent representation may also be referred to as a part of or a point within a "latent space" in the following. The function f( ) is a transformation function that converts the input signal x into a more compressible representation y. The quantizer 602 transforms the latent representation y into the quantized latent representation $\hat{y}$ with (discrete) values by $\hat{y}=Q(y)$, with Q representing the quantizer function. The entropy model, or the hyper encoder/decoder (also known as hyperprior) 603 estimates the distribution of the quantized latent representation $\hat{y}$ to get the minimum rate achievable with a lossless entropy source coding.

The latent space can be understood as a representation of compressed data in which similar data points are closer together in the latent space. Latent space is useful for learning data features and for finding simpler representations of data for analysis.

The quantized latent representation T, $\hat{y}$ and the side information $\hat{z}$ of the hyperprior 3 are included into a bitstream 2 (are binarized) using arithmetic coding (AE).

Furthermore, a decoder 604 is provided that transforms the quantized latent representation to the reconstructed image $\hat{x}$, $\hat{x}=g(\hat{y})$. The signal $\hat{x}$ is the estimation of the input image x. It is desirable that x is as close to z as possible, in other words the reconstruction quality is as high as possible.

However, the higher the similarity between $\hat{x}$ and x, the higher the amount of side information necessary to be transmitted. The side information includes bitstream1 and bitstream2 shown in FIG. 4, which are generated by the encoder and transmitted to the decoder. Normally, the higher the amount of side information, the higher the reconstruction quality. However, a high amount of side information means that the compression ratio is low. Therefore, one purpose of the system described in FIG. 4 is to balance the reconstruction quality and the amount of side information conveyed in the bitstream.

In FIG. 4 the component AE 605 is the Arithmetic Encoding module, which converts samples of the quantized latent representation $\hat{y}$ and the side information $\hat{z}$ into a binary representation bitstream 1. The samples of $\hat{y}$ and $\hat{z}$ might for example comprise integer or floating point numbers. One purpose of the arithmetic encoding module is to convert (via the process of binarization) the sample values into a string of binary digits (which is then included in the bitstream that may comprise further portions corresponding to the encoded image or further side information).

The arithmetic decoding (AD) 606 is the process of reverting the binarization process, where binary digits are converted back to sample values. The arithmetic decoding is provided by the arithmetic decoding module 606.

It is noted that the present disclosure is not limited to this particular framework. Moreover the present disclosure is not restricted to image or video compression, and can be applied to object detection, image generation, and recognition systems as well.

In FIG. 4 there are two subnetworks concatenated to each other. A subnetwork in this context is a logical division between the parts of the total network. For example in the FIG. 4 the modules 601, 602, 604, 605 and 606 are called the "Encoder/Decoder" subnetwork. The "Encoder/Decoder" subnetwork is responsible for encoding (generating) and decoding (parsing) of the first bitstream "bitstream1". The second network in FIG. 4 comprises modules 603, 608, 609, 610 and 607 and is called "hyper encoder/decoder" subnetwork. The second subnetwork is responsible for generating the second bitstream "bitstream2". The purposes of the two subnetworks are different. The first subnetwork is responsible for:

the transformation 601 of the input image x into its latent representation y (which is easier to compress that x),
quantizing 602 the latent representation y into a quantized latent representation $\hat{y}$, compressing the quantized latent representation $\hat{y}$ using the AE by the arithmetic encoding module 605 to obtain bitstream "bitstream 1",".

Parsing the bitstream 1 via AD using the arithmetic decoding module 606, and reconstructing 604 the reconstructed image ($\hat{x}$) using the parsed data.

The purpose of the second subnetwork is to obtain statistical properties (e.g. mean value, variance and correlations between samples of bitstream 1) of the samples of "bitstream1", such that the compressing of bitstream 1 by first subnetwork is more efficient. The second subnetwork generates a second bitstream "bitstream2", which comprises the said information (e.g. mean value, variance and correlations between samples of bitstream1).

The second network includes an encoding part which comprises transforming 603 of the quantized latent representation $\hat{y}$ into side information z, quantizing the side information z into quantized side information $\hat{z}$, and encoding (e.g. binarizing) 609 the quantized side information $\hat{z}$ into bitstream2. In this example, the binarization is performed by an arithmetic encoding (AE). A decoding part of the second network includes arithmetic decoding (AD) 610, which transforms the input bitstream2 into decoded quantized side information $\hat{z}'$. The $\hat{z}'$ might be identical to $\hat{z}$, since the arithmetic encoding end decoding operations are lossless compression methods. The decoded quantized side information $\hat{z}'$ is then transformed 607 into decoded side information $\hat{y}'$. $\hat{y}'$ represents the statistical properties of $\hat{y}$ (e.g. mean value of samples of $\hat{y}$, or the variance of sample values or like). The decoded latent representation $\hat{y}'$ is then provided to the above-mentioned Arithmetic Encoder 605 and Arithmetic Decoder 606 to control the probability model of $\vec{y}$.

The FIG. 4 describes an example of VAE (variational auto encoder), details of which might be different in different implementations. For example in a specific implementation additional components might be present to more efficiently obtain the statistical properties of the samples of bitstream 1. In one such implementation a context modeler might be present, which targets extracting cross-correlation information of the bitstream 1. The statistical information provided by the second subnetwork might be used by AE (arithmetic encoder) 605 and AD (arithmetic decoder) 606 components.

The FIG. 4 depicts the encoder and decoder in a single figure. As is clear to those skilled in the art, the encoder and the decoder may be, and very often are, embedded in mutually different devices.

Figure 7:
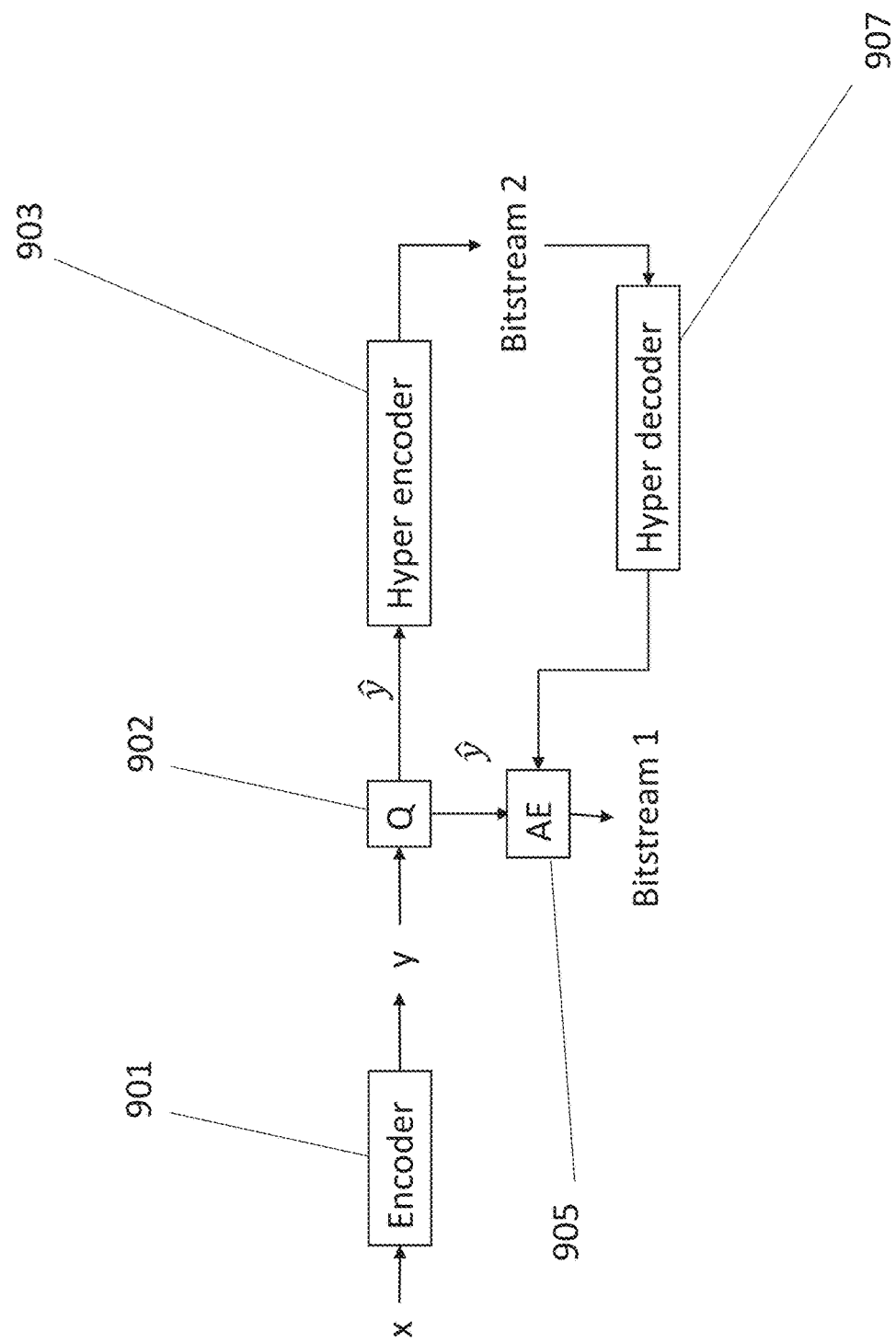
FIG. 7 shows components of an encoder according to FIG. 4 in accordance with one embodiment.
Figure 8:
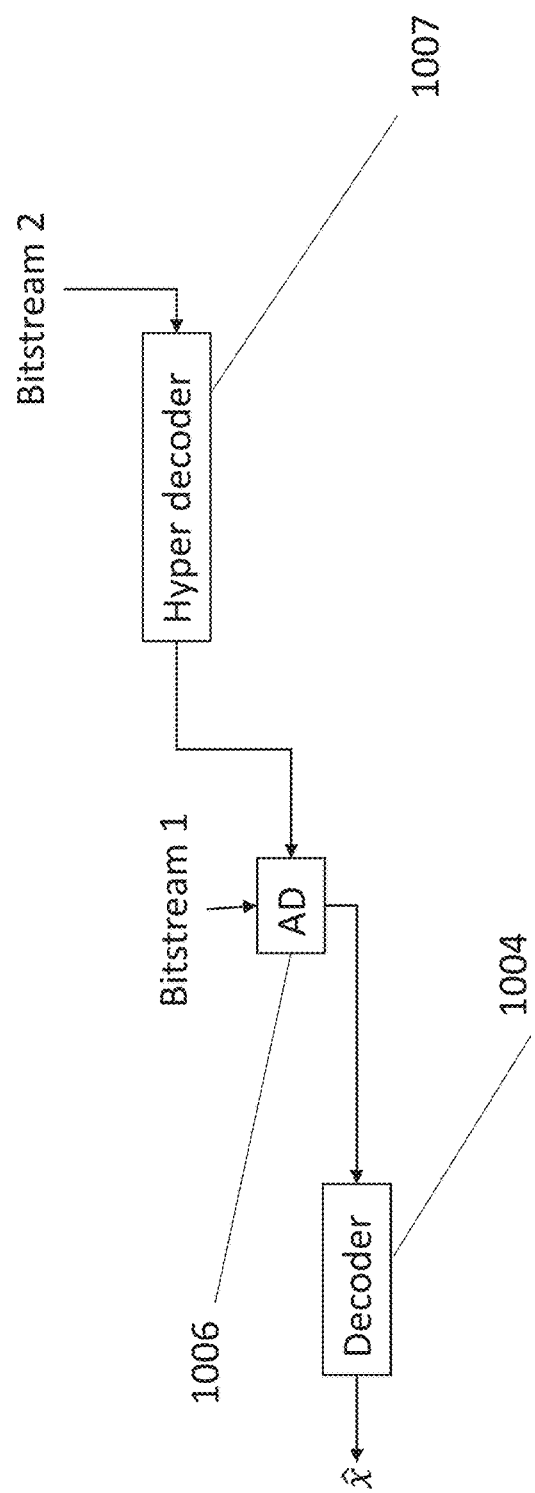
FIG. 8 shows components of a decoder according to FIG. 4 in accordance with one embodiment.

FIG. 7 depicts the encoder and FIG. 8 depicts the decoder components of the VAE framework in isolation. As input, the encoder receives, according to some embodiments, a picture. The input picture may include one or more channels, such as color channels or other kind of channels, e.g. depth channel or motion information channel, or the like. The output of the encoder (as shown in FIG. 7) is a bitstream1 and a bitstream2. The bitstream1 is the output of the first subnetwork of the encoder and the bitstream2 is the output of the second subnetwork of the encoder.

Similarly in FIG. 8, the two bitstreams, bitstream1 and bitstream2, are received as input and $\hat{z}$, which is the reconstructed (decoded) image, is generated at the output.

As indicated above, the VAE can be split into different logical units that perform different actions. This is exemplified in FIGS. 7 and 8 so that FIG. 7 depicts components that participate in the encoding of a signal, like a video and provided encoded information. This encoded information is then received by the decoder components depicted in FIG. 8 for encoding, for example. It is noted that the components of the encoder and decoder denoted with numerals 9xx and 10xx may correspond in their function to the components referred to above in FIG. 4 and denoted with numerals 6xx.

Specifically, as is seen in FIG. 7, the encoder comprises the encoder 901 that transforms an input x into a signal y which is then provided to the quantizer 902. The quantizer 902 provides information to the arithmetic encoding module 905 and the hyper encoder 903. The hyper encoder 903 provides the bitstream2 already discussed above to the hyper decoder 907 that in turn signals information to the arithmetic encoding module 605.

The encoding can make use of a convolution, as will be explained in further detail below with respect to FIG. 19.

The output of the arithmetic encoding module is the bitstream1. The bitstream1 and bitstream2 are the output of the encoding of the signal, which are then provided (transmitted) to the decoding process.

Although the unit 901 is called "encoder", it is also possible to call the complete subnetwork described in FIG. 7 as "encoder". The process of encoding in general means the unit (module) that converts an input to an encoded (e.g. compressed) output. It can be seen from FIG. 7, that the unit 901 can be actually considered as a core of the whole subnetwork, since it performs the conversion of the input x into y, which is the compressed version of the x. The compression in the encoder 901 may be achieved, e.g. by applying a neural network, or in general any processing network with one or more layers. In such network, the compression may be performed by cascaded processing including downsampling which reduces size and/or number of channels of the input. Thus, the encoder may be referred to, e.g. as a neural network (NN) based encoder, or the like.

The remaining parts in the figure (quantization unit, hyper encoder, hyper decoder, arithmetic encoder/decoder) are all parts that either improve the efficiency of the encoding process or are responsible for converting the compressed output y into a series of bits (bitstream). Quantization may be provided to further compress the output of the NN encoder 901 by a lossy compression. The AE 905 in combination with the hyper encoder 903 and hyper decoder 907 used to configure the AE 905 may perform the binarization which may further compress the quantized signal by a lossless compression. Therefore, it is also possible to call the whole subnetwork in FIG. 7 an "encoder".

A majority of Deep Learning (DL) based image/video compression systems reduce dimensionality of the signal before converting the signal into binary digits (bits). In the VAE framework for example, the encoder, which is a non-linear transform, maps the input image x into y, where y has a smaller width and height than x. Since the y has a smaller width and height, hence a smaller size, the (size of the) dimension of the signal is reduced, and, hence, it is easier to compress the signal y. It is noted that in general, the encoder does not necessarily need to reduce the size in both (or in general all) dimensions. Rather, some exemplary implementations may provide an encoder which reduces size only in one (or in general a subset of) dimension.

Figure 5:
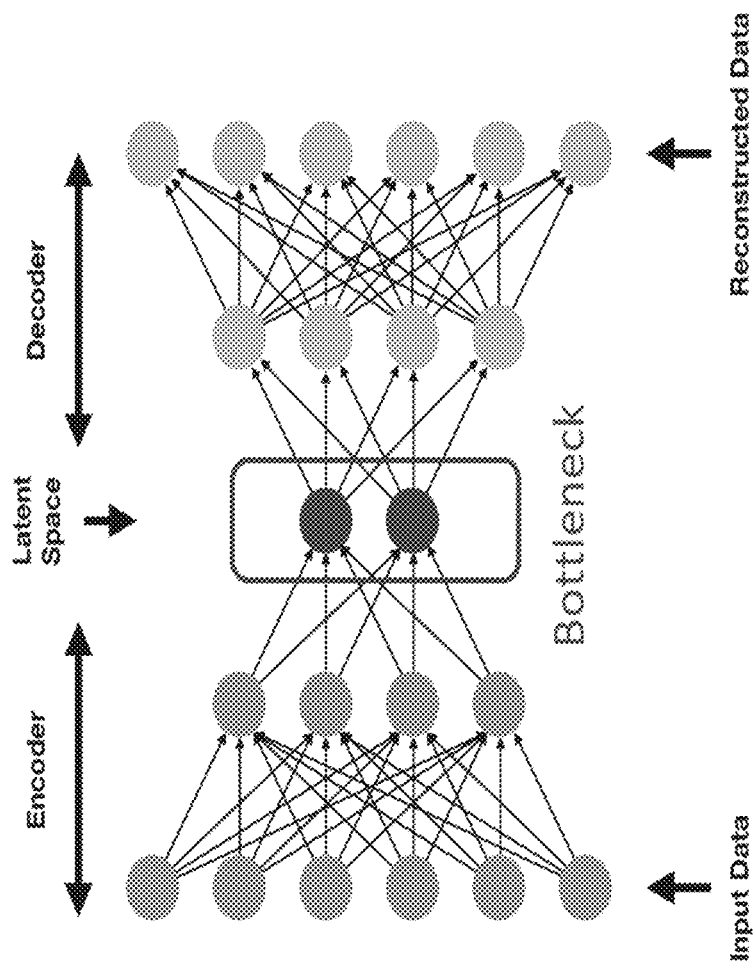
FIG. 5 shows a schematic depiction of encoding and decoding of an input.

The general principle of compression is exemplified in FIG. 5. The latent space, which is the output of the encoder and input of the decoder, represents the compressed data. It is noted that the size of the latent space may be much smaller than the input signal size. Here, the term size may refer to resolution, e.g. to a number of samples of the feature map(s) output by the encoder. The resolution may be given as a product of number of samples per each dimension (e.g. width×height×number of channels of an input image or of a feature map).

The reduction in the size of the input signal is exemplified in the FIG. 5, which represents a deep-learning based encoder and decoder. In the FIG. 5, the input image x corresponds to the input Data, which is the input of the encoder. The transformed signal y corresponds to the Latent Space, which has a smaller dimensionality or size in at least one dimension than the input signal. Each column of circles represent a layer in the processing chain of the encoder or decoder. The number of circles in each layer indicate the size or the dimensionality of the signal at that layer.

One can see from the FIG. 5 that the encoding operation corresponds to a reduction in the size of the input signal, whereas the decoding operation corresponds to a reconstruction of the original size of the image.

One of the methods for reduction of the signal size is downsampling. Downsampling is a process where the sampling rate of the input signal is reduced. For example if the input image has a size of h and w, and the output of the downsampling is h2 and w2, at least one of the following holds true:

$$h2<h$$

$$w2<w$$

The reduction in the signal size usually happens step by step along the chain of processing layers, not all at once. For example if the input image x has dimensions (or size of dimensions) of h and w (indicating the height and the width), and the latent space y has dimensions h/16 and w/16, the reduction of size might happen at 4 layers during the encoding, wherein each layer reduces the size of the signal by a factor of 2 in each dimension.

Some deep learning based video/image compression methods employ multiple downsampling layers. As an example the VAE framework, FIG. 6, utilizes 6 downsampling layers that are marked with 801 to 806. The layers that include downsampling is indicated with the downward arrow in the layer description. The layer description "Cony N×5×5/2↓" means that the layer is a convolution layer, with N channels and the convolution kernel is 5×5 in size. As stated, the 2↓ means that a downsampling with a factor of 2 is performed in this layer. Downsampling by a factor of 2 results in one of the dimensions of the input signal being reduced by half at the output. In FIG. 6, the 2↓ indicates that both width and height of the input image is reduced by a factor of 2. Since there are 6 downsampling layers, if the width and height of the input image 814 (also denoted with x) is given by w and h, the output signal ẑ 813 is has width and height equal to w/64 and h/64 respectively. Modules denoted by AE and AD are arithmetic encoder and arithmetic decoder, which are explained above already with respect to FIGS. 4, 7 and 8. The arithmetic encoder and decoder are specific implementations of entropy coding. AE and AD (as part of the component 813 and 815) can be replaced by other means of entropy coding. In information theory, an entropy encoding is a lossless data compression scheme that is used to convert the values of a symbol into a binary representation which is a revertible process. Also the "Q" in the figure corresponds to the quantization operation that was also referred to above in relation to FIG. 4 and is further explained above in the section "Quantization". Also, the quantization operation and a corresponding quantization unit as part of the component 813 or 815 is not necessarily present and/or can be replaced with another unit.

In FIG. 6, there is also shown the decoder comprising upsampling layers 807 to 812. A further layer 820 is provided between the upsampling layers 811 and 810 in the processing order of an input that is implemented as convolutional layer but does not provide an upsampling to the input received. A corresponding convolutional layer 830 is also shown for the decoder. Such layers can be provided in NNs for performing operations on the input that do not alter the size of the input but change specific characteristics. However, it is not necessary that such a layer is provided.

When seen in the processing order of bitstream2 through the decoder, the upsampling layers are run through in reverse order, i.e. from upsampling layer 812 to upsampling layer 807. Each upsampling layer is shown here to provide an upsampling with an upsampling ratio of 2, which is indicated by the ↑. It is, of course, not necessarily the case that all upsampling layers have the same upsampling ratio and also other upsampling ratios like 3, 4, 8 or the like may be used. The layers 807 to 812 are implemented as convolutional layers (cony). Specifically, as they may be intended to provide an operation on the input that is reverse to that of the encoder, the upsampling layers may apply a deconvolution operation to the input received so that its size is increased by a factor corresponding to the upsampling ratio. However, the present disclosure is not generally limited to deconvolution and the upsampling may be performed in any other manner such as by bilinear interpolation between two neighboring samples, or by nearest neighbor sample copying, or the like.

In the first subnetwork, some convolutional layers (801 to 803) are followed by generalized divisive normalization (GDN) at the encoder side and by the inverse GDN (IGDN) at the decoder side. In the second subnetwork, the activation function applied is ReLu. It is noted that the present disclosure is not limited to such implementation and in general, other activation functions may be used instead of GDN or ReLu.

The image and video compression systems in general cannot process arbitrary input image sizes. The reason is that some of the processing units (such as transform unit, or motion compensation unit) in a compression system operate on a smallest unit, and if the input image size is not integer multiple of the smallest processing unit, it is not possible to process the image.

As an example, HEVC specifies four transform units (TUs) sizes of 4×4, 8×8, 16×16, and 32×32 to code the prediction residual. Since the smallest transform unit size is 4×4, it is not possible to process an input image that has a size of 3×3 using an HEVC encoder and decoder. Similarly if the image size is not a multiple of 4 in one dimension, it is also not possible to process the image, since it is not possible to partition the image into sizes that are processable by the valid transform units (4×4, 8×8, 16×16, and 32×32). Therefore, it is a requirement of the HEVC standard that the input image be a multiple of a minimum coding unit size, which is 8×8. Otherwise the input image is not compressible by HEVC. Similar requirements have been posed by other codecs, too. In order to make use of existing hardware or software, or in order to maintain some interoperability or even portions of the existing codecs, it may be desirable to maintain such limitation. However, the present disclosure is not limited to any particular transform block size.

Some DNN (deep neural network) or NN (neural network) based image and video compression systems utilize multiple downsampling layers. In FIG. 6, for example, four downsampling layers are comprised in the first subnetwork (layers 801 to 804) and two additional downsampling layers are comprised in the second subnetwork (layers 805 to 806). Therefore, if the size of the input image is given by w and h respectively (indicating the width and the height), the output of the first subnetwork is w/16 and h/16, and the output of the second network is given by w/64 and h/64.

The term "deep" in deep neural networks usually refers to the number of processing layers that are applied sequentially to the input. When the number is of the layers is high, the neural network is called a deep neural network, though there is no clear description or guidance on which networks should be called a deep network. Therefore for the purposes of this application there is no major difference between a DNN and an NN. DNN may refer to a NN with more than one layer.

During downsampling, for example in the case of convolutions being applied to the input, fractional (final) sizes for the encoded picture can be obtained in some cases. Such fractional sizes cannot be reasonably processed by a subsequent layer of the neural network or by a decoder.

Stated differently, some downsampling operations (like convolutions) may expect (e.g. by design) that the size of the input to a specific layer of the neural network fulfills specific conditions so that the operations performed within a layer of the neural network performing the downsampling or following the downsampling are still well defined mathematical operations. For example, for a downsampling layer having a downsampling ratio r>1, r∈ℕ that reduces the size of the input in at least one dimension by the ratio r, a reasonable output is obtained if the input has a size in this dimension that is an integer multiple of the downsampling ratio r. The downsampling by r means that the number of input samples in one dimension (e.g. width) or more dimensions (e.g. width and height) is divided by two to obtain number of output samples.

To provide a numeric example, a downsampling ratio of a layer may be 4. A first input has a size 512 in the dimension to which the downsampling is applied. 512 is an integer multiple of 4 because 128×4=512. Processing of the input can thus be performed by the downsampling layer resulting in a reasonable output. A second input may have a size of 513 in the dimension to which the downsampling is applied. 513 is not an integer multiple of 4 and this input can thus not be processed reasonably by the downsampling layer or a subsequent downsampling layer if they are, e.g. by design, expecting certain (e.g. 512) input size. In view of this, in order to ensure that an input can be processed by each layer of the neural network in a reasonable way (in compliance with a predefined layer input size) even if the size of the input is not always the same, a rescaling may be applied before processing the input by the neural network. This rescaling comprises changing or adapting the actual size of the input to the neural network (e.g. to the input layer of the neural network), so that it is fulfilling the above condition with respect to all of the downsampling layers of the neural network. This rescaling is done by increasing or decreasing a size of the input in the dimension to which the downsampling is applied so that the size $S=K\Pi_i r_i$, where $r_i$ are the downsampling ratios of the downsampling layers and K is an integer greater than zero. In other words, the input size of the input picture (signal) in the downsampling direction is adapted to be an integer multiple of a product of all downsampling ratios applied to the input picture (signal) in the network processing chain in the downsampling direction (dimension).

Thereby, the size of the input to the neural network has a size that ensures that each layer can process its respective input, e.g. in compliance with a layer's predefined input size configuration.

By providing such rescaling, however, there are limits to the reduction in the size of a picture that is to be encoded and, correspondingly, the size of the encoded picture that can be provided to a decoder for, for example, reconstructing the encoded information also has a lower limit. Furthermore, with the approaches provided so far, a significant amount of entropy may be added to the bitstream (when increasing its size by the rescaling) or a significant amount of information loss can occur (if reducing the size of the bitstream by the rescaling). Both can have negative influence on the quality of the bitstream after the decoding.

It is, therefore, difficult to obtain high quality of encoded/decoded bitstreams and the data they represent while, at the same time, providing encoded bitstreams with reduced size.

Since the size of the output of a layer in a network cannot be fractional (there needs to be an integer number of rows and columns of samples), there is a restriction in the input image size. In FIG. 6, for ensuring reliable processing, the input image size is an integer multiple of 64 in both horizontal and vertical directions. Otherwise, the output of the second network will not be integer.

In order to solve this problem, it would be possible to use the method of padding the input image with zeros to make it a multiple of 64 samples in each direction. According to this solution the input image size can be extended in width and height by the following amount:

$$w_{diff} = \text{Int}\left(\frac{w+63}{64}\right) \cdot 64 - w$$

$$h_{diff} = \text{Int}\left(\frac{h+63}{64}\right) \cdot 64 - h$$

where "Int" is an integer conversion. The integer conversion may calculate the quotient of a first value a and a second value b and may then provide an output that ignores all fractional digits, thus only being an integer number. The newly generated sample values can be set equal to 0.

The other possibility of solving the issue described above is to crop the input image, i.e. discard rows and columns of samples from ends of the input image, to make the input image size a multiple of 64 samples. The minimum amount of rows and samples that needs to be cropped out can be calculated as follows:

$$w_{diff} = w - \text{Int}\left(\frac{w}{64}\right) \cdot 64$$

$$h_{diff} = h - \text{Int}\left(\frac{h}{64}\right) \cdot 64$$

where $w_{diff}$ and $w_{diff}$ correspond to an amount of sample rows and columns respectively, that need to be discarded from sides of the image.

Using the above, the new size of the input image in horizontal ($h_{new}$) and vertical ($w_{new}$) dimensions is as follows:

In the case of padding:

$$h_{new}=h+h_{diff}$$

$$w_{new}=w+w_{diff}$$

In the case of cropping:

$$h_{new}=h-h_{diff}$$

$$w_{new}=w+w_{diff}$$

Figure 10:
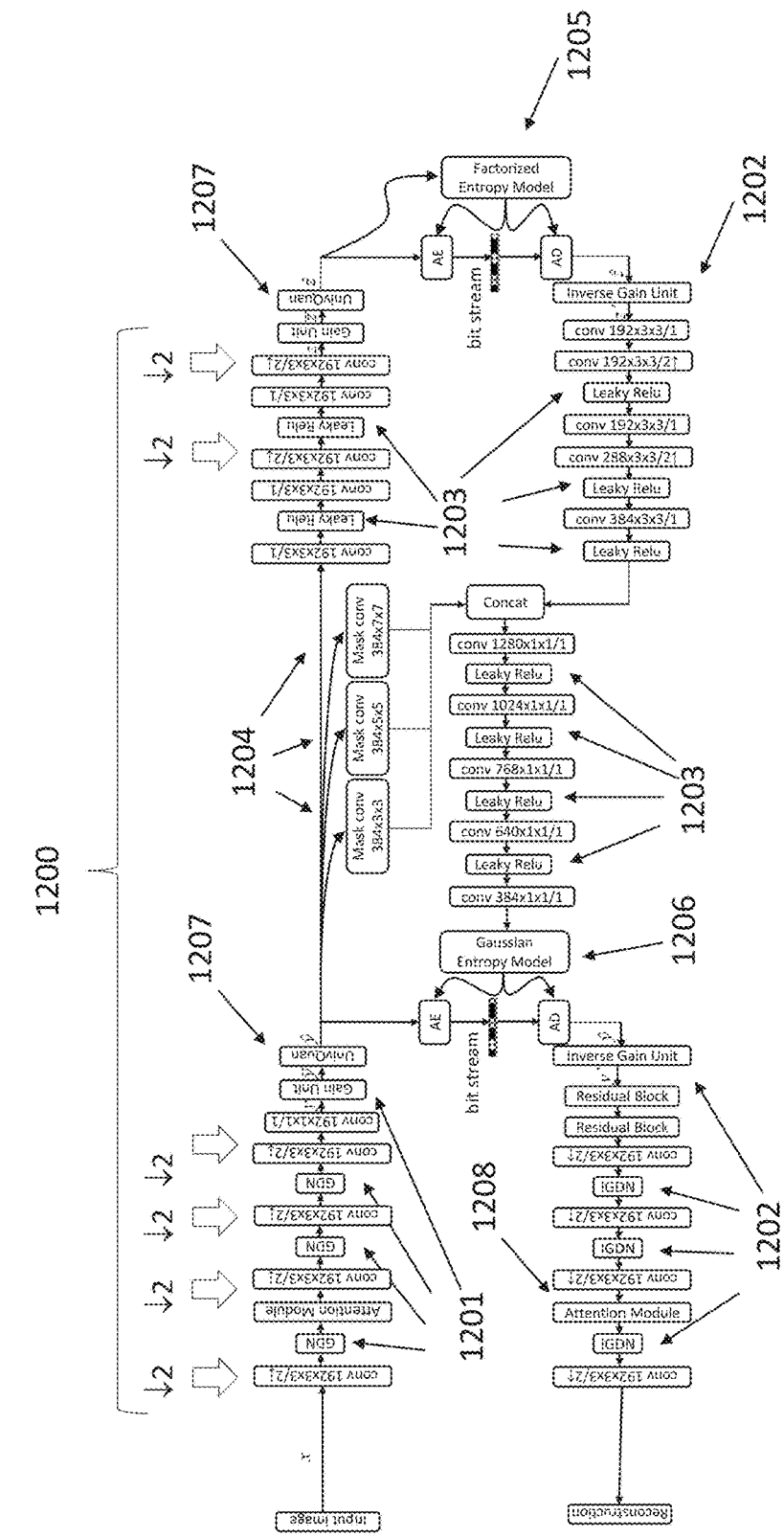
FIG. 10 shows an encoder and a decoder.
Figure 11:
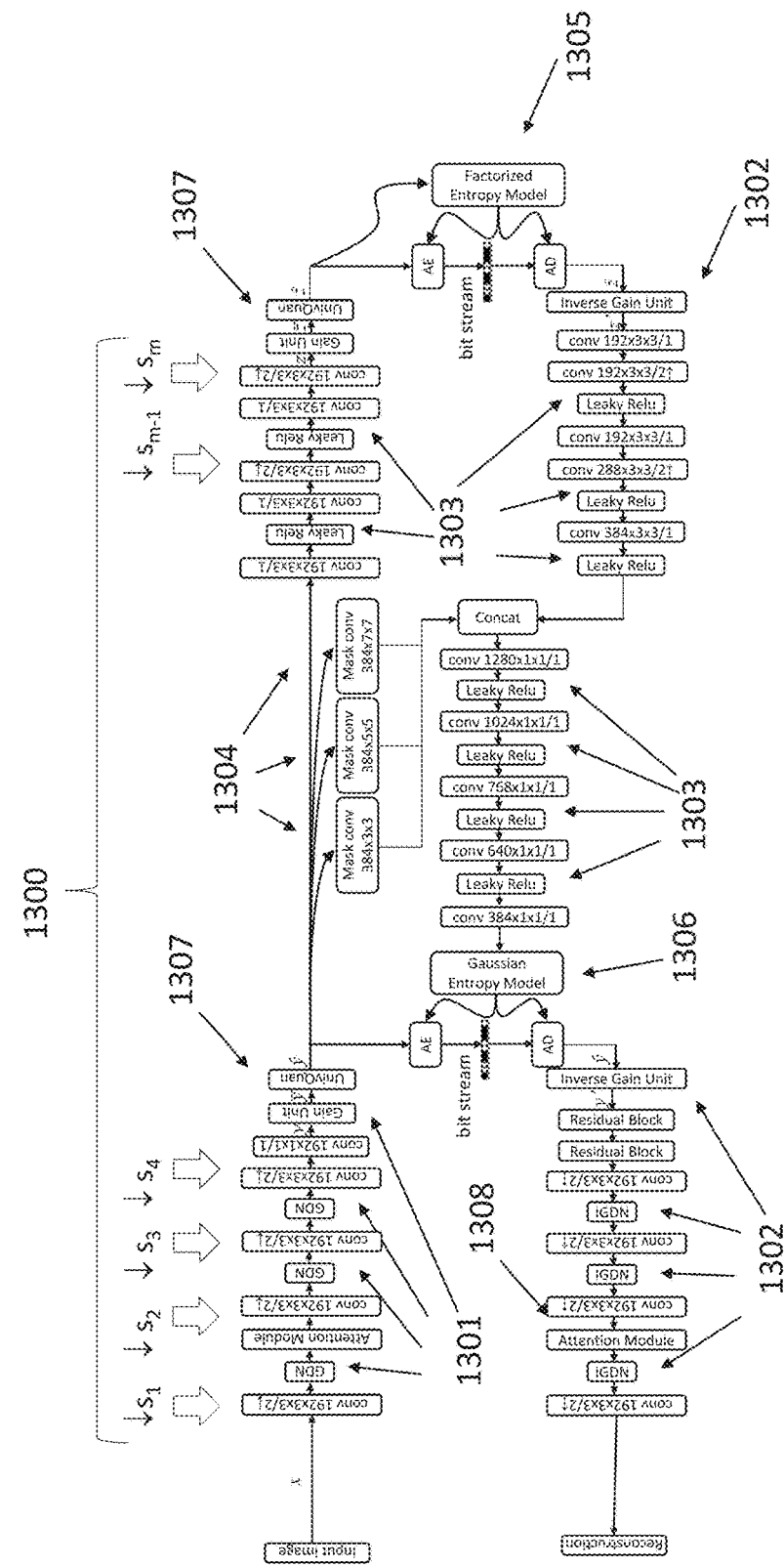
FIG. 11 shows a further encoder and a further decoder.

This is also shown in the FIGS. 10 and 11. In FIG. 10, it is shown that the encoder and the decoder (together denoted with 1200) may comprise a number of downsampling and upsampling layers. Each layer applies a downsampling by a factor of 2 or an upsampling by a factor of 2. Furthermore, the encoder and the decoder can comprise further components, like a generalized divisive normalization (GDN) 1201 at the encoder side and by the inverse GDN (IGDN) 1202 at the decoder side. Furthermore, both the encoder and the decoder may comprise one or more ReLus, specifically, leaky ReLus 1203. There can also be provided a factorized entropy model 1205 at the encoder and a Gaussian entropy model 1206 at the decoder. Moreover, a plurality of convolution masks 1204 may be provided. Moreover, the encoder includes, in the embodiments of FIGS. 10 and 11, a universal quantizer (UnivQuan) 1207 and the decoder comprises an attention module 1208. For ease of reference, functionally corresponding components have corresponding numerals in FIG. 11.

The total number of downsampling operations and strides defines conditions on the input channel size, i.e. the size of the input to the neural network.

Here, if input channel size is an integer multiple of 64=2×2×2×2×2×2, then the channel size remains integer after all proceeding downsampling operations. By applying corresponding upsampling operations in the decoder during the upsampling, and by applying the same rescaling at the end of the processing of the input through the upsampling layers, the output size is again identical to the input size at the encoder.

Thereby, a reliable reconstruction of the original input is obtained.

In FIG. 11, a more general example of what is explained in FIG. 10 is shown. This example also shows an encoder and a decoder, together denoted with 1300. The m downsampling layers (and corresponding upsampling layers) have downsampling ratios $s_i$ and corresponding upsampling ratios. Here, if the input channel size is an integer multiple of $S=\Pi_{i=1}^{m} s_i$, the channel size remains integer after all m proceeding (also referred to as consecutive or subsequent or cascaded) downsampling operations. A corresponding rescaling of the input before processing it by the neural network in the encoder ensures that the above equation is fulfilled. In other words, the input channel size in the downsampling direction is a product of all downsampling ratios applied to the input by the respective m downsampling layers of the (sub-)network.

This mode of changing the size of the input as explained above may still have some drawbacks:

In FIG. 6, the bitstreams indicated by "bitstream 1" and "bitstream 2" have sizes equal to:

$$A\left(\frac{h_{new}}{16}\right)\left(\frac{w_{new}}{16}\right) \text{ and } B\left(\frac{h_{new}}{64}\right)\left(\frac{w_{new}}{64}\right),$$

respectively. A and B are scalar parameters that describe the compression ratio. The higher the compression ratio, the smaller the numbers A and B. The total size of the bitstream is therefore given as $$A\left(\frac{h_{new}}{16}\right)\left(\frac{w_{new}}{16}\right) + B\left(\frac{h_{new}}{64}\right)\left(\frac{w_{new}}{64}\right).$$

Since the goal of the compression is to reduce the size of the bitstream while keeping the quality of the reconstructed image high, it is apparent that the $h_{new}$ and $w_{new}$ should be as small as possible to reduce the bitrate.

Therefore, the problem of "padding with zero" is the increase in the bitrate due to an increase in the input size. In other words, the size of the input image is increased by adding redundant data to the input image, which means that more side information must be transmitted from the encoder to the decoder for reconstruction of the input signal. As a result, the size of the bitstream is increased.

As an example, using the encoder/decoder pair in FIG. 6, if the input image has a size 416×240, which is the image size format commonly known as WQVGA (Wide Quarter Video Graphics Array), the input image must be padded to be equal to size 448×256, which equals a 15% increase in bitrate due to inclusion of redundant data.

The problem with the second approach (cropping of the input image) is the loss of information. Since the goal of compression and decompression is the transmission of the input signal while keeping the fidelity high, it is against the purpose to discard part of the signal. Therefore, cropping is not advantageous unless it is known that there are some parts of the input signal that are unwanted, which is usually not the case.

According to one embodiment, the size adjustment of the input image is performed in front of every downsampling or upsampling layer of the DNN based picture or video compression system. More specifically, if a downsampling layer has a downsampling ratio 2 (input size is halved at the output of the layer), input resizing is applied to the input of the layer if it has an odd number of sample rows or columns and padding is not applied if the number of sample rows or columns are even (multiple of 2).

Additionally, a resizing operation can be applied at the end, e.g. at the output of an upsampling layer, if a corresponding downsampling layer has applied resizing at the (its) input. The corresponding layer of a downsampling layer can be found by counting the number of upsampling layers starting from the reconstructed image and counting the number of downsampling layers starting from the input image. This is exemplified by FIG. 18, wherein upsampling layer 1 and downsampling layer 1 are corresponding layers, and upsampling layer 2 and downsampling layer 2 are corresponding layers and so on.

The resizing operation applied at the input of a downsampling layer and the resizing operation applied at the output of an upsampling layer are complementary, such that the size of the data at the output of both is kept the same.

Figure 9:
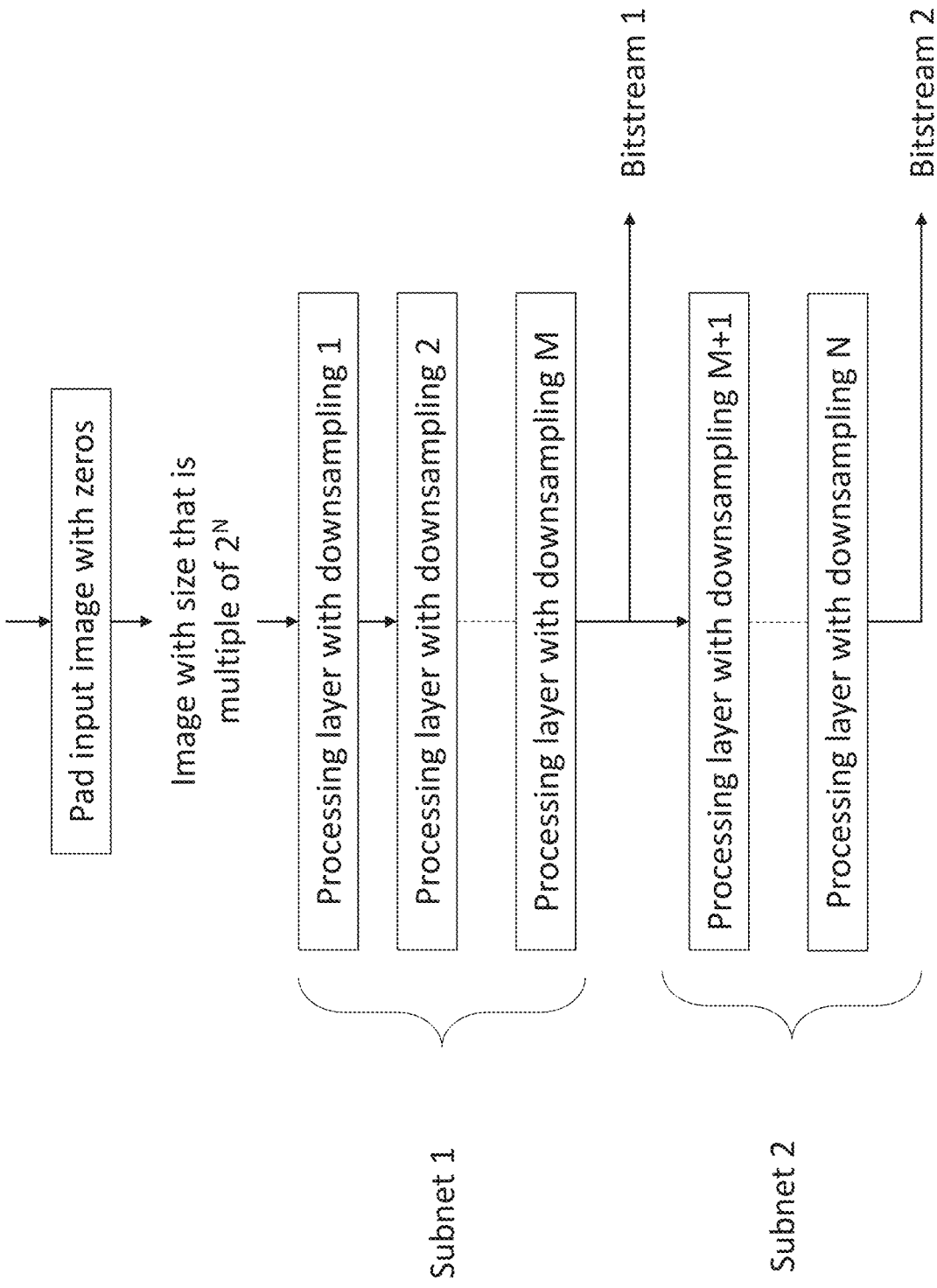
FIG. 9 shows rescaling and processing of an input.

As a result, the increase in the size of the bitstreams is minimized. An exemplary embodiment can be explained with reference to FIG. 12, in contrast with FIG. 9, which describes another approach. In FIG. 9, the resizing of the input is done before the input is provided to the DNN, and is done so that the resized input can be processed through the whole DNN. The example shown in FIG. 9 may be realized (implemented) with the encoder/decoder as described in FIG. 6.

Figure 12:
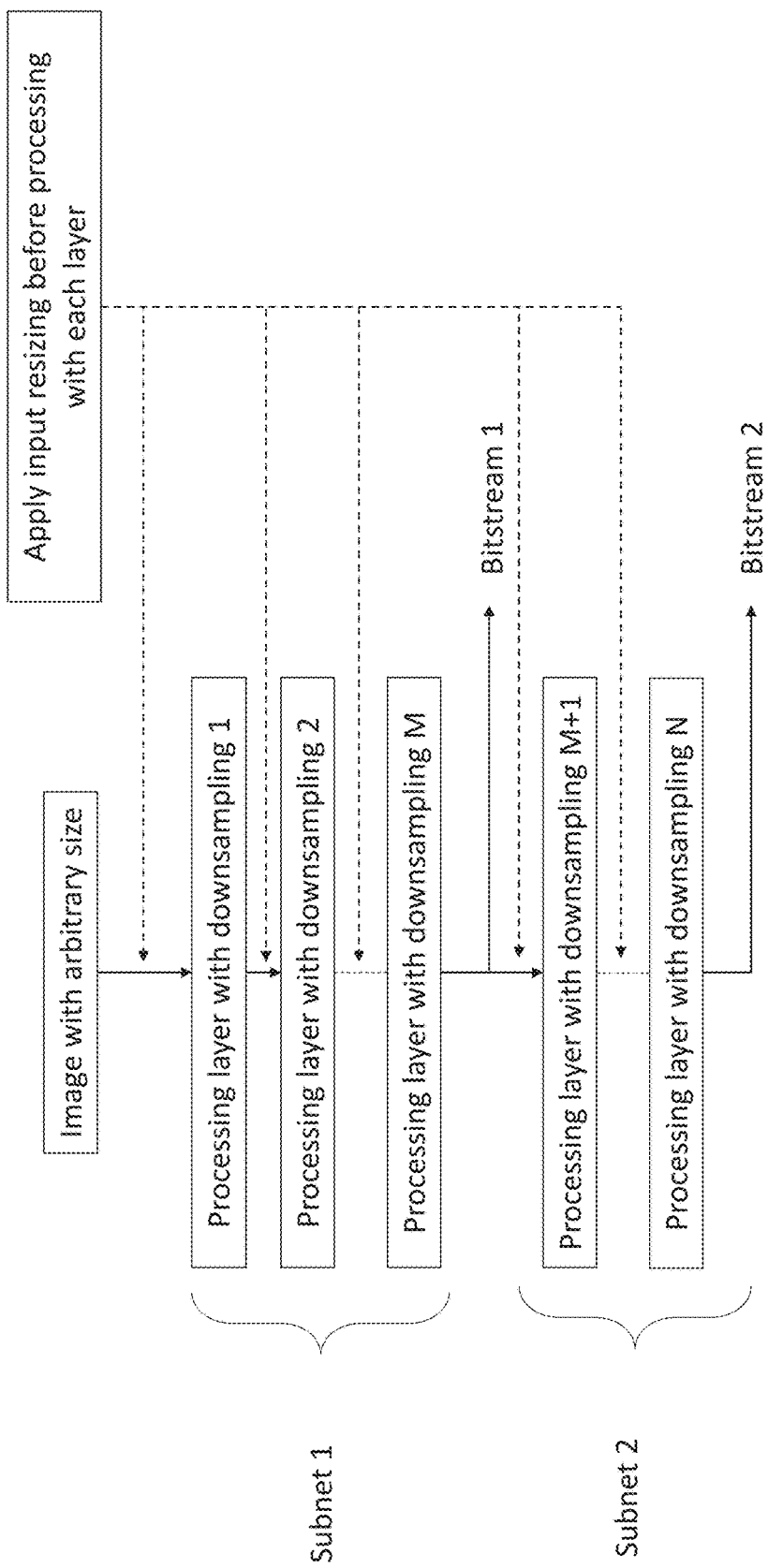
FIG. 12 shows a rescaling and processing of an input in accordance with one embodiment.

In FIG. 12, an input image having an arbitrary size is provided to the neural network. The neural network in this embodiment comprises N downsampling layers, each layer i (1<=i<=N) having a downsampling ratio $r_i$. The "<=" denotes smaller than or equal to. The downsampling ratios $r_i$ are not necessarily the same for different values of i, but, in some embodiments, may be all equal and can, for example, all be $r_i$=r=2. In FIG. 12, the downsampling layers 1 to M are summarized as subnet 1 of downsampling layers. The subnet 1 (subnetwork 1) provides as output the bitstream1. This summarizing of the downsampling layers is, in this context, however, only for descriptive purposes. The second subnet 2 (subnetwork 2), comprising the layers M+1 to N provides as output the bitstream2.

In this embodiment, before an input to a downsampling layer, for example the downsampling layer M, is provided to the downsampling layer, but after it has been processed by the previous downsampling layer (in this case, the layer M−1), the input is resized by applying a resizing operation so that the input to the downsampling layer M has a size $S=nr_M$, $n \in \mathbb{N}$. $r_M$ represents the downsampling ratio of the downsampling layer M and may be a preset value and may thus be already available at the decoder. In this embodiment, this resizing operation is performed before each downsampling layer so that the above condition is fulfilled for the specific downsampling layer and its respective downsampling ratio. In other words, the size S is adapted to or set as to an integer multiple of the downsampling ratio of the following (following the downsampling in the sequence of processing) layer.

In FIG. 9, the input image is padded (which is a form of image resizing) to account for all downsampling layers that are going to process the data one after the other. In FIG. 9, the downsampling ratio is exemplarily selected to be equal to 2 for demonstration purpose. In this case, since there are N layers that perform downsampling with a ratio of 2, the input image size is adjusted by padding (with zeros) to be an integer multiple of $2^N$. It is noted that herein, an integer "multiple" may still be equal to 1, i.e. the multiple has the meaning of multiplication (e.g. by one or more) rather than the meaning of a plurality.

An embodiment is demonstrated in FIG. 12. In the FIG. 12, input resizing is applied in front of each downsampling layer. The input is resized to be an integer multiple of the downsampling ratio of each layer. For example, if the downsampling ratio of a layer is 3:1 (input size:output size), a ratio of 3, the input of the layer is resized to become a multiple of 3.

Some embodiments can be applied to FIG. 6 also. In FIG. 6, there are 6 layers with downsampling, namely the layers 801, 802, 803, 804, 805 and 806. All of the downsampling layers have a factor of 2. According to one embodiment, the input resizing is applied before all 6 layers. In FIG. 6 the resizing is applied also after each layer out of the upsampling layers (807, 808, 809, 810, 811 and 812) in a corresponding manner (which is explained in the above paragraph). This means that a resizing applied before a downsampling layer at a specific order or position in the neural network of the encoder is applied at a corresponding position in the decoder.

In some embodiments, two options for rescaling the input may exist and one of them may be chosen depending, for example, on the circumstance or a condition as will be explained further below. These embodiments are described with reference to FIGS. 13 to 15.

The first option 1501 may comprise padding the input, for example with zeros or redundant information from the input itself in order to increase the size of the input to a size that matches an integer multiple of the downsampling ratio. At the decoder side, in order to rescale, cropping may be used in this option in order to reduce the size of the input to a size that matches, for example, a target input size of the proceeding upsampling layer.

This option can be implemented computationally efficient, but it is only possible to increase the size at the encoder side.

The second option 1502 may utilize interpolation at the encoder and interpolation at the decoder for rescaling/resizing the input. This means, interpolation may be used to increase the size of an input to an intended size, like an integer multiple of the downsampling ratio of a proceeding downsampling layer, or a target input size of a proceeding upsampling layer, or interpolation may be used to decrease the size of the input to an intended size, like an integer multiple of the downsampling ratio of a proceeding downsampling layer, or a target input size of a proceeding upsampling layer. Thereby, it is possible to apply resizing at the encoder by either increasing or decreasing the size of the input. Further, in this option 1502, different interpolation filters may be used, thereby providing spectral characteristics control.

The different options 1501 and 1502 can be signaled, for example in the bitstream as side information. The differentiation between the first option (option 1) 1501 and the second option (option 2) 1502 can be signaled with an indication, such as a syntax element methodIdx, which may take one of two values. For example a first value (e.g. 0) is for indicating padding/cropping, and a second value (e.g. 1) is for indicating interpolation being used for the resizing. For example, a decoder may receive a bitstream encoding a picture and comprising, potentially, side information including an element methodIdx. Upon parsing this bitstream, the side information can be obtained and the value of methodIdx derived. Based on the value of methodIdx, the decoder can then proceed with a corresponding resizing or rescaling method, using padding/cropping if methodIdx has a first value or using interpolation of methodIdx has a second value.

Figure 13:
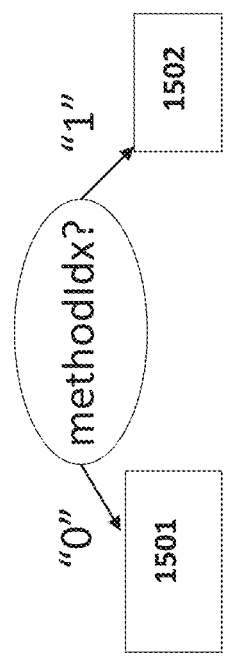
FIG. 13 shows an embodiment of signalling rescaling options according to one embodiment.

This is shown in FIG. 13. Depending on the value of methodIdx being 0 or 1, either clipping (comprising either padding or cropping) or interpolation is chosen.

It is noted that, even though the embodiment of FIG. 13 refers to a selection or decision, based on methodIdx, between clipping (including one of padding/cropping) and interpolation as the methods used for realizing the resizing, the invention is not limited in this regard. The method explained in relation to FIG. 13 can also be realized where the first option 1501 is interpolation to increase the size during the resizing operation and the second option 1502 is interpolation to decrease the size during the resizing operation. Any two or even more (depending on the binary size of methodIdx) different resizing methods as explained above and below can be chosen amongst and can be signaled with methodIdx. In general, the methodIdx does not need to be a separate syntax element. It may be indicated or coded jointly with another one or more parameters.

Figure 14:
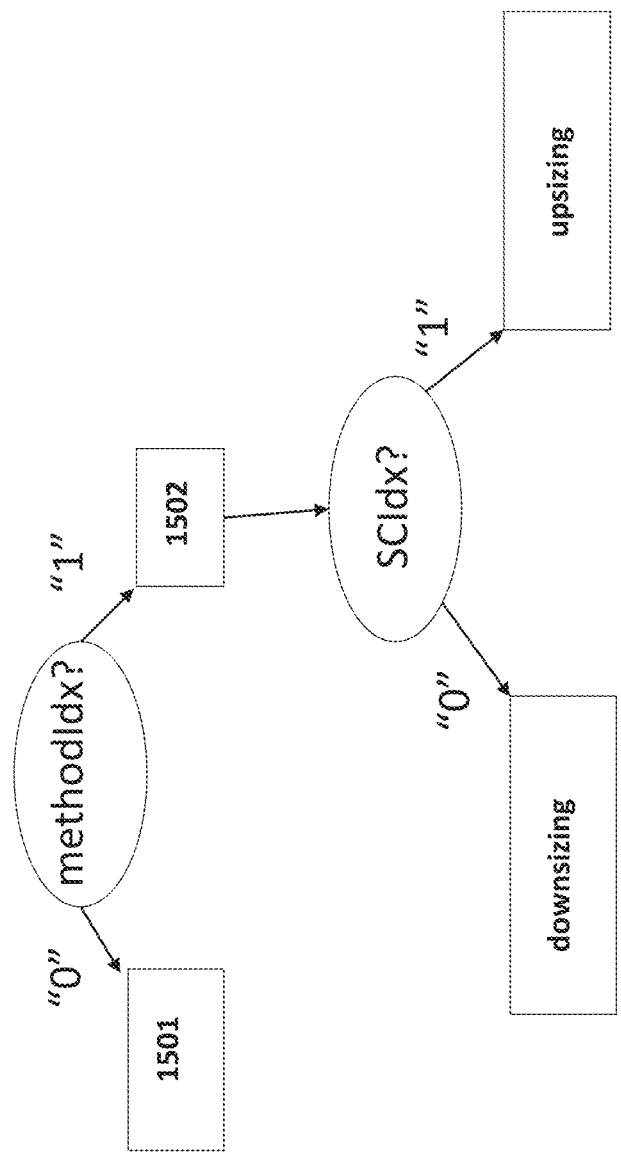
FIG. 14 shows a more specific realization of the embodiment according to FIG. 13.

A further indication or flag may be provided as shown in FIG. 14. In addition to methodIdx, a Size Change flag (1 bit), SCIdx, may be signaled conditionally only for the case of the second option 1502. In the embodiment of FIG. 14, the second option 1502 comprises the use of interpolation for realizing the resizing. In FIG. 14, the second option 1502 is chosen in the case where methodIdx=1. The Size Change Flag, SCIdx, may have a third or fourth value, which may be values of either 0 (e.g. for the third value) or 1 (e.g. for the fourth value). In this embodiment, "0" may indicate downsizing and "1" may indicate upsizing. If SCIdx is thus 0, the interpolation for realizing the resizing will be done in a way so that the size of the input is decreased. If SCIdx is 1, the interpolation for realizing the resizing may be done so as to increase the size of the input. The conditional coding of the SCIdx may provide for a more concise and efficient syntax. However, the present disclosure is not limited by such conditional syntax and SCIdx may be indicated independently of the methodIdx or indicated (coded) jointly with the methodIdx (e.g. within a common syntax element that may be capable of taking only a subset of values out of values indicating all combinations of SCIdx and methodIdx).

Like for the indication methodIdx, also SCIdx may be obtained by a decoder by parsing a bitstream that potentially also decodes the picture to be reconstructed. Upon obtaining the value for SCIdx, downsizing or upsizing may be chosen.

Figure 15:
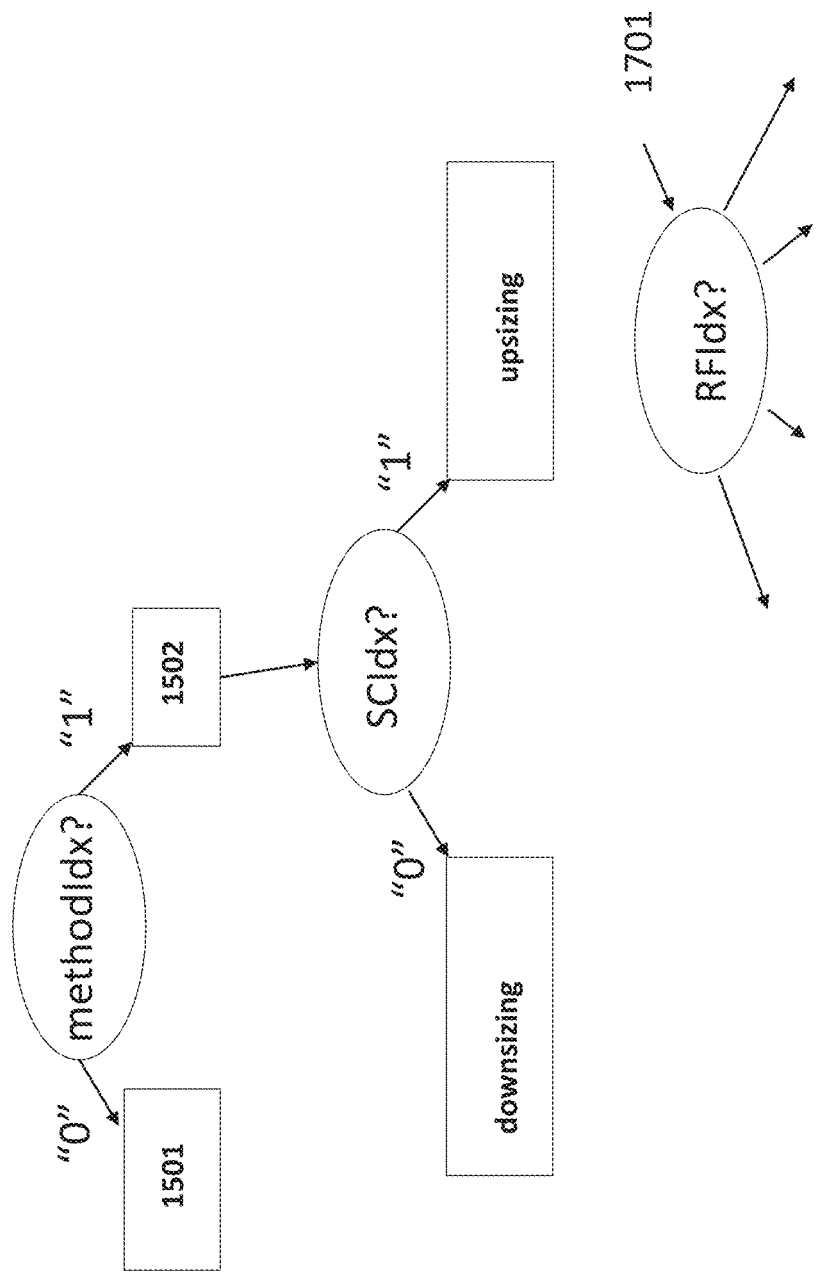
FIG. 15 shows a more specific realization of the embodiment according to FIG. 14.

In addition or alternatively to the above described indications, as shown in FIG. 15, an additional (side) indication for Resizing Filter Index, RFIdx, may be signaled (indicated within the bitstream).

In some exemplary implementations, the RFIdx may be indicated conditionally for the second option 1502, which may comprise that RFIdx is signaled if methodIdx=1 and not signaled if methodIdx=0. The RFIdx may have a size of more than one bit and may signal, for example, depending on its value, which interpolation filter is used in the interpolation for realizing the resizing. Alternatively or additionally, RFIdx may specify the filter coefficients from the plurality of interpolation filters. This may be, for instance, Bilinear, Bicubic, Lanczos3, Lanczos5, Lanczos8 among others.

As indicated above, at least one of methodIdx, SCIdx and RFIdx or all of them or at least two of them may be provided in a bitstream which may be the bitstream that also encodes the picture to be reconstructed or that is an additional bitstream. A decoder may then parse the respective bitstream and obtain the value of methodIdx and/or SCIdx and/or RFIdx. Depending on the values, actions as indicated above may be taken.

The filter used for the interpolation for realizing the resizing can, for example be determined by the scaling ratio.

As indicated in the lower right of FIG. 15 with item 1701, the values of RFIdx may be explicitly signaled. Alternatively or additionally, RFIdx may be obtained from a lookup-table so that RFIdx=LUT(SCIdx).

In another example there might be 2 lookup tables, one for the case of upsizing and one for the case of downsizing. In this case LUT1(SCIdx) might indicate the resizing filter when downsizing is selected, and LUT2(SCIdx) might indicate the resizing filter for the upsizing case.

In general, the present disclosure is not limited to any particular way of signaling for RFIdx. It may be individual and independent from other elements or jointly signaled.

Figure 16:
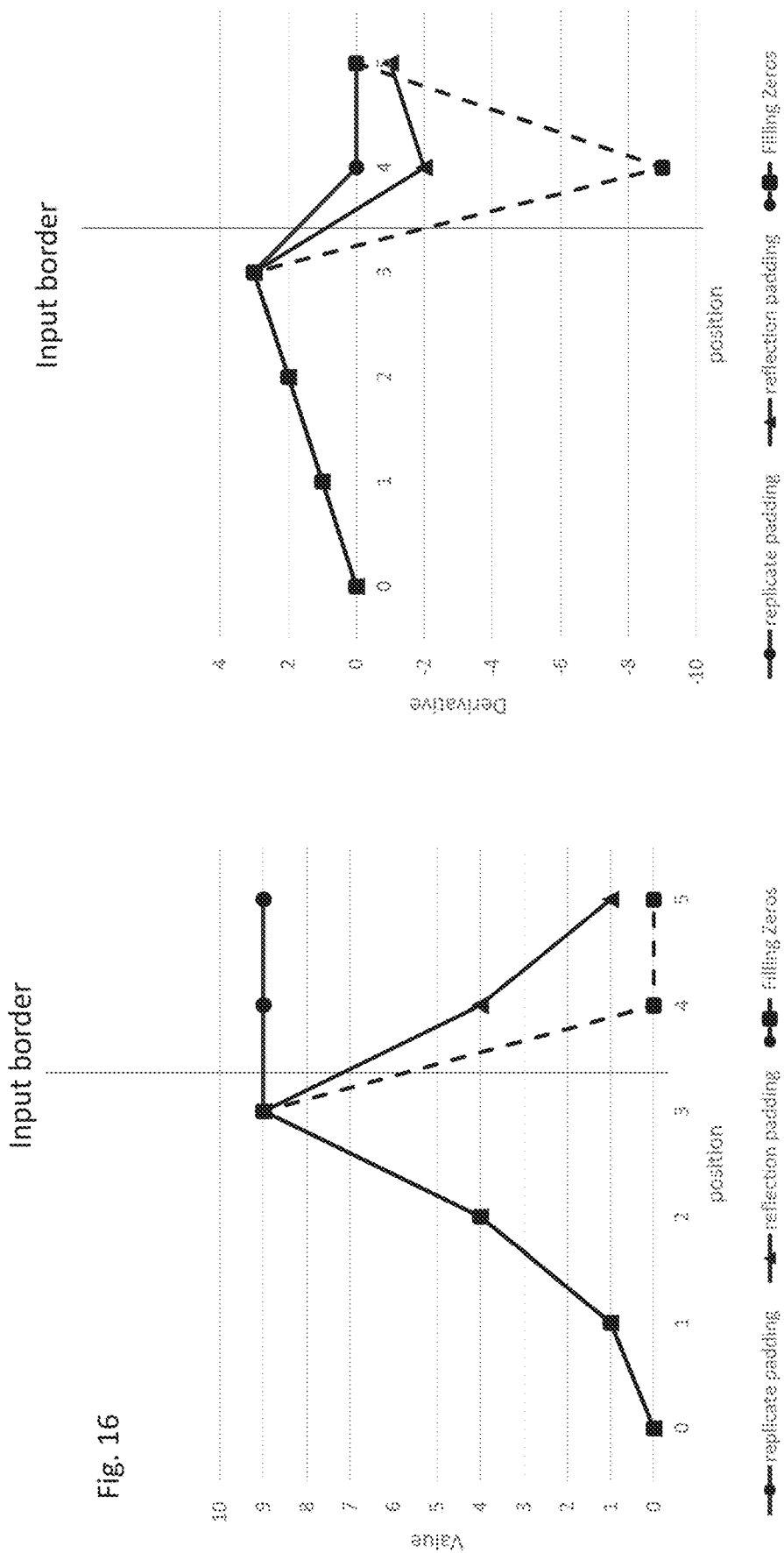
FIG. 16 shows a comparison of different possibilities of padding operations.

FIGS. 16 and 17 show some examples of resizing methods. In the FIGS. 16 and 17, 3 different kinds of padding operations and their performance are depicted. The horizontal axis in the diagrams shown indicates the sample position. The vertical axis indicates the value of the respective sample.

It is noted that the explanations that follow are only exemplary and are not intended to limit the invention to specific kinds of padding operations. The straight vertical line indicates the border of the input (a picture, according to embodiments), right hand side of the border are the sample positions where the padding operation is applied to generate new samples. These parts are also referred below as "unavailable portions" which means that these do not exist in the original input but are added by means of padding during the rescaling operation for the further processing. The left side of the input border line represents the samples that are available and are part of the input. The three padding methods depicted in the figure are replication padding, reflection padding and filling with zeros. In the case of a downsampling operation that is to be performed in line with some embodiments, the input to the downsampling layer of the NN will be the padded information, i.e. the original input extended by the applied padding.

In the FIG. 16, the positions (i.e. sample positions) that are unavailable and that may be filled by padding are positions 4 and 5. In the case of padding with zeros, the unavailable positions are filled with samples with value 0. In the case of reflection padding, the sample value at position 4 is set equal to sample value at position 2; the value at position 5 is set equal to value at position 1. In other words, reflection padding is equivalent to mirroring the available samples at position 3, which is the last available sample at the input boundary. In the case of replication padding, the sample value at position 3 is copied to positions 4 and 5. Different padding types might be preferred for different applications.

Specifically, the padding type that is applied may depend on task to be performed. For example:

The padding or filling with zeros can be reasonable to be used for Computer Vision (CV) tasks such as recognition or detection tasks. Thereby, no information is added in order not to change the amount/value/importance of information already existing in the original input.

Reflection padding may be a computationally easy approach because the added values only need to be copied from existing values along a defined "reflection line" (i.e. the border of the original input).

The repetition padding (also referred to as repetition padding) may be preferred for compression tasks with Convolution Layers because most sample values and derivative continuity is reserved. The derivatives of the samples (including available and padded samples) are described on the right hand side of FIGS. 16 and 17. For example in the case of reflection padding, the derivate of the signal exhibits an abrupt change at position 4, (a value of −9 is attained at this position for the exemplary values shown in the figures). Since signals that are smooth (signals with small derivative) are easier to compress, it might be undesirable to use reflection padding in the case of video compression tasks.

In the examples shown, the replication padding has the smallest change in the derivatives. This is advantageous in view of video compression tasks but results in more redundant information being added at the border. With this, the information at the border may become more weight than intended for other tasks and, therefore, in some implementations, the overall performance of padding with zeros may supersede reflection padding.

Figure 18:
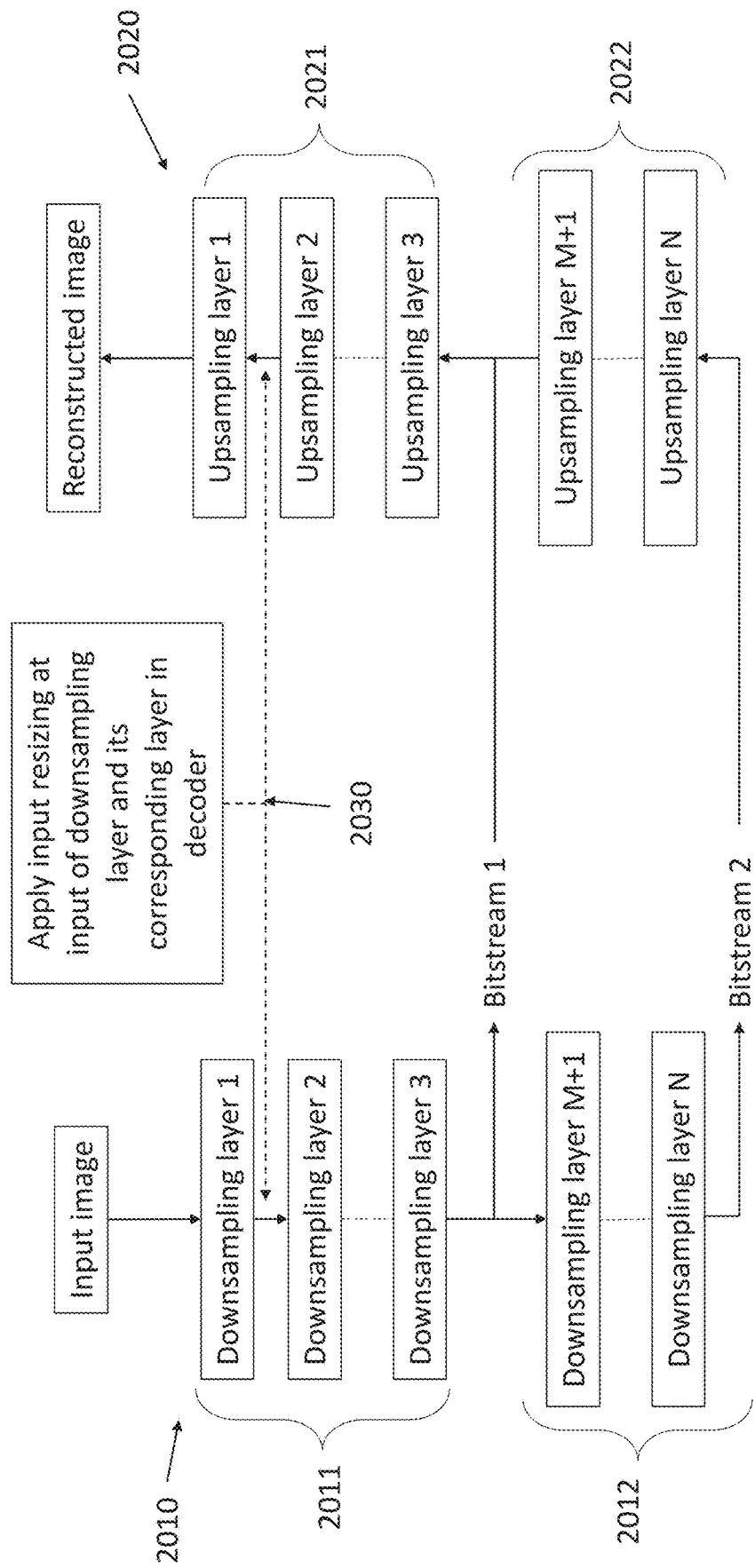
FIG. 18 shows an encoder and a decoder and the relationship in the processing of input to the encoder and the decoder in line with one embodiment.

FIG. 18 shows a further embodiment. Here the encoder 2010 and the decoder 2020 are shown side by side. In the depicted embodiment, the encoder comprises a plurality of downsampling layers 1 to N. The downsampling layers can be grouped together or form part of subnetworks 2011 and 2012 of the neural network within the encoder 2010. These subnetworks can, for example, be responsible for providing specific bitstreams 1 and 2 that may be provided to the decoder 2020. In this sense, the subnetworks of downsampling layers of the encoder may form a logical unit that cannot reasonably be separated. As shown in the FIG. 18, the first subnet 2011 of the encoder 2020 comprises downsampling layers 1 to 3, each having its respective downsampling ratio. The second subnetwork 2012 comprises the downsampling layers M to N with respective downsampling ratios.

The decoder 2020 has a corresponding structure of the upsampling layers 1 to N. One subnetwork 2022 of the decoder 2020 comprises the upsampling layers N to M and the other subnetwork 2021 comprises the upsampling layers 3 to 1 (here, in descending order so as to bring the numbering in line with the decoder when seen in the processing order of the respective input).

As indicated above, the rescaling applied to the input before the downsampling layer 2 of the encoder is correspondingly applied to the output of the upsampling layer 2. This means the size of the input to the downsampling layer 2 is the same as the size of the output of the upsampling layer 2, as indicated above.

More generally, the rescaling applied to the input of a downsampling layer n of the encoder corresponds to the rescaling applied to the output of the upsampling layer n so that the size of the rescaled input is the same as the size of the rescaled output.

In the description that follows with respect to FIGS. 19 to 23, some further embodiments will be explained in more detail. The embodiments described below are intended to combine with any of the above embodiments, specifically as regards the FIGS. 12 to 15 and 18 for the specific use of neural networks in encoding and decoding. Further, the specific modes of signaling which mode of rescaling is to be taken, as explained in the FIGS. 13 to 15 may be combined with the teaching below to provide to a decoder, for example in a bitstream encoding a picture, information on the necessary rescaling or providing, in addition to the picture, information on the rescaling that is to be applied when encoding the picture to a bitstream. Also, the embodiments described below may be implemented using any of the systems and methods described in relation to FIGS. 1 to 3 or they may be implemented as part of the systems and methods described in these figures.

Figure 19:
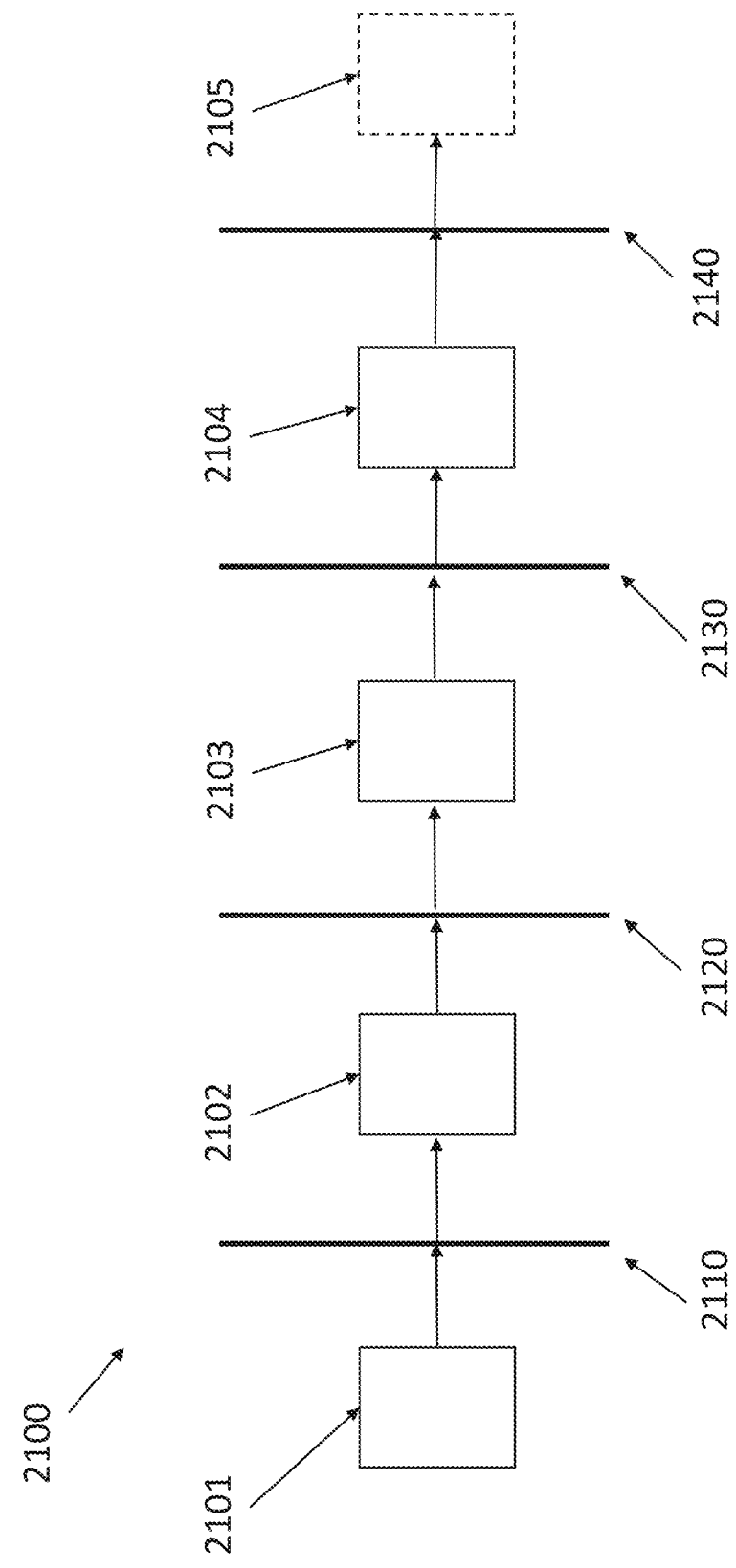
FIG. 19 sows a schematic depiction of an encoder according to one embodiment.
Figure 20:
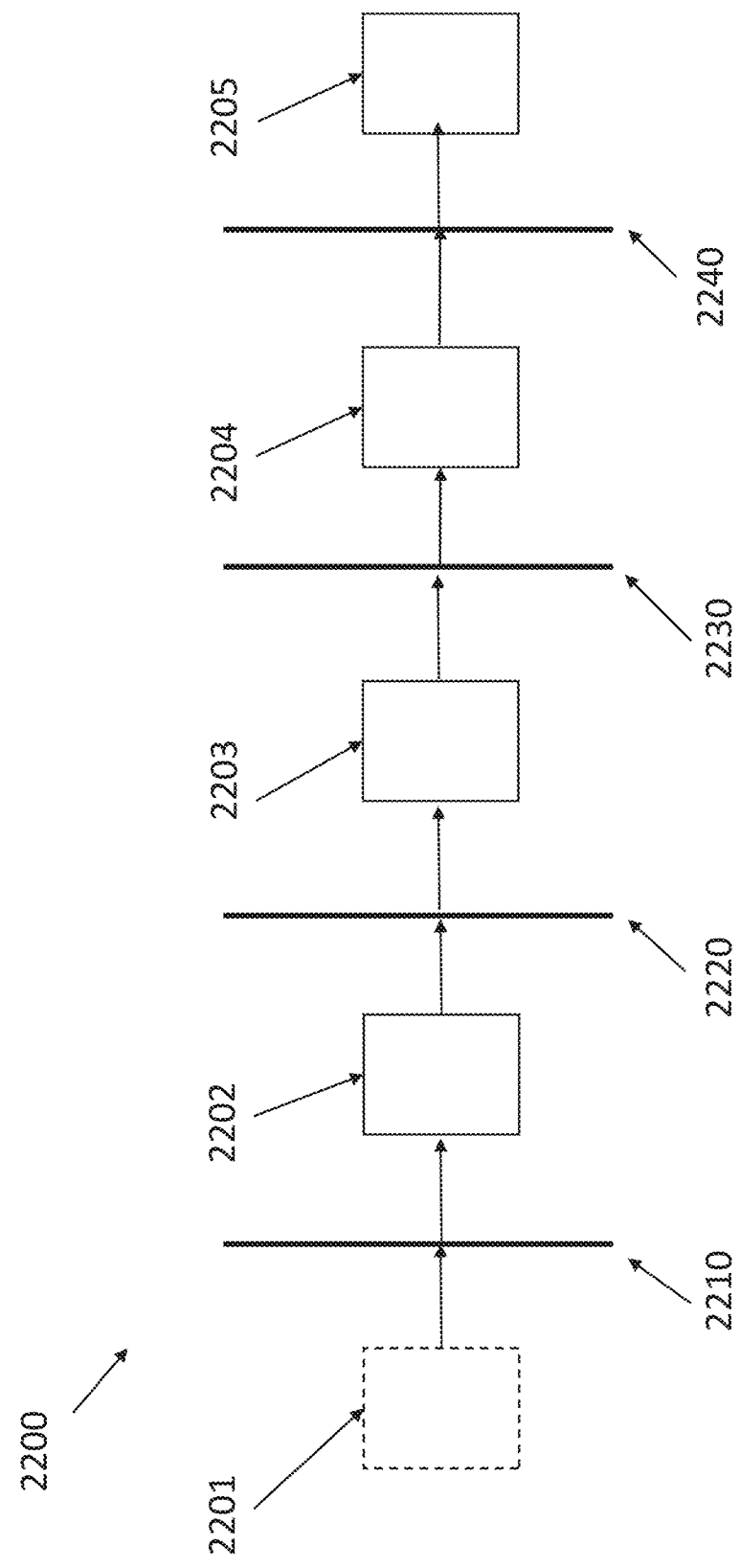
FIG. 20 sows a schematic depiction of a decoder according to one embodiment.

FIGS. 19 and 20 show exemplary embodiments of an encoder (FIG. 19) and a decoder (FIG. 20) that may be used for some embodiments. Specific embodiments of an encoder and a decoder have already been explained above with reference to FIGS. 1 to 3 and FIGS. 4 and 6 to 8. The respective embodiments are intended to be encompassed in the description that follows. This means that all components and functionalities described with respect to FIGS. 1 to 3 and FIGS. 4 and 6 to 8 as well as 10 and 11 may also be provided to the decoder of FIG. 20 and the encoder of FIG. 19, even if not explicitly referred to below.

Before going into detail with respect to the structure of the encoder and the decoder, it is to be noted that the description below is not intended to restrict the invention to a specific realization of an encoder or a decoder. Further, each of them can be implemented by either using software that interacts with general-purpose hardware to realize the functionalities of the encoder/decoder or by using specifically adapted hardware that, by virtue of its structure, realizes the functionality of the encoder/decoder. Further, also combinations thereof are possible.

Furthermore, the description that follows focusses on neural networks provided on the encoder and the decoder. However, the encoder/decoder may also comprise further components, like parsing unit(s), interpreter(s), encryption unit(s), decryption unit(s), receiving unit(s) for receiving a picture or other data, output unit(s) for outputting data and/or bitstreams.

A parsing unit may be realized as a parser known to the skilled person. A receiving unit may be implemented as an antenna or receiver or may comprise the same, as is known to the skilled person. Also the output unit may be implemented as a transmitter or an antenna or may comprise the same. Furthermore, the receiving unit and the output unit may be implemented as a single component, for example as a transceiver.

Beginning with FIG. 19, components of an encoder 2100 are shown schematically.

In this embodiment, the encoder comprises a neural network comprising a plurality of layers 2110, 2120, 2130 and 2140.

Each of these layers is preferably adapted to process an input 2101, 2102, 2103, 2104 to the respective layer of the neural network in a specific way. In FIG. 19, the input 2101 is the input to the neural network, i.e. no preceding layer of the neural network has processed the input. According to some embodiments, the input to the neural network is a picture. The picture may be a still picture or a moving picture or portions of the same. The input is not necessarily the picture as such, but may be provided in the form of an appropriate data structure representing the picture. For example, the picture may be provided in the form of a plurality of samples that can be handled like a matrix having a height and a width and each entry of the matrix representing a value of a corresponding sample.

The output 2105 is shown here as final output of the neural network. In this regard, the invention is not limited to the input not being pre-processed, for example, parsed, decrypted or the like. Also, the output may experience some further processing like encrypting. Generally, the output 2105 may be referred to as a bitstream or an encoded bitstream. It is or comprises a representation of the input picture.

Furthermore, in the context of FIG. 19, the encoder 2100 is not limited to comprising only four layers of a neural network but an arbitrary number of layers may be provided for the neural network for processing respective inputs.

The picture may, for example, represent a single picture or picture file or a moving picture or moving picture file, like a video file or any other information that can be represented by a matrix having two dimensions that may be denoted for example as height H and width W.

According to one embodiment, the encoder comprises at least one layer within the plurality of layers of the neural network that is adapted to apply a downsampling to an input that has been received. The input is not necessarily the original picture but may also be an output of a preceding layer of the neural network that already applied some modification to the picture or it may be the output of a pre-processor that pre-processed the picture.

Such a downsampling can be used to encode a picture. By this downsampling, the size of the picture is reduced by reducing, for example, the size of the matrix that the bitstream actually represents.

For example, a picture having a resolution of 1024×512 pixels may be exemplarily considered. For ease of explanation, it is further assumed that this picture may only provide one (color channel) so that it is a gray-scale picture, thus comprising a single color (intensity) value for each pixel making 1024×512 points within the two-dimensional matrix. By applying a downsampling according to one embodiment, the size of this matrix is reduced by a factor of 2 in at least one of the two dimensions, resulting for example in a downsampled image with a size of 512×256 pixels. This may be achieved by providing the at least one downsampling layer in the plurality of layers of the neural network as convolution that applies a convolution to the received input. In another example, downsampling may be implemented by retaining every n-th sample of the input in one dimension and discarding the n−1 samples of the every n samples.

The downsampling operation might be applied one or more times, which means that the downsampled intermediate image with size 512×256 can be further downsampled by a factor of 2 in both dimensions, resulting in an output size of 256×128. The purpose of downsampling is to discard the samples that are highly correlated with each other, therefore increasing the compressibility of the image. In a natural image, the values of neighboring samples usually are very similar. For example one pixel sample of an image of a blue sky is very similar to the next pixel sample (both are blue, maybe a slight change in the shade is possible). This means that values of neighboring samples of an image are very correlated and if one knows the value of one sample, he can make a very good guess about the value of the neighboring sample. The downsampling operation targets eliminating such redundancies and therefore making the image more compressible by discarding redundant information. The size of the eventual coded bitstream depends on how much redundant information is included, therefore the fewer the redundant information, the smaller the bitstream size.

In the example above, if the NN has a total of 2 downsampling layers each having a downsampling ratio of 2 (along with other processing layers that do not perform downsampling), and if the size of the input image is 1024×512, no problem is observed. Since after two downsampling operations the resulting downsampled output is 256×128. However if the input had a size of 1024×511, it would not be possible to process the input with the NN, since after the first downsampling layer the expected size of the intermediate output is 512×255.5, which is not an integer number and it is not possible to have a partial pixel sample. This means that the NN in the example is not capable of processing input images that are not multiple of 4×4.

The problem has been exemplified above for a small number of downsampling layers (e.g. 2). However image compression is a complicated task (since the image is a signal that has a huge amount of dimensionality), and usually deep neural networks are necessary to perform this task. This means that typically the number of downsampling layers comprised by the NN is more or even much more than 2. This increases the problem, since for example if the number of downsampling layers is 6 (each with a downsampling ratio of 2), the NN would be capable to process only input sizes that are multiple of $2^6 \times 2^6 = 64 \times 64$. Most of the images obtained by different end user devices do not satisfy this requirement.

Such a convolution comprises the element-wise multiplication of entries in the original matrix of the input (in this case, a matrix with 1024×512 entries, the entries being denoted with $M_{ij}$) with a kernel K that is run (shifted) over this matrix and has a size that is typically smaller than the size of the input. The convolution operation of 2 discrete variables can be described as:

$$(f*g)[n] = \sum_{m \in K} f[m]g[n-m]$$

Therefore, calculation of the function $(f*g)[n]$ for all possible values of n is equivalent to running (shifting) the kernel or filter f[ ] over the input array g[ ] and performing element-wise multiplication at each shifted position.

In the above example, the kernel K would be a 2×2 matrix that is run over the input by a stepping range of 2 so that the first entry $D_{11}$ in the downsampled bitstream D is obtained by multiplying the kernel K with the entries $M_{11}$, $M_{12}$, $M_{21}$, $M_{22}$. The next entry $D_{12}$ in the horizontal direction would then be obtained by calculating the inner product of the kernel with the entries or the reduced matrix with the entries $M_{13}$, $M_{14}$, $M_{23}$, $M_{24}$. In the vertical direction, this will be performed correspondingly so that, in the end, a matrix D is obtained that has entries $D_{ij}$ obtained from calculating the respective inner products of M with K and has only half as many entries per direction or dimension.

In other words the shifting amount, which is used to obtain the convolution output determines the downsampling ratio. If the kernel is shifted 2 samples between each computation steps, the output is downsampled by a factor of 2. The downsampling ratio of 2 can be expressed in the above formula as follows:

$$(f*g)[n] = \sum_{m \in K} f[m]g[(2n)-m]$$

The transposed convolution operation can be expressed mathematically in a same manner as a convolution operation. The term "transposed" corresponds to the fact that the said transposed convolution operation corresponds to inverting of a specific convolution operation. However implementation-wise, the transposed convolution operation can be implemented similarly by using the formula above. An upsampling operation by using a transposed convolution can be implemented by using the function:

$$(f*g)[n] = \sum_{m \in K} f[m]g[\text{int}(n/u) - m]$$

In the above formula the u corresponds to the upsampling ratio, and int( ) function corresponds to conversion to an integer. The int( ) operation for example can be implemented as a rounding operation.

In the above formula, the values m and n can be scalar indices when the convolution kernel or filter f( ) and the input variable array g( ) are one dimensional arrays. They can also be understood as multiple dimensional indices when the kernel and the input array are multi-dimensional.

The invention is not limited to downsampling or upsampling via convolution and deconvolution. Any possible way of downsampling or upsampling can be implemented in the layers of a neural network, NN.

This process (downsampling) can be repeated if more than one downsampling layer is provided within the neural network to reduce the size even further. Thereby, an encoded bitstream 2105 can be provided as output from the neural network according to FIG. 19. This repeated downsampling can be implemented in encoders as discussed in FIGS. 6, 10 and 11.

The encoder and specifically the layers of the neural network are not limited to merely comprising downsampling layers that apply a convolution but also other downsampling layers can be thought of that not necessarily apply a convolution that obtains the reduction in the size of the input.

Furthermore, the layers of the neural network can comprise further units that perform other operations on the respective input and/or output of their corresponding layer of the neural network. For example, the layer 2120 of the neural network may comprise a downsampling layer and, in the processing order of an input to this layer before the downsampling, there may be provided a rectifying linear unit (ReLu) and/or a batch normalizer.

Rectifying linear units are known to apply a rectification to the entries Pi of a matrix P so as to obtain modified entries $P'_{ij}$ in the form $$P'_{ij} = \begin{cases} 0 & \forall P_{ij} \leq 0 \\ P_{ij} & \forall P_{ij} > 0 \end{cases}$$

Thereby, it is ensured that values in the modified matrix are all equal or greater than 0. This may be necessary or advantageous for some applications.

The batch normalizer is known to normalize the values of a matrix by firstly calculating a mean value from the entries $P_{ij}$ of a matrix P having a size M×N in the form of $$V = \frac{\sum_{ij} P_{ij}}{N \cdot M}.$$

With this mean value V, batch normalized matrix P' with the entries P'$_{ij}$ is then obtained with by.

$$P'_{ij} = P_{ij} - V$$

Both, the calculations obtained by the batch normalizer and the calculations obtained by the rectified linear unit do not alter the number of entries (or the size) but only alter the values within the matrix.

Such units can be arranged before the respective downsampling layer or after the respective downsampling layer, depending on the circumstances. Specifically, as the downsampling layer reduces the number of entries in the matrix, it might be more appropriate to arrange the batch normalizer in the processing order of the bitstream after the respective downsampling layer. Thereby, the number of calculations necessary for obtaining V and P'$_{ij}$ is reduced significantly. As the rectified linear unit can simplify the multiplications to obtain the matrix of reduced size in the case of a convolution being used for the downsampling layer because some entries may be 0, it can advantageous to arrange the rectified linear unit before the application of the convolution.

However, the invention is not limited in this regard and the batch normalizer or the rectified linear unit may be arranged in another order with respect to the downsampling layer.

Furthermore, not each layer necessarily has one of these further units or other further units may be used that perform other modifications or calculations.

In order to allow the neural network to reliably process an input of 2101 through the neural network and to finally obtain an output 2105, it is necessary that the downsampling operations applied when processing the input bitstream through the neural network of the encoder are defined mathematical operations.

In view of the above example of a convolution being provided as one implementation of the downsampling layer, embodiments, for example, enable to assure that the number of entries of the matrix represented by the input (picture) in each dimension corresponds to an integer multiple of the size of the kernel in this dimension. Thus, they allow to avoid situations, where the convolution cannot mathematically be performed which could either throw a failure when processing an input 2101 through the neural network of the encoder 2100 or could lead to inconsistent results. At the same time, embodiments allow to keep the size of the bitstream that is finally output at the end of the processing of the input picture 2101 through the neural network of the encoder 2100 as small as possible.

Figure 21:
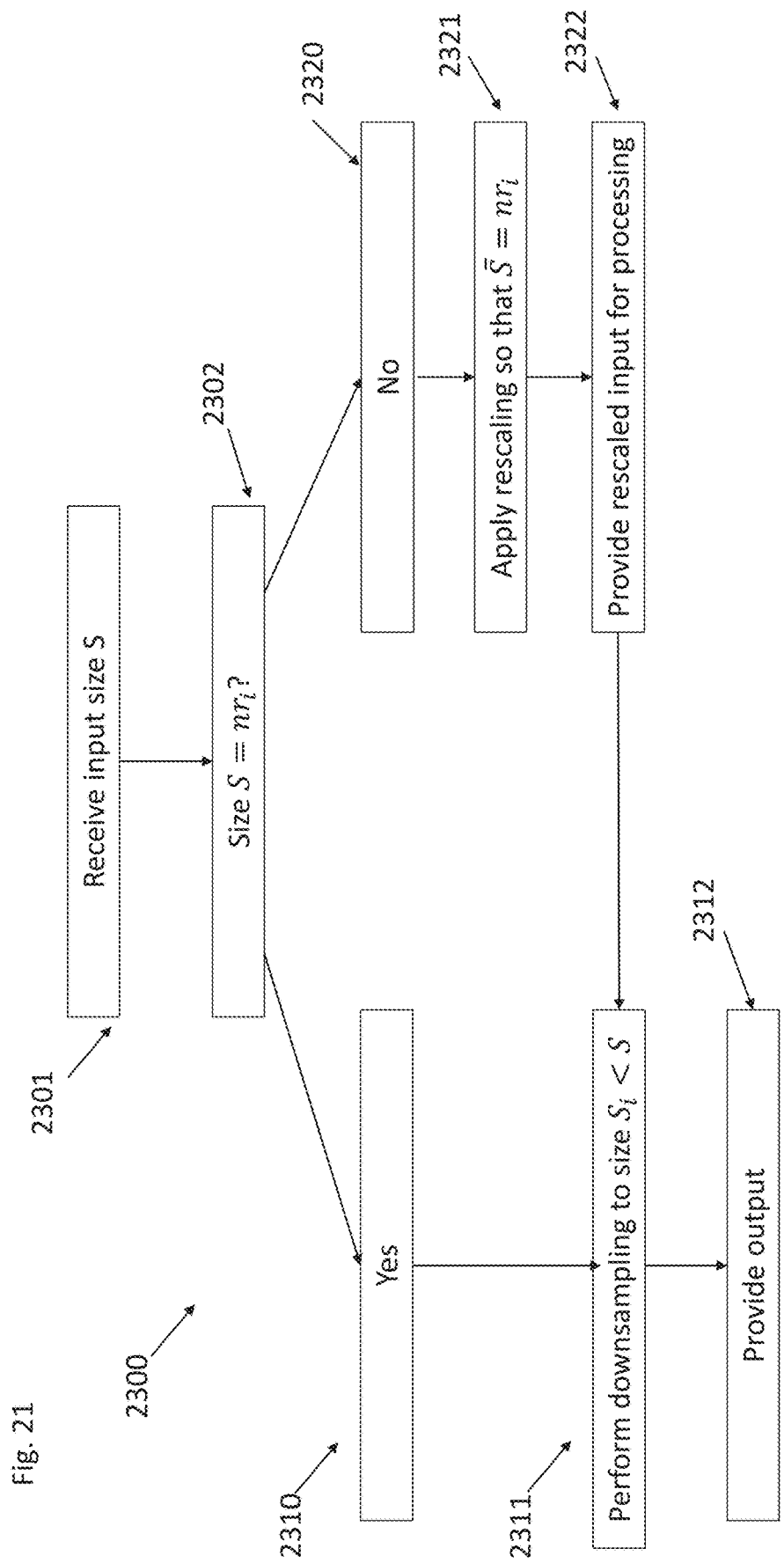
FIG. 21 shows a flow diagram showing an embodiment of encoding.

This is achieved by applying the method as explained with relation to FIG. 21 in more detail and comprises a rescaling operation that rescales the size of an input to a layer of the neural network. This will be explained in greater detail below.

FIG. 20 shows a decoder 2200 according to one embodiment.

This decoder comprises at least a neural network that comprises a plurality of layers 2201, 2220, 2230 and 2240 in consecutive order as shown here so that an input 2201 is processed by subsequent layers of the neural network and, after it has been processed by all layers (resulting in subsequent outputs 2202, 2203, 2204) of the neural network, an output 2205 is provided.

In this context, the neural network of the encoder 2200 comprises at least one layer, for example the layer 2220, that applies an upsampling operation to an input 2202 to this layer 2220. This upsampling operation comprises an increasing of the size of the input in at least one dimension where the input may be represented in the form of a matrix. The explanations given in this regard already in FIG. 19 also apply here.

Considering the above embodiment of FIG. 19, the input 2201 to the decoder is a bitstream representing an image. Specifically, the bitstream may be a bitstream that has been obtained by the encoder of FIG. 19. The bitstream may thus represent a picture like a still picture or a moving picture or portions of the same and may be decoded by using the decoder 2200 according to FIG. 20 specifically by applying an upsampling of the previously downsampled (and thereby encoded) bitstream.

The size of the input bitstream 2201, as far as it represents a matrix having at least two dimensions, is thus smaller in at least one of these dimensions compared to the output 2205 of the decoder 2200. Specifically, the output may be a decoded picture or a reconstructed picture that has been reconstructed from the bitstream 2201 input to the decoder 2200.

The layers of the neural network are, however, not limited to comprising an upsampling layer and can comprise, in addition to the at least one upsampling layer, at least one further layer. Furthermore, also the number of layers is not limited according to the invention and the decoder may have any number of layers.

The upsampling layer upsamples the received input in at least one dimension by, for example, performing interpolation or a deconvolution (i.e. a transposed convolution operation) on the input. In this context, the upsampling comprises increasing the size of the input by an upsampling ratio u>1, u∈ℕ.

The neural network and specifically the upsampling layer(s) of this neural network of the decoder 2200 may further comprise additional units, like the rectified linear unit as explained above and/or a batch normalizer as also explained above.

Considering the embodiments of FIGS. 19 and 21, it can be provided that the decoder is the inverse operation of the encoder resulting, if the decoder applies its operations to an input 2201 that was encoded by the encoder 2101 of FIG. 19, in the input 2101 that was originally provided to the encoder. This is the ideal case but due to a loss of information when encoding the bitstream with the encoder according to FIG. 19, the decoded bitstream 2205 at the end of the processing of the bitstream 2201 by the decoder 2200 may not be identical to the original input 2101.

In some embodiments, it may be provided that the encoder comprises a number of consecutive convolution layers or (more generally) downsampling layers numbered from 0 to N. The decoder may in such a case comprise a corresponding number N of upsampling layers in corresponding order, where the upsampling ratio u of an upsampling layer n of the decoder is equal to the downsampling ratio r of the corresponding downsampling layer of the encoder, i.e. $u_N = r_{N-n}$, and where the index n respectively N-n denotes the position of the upsampling layer or the downsampling layer in the order of processing an input. This means that the upsampling ratio of the first upsampling layer, in the processing order of the input (i.e the bitstream) through the neural network of the decoder, is equal to the downsampling ratio of the last downsampling layer, in the processing order of the input (i.e. the picture) through the neural network of the encoder.

This results in the inverse upsampling operation compared to the downsampling operation as performed at the same point in the processing of the input through the respective neural network.

The above embodiments have been described with respect to an encoder and a decoder referring to an example input picture that is represented a two-dimensional matrix of, for example, a black and white picture without shading. It is, however, envisaged by the present disclosure, that the technology may also be applied to pictures comprising more complex information like a colored video (as a moving picture) or a picture comprising a plurality of values in each available color channel.

For such a case, though it is in principle possible to also process such a more complex input with a single neural network as indicated above, it is preferred that for each color channel a "sub neural network", sNN, with the structure as provided according to FIGS. 19 and/or 20 is provided in the respective encoder and/or decoder. Furthermore, the values that characterize the layers of the neural network of the encoder and/or the decoder may be identical for each sNNs. However, it may also be envisaged that the parameters specifying the neural network and the layers of the neural network in one of the sNNs differ from the respective values for another sNN. For example, the sub neural network for processing the green color channel may be differently structured (comprising more or fewer layers or convolutions with other values for the kernels or a different order of downsampling ratios) compared to the red color channel. In this regard, any technically reasonable combination can be thought of. However, it may be preferred if the sub-bitstreams obtained by processing the portions of the picture with respect to sNNs in the encoder have the same size at the end of the processing through the respective neural network of the encoder. The same is preferred for the decoder. This means that bitstream processed by processing sub-bitstreams through the different sNNs results in a reconstructed image obtained from decoding the sub-bitstreams, where each decoded sub-bitstream, when decoded, preferably has the same size as the other decoded sub-bitstreams.

FIG. 21 specifies a method of processing an input picture or generally an input having a size S in at least one dimension with a downsampling layer as is provided for example as part of the neural network of FIG. 19.

The method 2300 begins with a step 2301 where an input having a size S in at least one dimension is received. For ease of explanation, the downsampling is described below with respect to only one dimension. It is, however, clear from the above and intended that the invention also can be used to downsample an input in two dimensions.

As explained earlier, the input may be a picture, like a still picture or a moving picture or the like. Furthermore, the step 2301 may take place at any point in the neural network depicted in FIG. 19. It is thus not necessary that the input is received at the layer 2110 being the first layer in the order of processing an input 2101 through the neural network but the step 2301 may also take place at a subsequent downsampling layer, for example the downsampling layer with index i.

The input with the size S is, in a next step, preferably checked for whether its size S equals a multiple integer of the downsampling ratio $r_i$ of the respective downsampling layer i.

This checking can comprise, for example, calculating a difference between the size S and $$\text{ceil}\left(\frac{S}{r}\right)r \text{ or floor}\left(\frac{S}{r}\right)r.$$

If this difference is zero, then S already is an integer multiple of the downsampling ratio r of the respective downsampling layer. If the difference is not zero, then S is not an integer multiple of the downsampling ratio r of the downsampling layer.

For example, consider a size S=512 and a downsampling ratio r=4. In that case, the $S=128r_i$ and, therefore, is an integer multiple of the downsampling ratio. In that case, the above calculations will lead to $$\text{ceil}\left(\frac{S}{r}\right)r - S = \text{floor}\left(\frac{S}{r}\right)r - S = 0.$$

If the size S=513, it would not be an integer multiple of the downsampling ratio $r_i$ of this downsampling layer. In that case, for example, $$\text{ceil}\left(\frac{S}{r}\right)r - S = 3 \text{ and floor}\left(\frac{S}{r}\right)r - S = 1.$$

Both calculations of the difference will thus result in a difference not being zero.

This determination whether S is an integer multiple of the downsampling ratio r can also be done in other appropriate ways using functions that depend on S and/or r and given a result that indicates that S is an integer multiple of the downsampling ratio r and giving another result when S is not an integer multiple of the downsampling ratio r.

Depending on this decision, two different approaches can be taken.

If it is determined in step 2302 that the size S equals an integer multiple of the downsampling ratio (indicated with 2310), the method may proceed to step 2311. This means that no rescaling is applied to the input with the size S. As the size S of the input is an integer multiple of the downsampling ratio $r_i$ of the respective downsampling layer, in step 2311, the downsampling operation of the input can be performed so that the size of the input is reduced to size $S_i$<S.

After having performed this downsampling, an output can be provided by this layer to another layer in the processing order of the neural network or this can already be the final output for the neural network as indicated with item 2105 in FIG. 19.

Furthermore, as was indicated previously, in case the respective layer of the neural network is associated with or comprises further units, further operations may either be applied before step 2311 (for example by using a rectifying linear unit) and/or after the step 2311 and before actually providing an output 2312. Specifically, after having performed the downsampling, a batch normalizer can be used to normalize the values of the obtained bitstream having a reduced size $S_i$ before this is provided as output to a subsequent entity.

If, on the other hand, it is determined in step 2302 that the size S is no integer multiple of the downsampling ratio $r_i$ of the respective layer of the neural network (step 2320), a rescaling may be applied the input, changing the size S of the input in order to allow the downsampling layer to actually process the input. This rescaling operation can comprise increasing or decreasing the size S of the input so that a changed size $\overline{S}=nr_i$; n, $r_i \in \mathbb{N}^+$ is obtained.

Preferably, the size $\overline{S}$ is determined so that as few as possible changes to the original size S are made. Preferably, the size S is changed either to the closest smaller integer multiple of the downsampling ratio r or to the closest larger integer multiple of the downsampling ratio r. The closest smaller or closest larger integer multiple of the downsampling ratio r can be obtained by minimizing a function $f(n)=|S-nr|$. As n is restricted to positive integer values, this minimizing will lead to either the closest smaller or the closest larger integer multiple of the downsampling ratio r. This closest smaller or closest larger integer multiple of the downsampling ratio can also be identical to S in cases where S is already an integer multiple of the downsampling ratio r.

Alternatively, $\overline{S}$ can also be obtained by calculating either $$\text{ceil}\left(\frac{S}{r}\right)r \text{ or floor}\left(\frac{S}{r}\right)r.$$

The first will lead to the closest larger integer multiple of the downsampling ratio whereas the latter leads to the closest smaller integer multiple of the downsampling ratio.

These two alternatives do not necessarily encompass obtained a value for n explicitly. The respective value of n may be obtained explicitly by calculating $$\text{ceil}\left(\frac{S}{r}\right) \text{ or floor}\left(\frac{S}{r}\right)$$

in a separate step, because these provide the value of n. However, this is not necessary.

Having obtained the size $\overline{S}$, the size S of the input is increased or decreased in applying the rescaling so that its size is changed to $\overline{S}$. This can be done in any appropriate way. For the case of the rescaling resulting in a reduction of the size from the size S to the size $\overline{S}$, this may be done by cropping the input or using interpolation as was explained above with respect to the FIGS. 13 to 15. If the rescaling results in an increase in the size from the size S to the size $\overline{S}$, this may be done by padding the input with zeros or using interpolation or using padding with redundant information. Here, specifically reflection padding or repetition padding may be used as was explained above also with respect to FIGS. 13 to 15.

To provide an explicit example, as mentioned above, if the input had a size of 513 but the downsampling ratio r is 4, the size of the input is 1 too large or 3 too small in order to correspond to an integer multiple of the downsampling ratio. Thus, a rescaling operation that may comprise that a padding of the original input with "0s" (or copying existing samples in the original input to non-existing positions by reflection or repetition padding) at the borders is performed so as to increase the size S to the size $\overline{S}$ which then equals an integer multiple of the downsampling ratio r. Alternatively, the input with size S may be cropped by removing entries at one or more borders of the input to reduce the size S to the size $\overline{S}$. Other means, for example an interpolation could be used so as to perform the respective rescaling.

Figure 23:
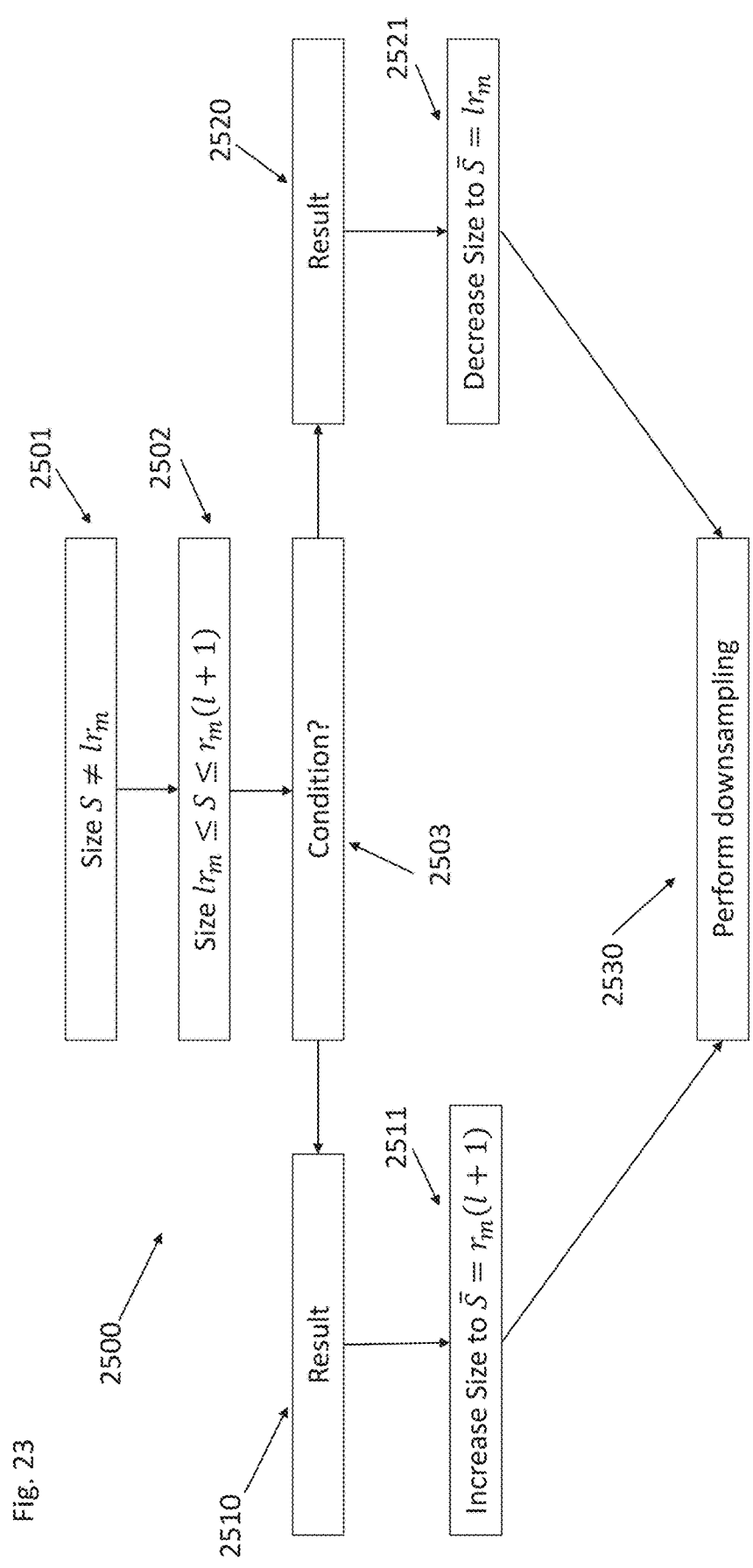
FIG. 23 shows an embodiment of how the decision to rescale is made depending on a condition.

The invention is not limited in this regard and as will be further explained with relation to FIG. 23, the decision whether to increase the size of the input or decrease the size of the input and also the decision which rescaling operation to actually use for this may depend on a specific condition.

Furthermore, it is noted that when processing the input through the neural network, it is not necessary that the rescaling is only applied in a single way if the size is increase before the proceeding downsampling layer or the size is decreased before the proceeding downsampling layer. For example, it may be provided that, before a first downsampling layer, the size of the input is increased using padding with zeros whereas, before a second downsampling layer, the size is increased using padding with redundant information, specifically using reflection padding or repetition padding.

Once the input is rescaled to the size $\overline{S}=nr_i$ in step 2322, the downsampling operation can be performed according to step 2311 but not with the original input having the size S but with the modified input having the size $\overline{S}$. In any case, it is envisaged that the downsampling results in a size $S_i$ of the output of the downsampling layer that is still smaller than the original input size S. This means that the rescaling applied in step 2321 is preferably performed in a way that adds as few additional entries as possible or may, per default, be realized by in any case reducing the size S of the input to the closest smaller integer multiple of the respective downsampling ratio.

For example, if the downsampling ratio of the respective downsampling layer is 2 and the size S of the input is not a multiple integer of 2, the rescaling could in principle comprise a doubling of the size of the input. This would, in any case, result in the rescaled size $\overline{S}=nr_i$. This, however, would significantly increase the size $\overline{S}$ compared to the size S and would not result in the size $S_i$ being indeed smaller than the size S of the input after having performed the downsampling. Such operations are thus preferably avoided and it is rather ensured that, if the input has a size $lr_i<S<r_i(l+1)$, the rescaling according to step 2321 is performed so that either $\overline{S}=lr_i$ or $\overline{S}=(l+1)r_i$. This means that, preferably, the closest integer multiple of the downsampling ratio is chosen for the rescaling.

The value for l may be obtained using ceil( ) or floor( ) or any other function allowing to obtain the respective values. For example, to obtain l, $$\text{floor}\left(\frac{S}{r}\right)$$

may be calculated as this results in an integer value l that, when multiplied with r, comes closest to S while being smaller than or equal to S. Obtaining $\overline{S}$ with this thus ensures that $\overline{S}$ is indeed the closest smaller integer multiple of the downsampling ratio. l or l+1 may also be obtained using $$\text{ceil}\left(\frac{S}{r}\right).$$

This function will provide (l+1) as it results in an integer value (l+1) that, when multiplied with the downsampling ratio r, comes closest to S while being larger than or equal to S. Obtaining $\overline{S}$ with this thus ensures that $\overline{S}$ is indeed the closest larger integer multiple of the downsampling ratio.

To provide an example, the downsampling ratio r=4 and the size of the input may be 513. In that case, using $$\text{floor}\left(\frac{S}{r}\right)$$

to calculate l will lead to l=128 as closest smaller integer. Using $$\text{ceil}\left(\frac{S}{r}\right)$$

will lead to (l+1)=129. As 513 is closer to the smallest integer multiple of r (because 4×128=512), the size of the input may be reduced to 512, thereby resulting in as little lost information as possible. However, as a default, it may also be provided that the size S is increased to 516 in order to ensure that no information is lost.

In another embodiment, the checking step of 2302 and the left branch including the step of 2310 might not be present. In such a case, the rescaling step 2321 can output a size $\bar{S}$ equal to S when S is already integer multiple of the downsampling ratio $r_i$. In other words, the rescaling function can already take into account the fact that S might be integer multiple of $r_i$. Therefore the checking step 2302 might not be implemented. In a further embodiment, the rescaling step in 2321 can perform a rescaling even if S is already an integer multiple of the downsampling ratio $r_i$. This might be advantageous for example if reduction of the size of the input is important and if the resizing operation generates a size $\bar{S}$ smaller than S.

Furthermore, this determination may not be explicitly made. Rather, for example by default, when an input with a size S is obtained for a downsampling layer with a downsampling ratio r, the value $$\operatorname{ceil}\left(\frac{S}{r}\right) r \text{ or } \operatorname{floor}\left(\frac{S}{r}\right) r$$

may be determined and based on this, a rescaling is performed without determining or deciding whether $$\operatorname{ceil}\left(\frac{S}{r}\right) r \text{ or } \operatorname{floor}\left(\frac{S}{r}\right) r$$

equal S. In the case these values equal S, the rescaling may be a "zero"-rescaling or an identical rescaling, not changing the size S. Only in case these values differ from S, an actual rescaling will be applied.

According to an embodiment, this method 2300 is performed before each downsampling layer separately. Specifically, the determination in step 2302 and the rescaling in step 2321 is preferably independent from any other downsampling ratio of another downsampling layer within the neural network of the encoder according to FIG. 19. If, for example, the layer 2110 in FIG. 19 is a downsampling layer and the layer 2130 is a downsampling layer as well, the method 2300 is performed before the downsampling layer 2110 with the downsampling ratio $r_{2110}$ of the downsampling layer 2110 only. Subsequently, after the processing of the bitstream with the layer 2120 of the neural network and before processing it with the further downsampling layer 2130, the bitstream 2103 is processed with the method 2300 by using its respective size and the downsampling ratio $r_{2130}$ of the downsampling layer 2130.

Thereby, rescaling operations are performed that only take into account the condition of step 2302 for the specific downsampling layer which is to process the current input and adding or removing of additional entries to the matrix represented by the bitstream is done only as much as necessary. Thereby, the size of the encoded bitstream 2105 provided as output by the encoder 2100 according to FIG. 19 is reduced as far as possible.

Figure 22:
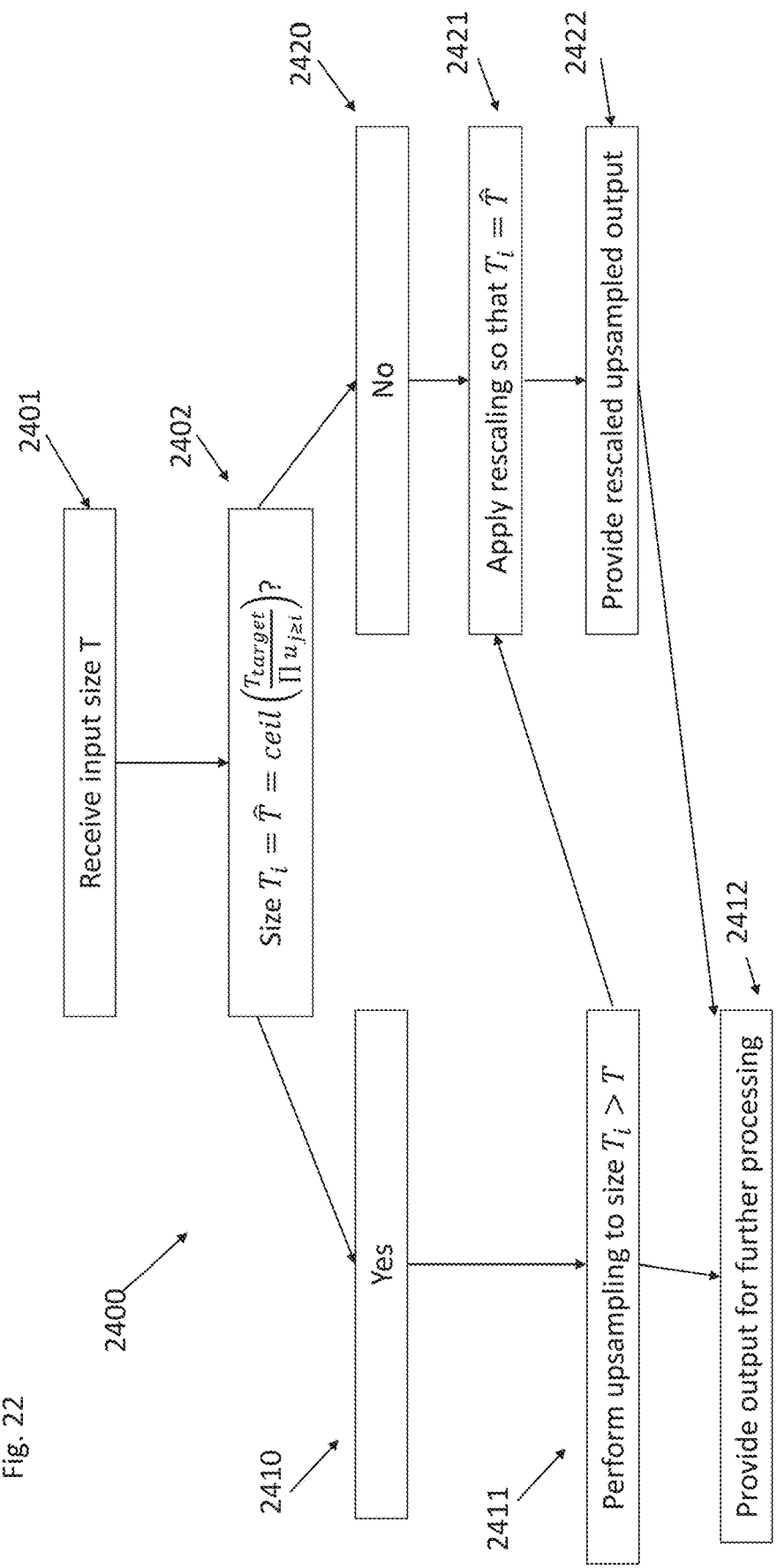
FIG. 22 shows a flow diagram of an embodiment of decoding.

FIG. 22 shows a further embodiment that refers to a resizing or rescaling operation to be performed with one of the upsampling layers in the decoder according to FIG. 20.

As for the case of the encoding, it is intended that this rescaling is performed with respect to each upsampling layer separately. However, as will be apparent from the discussion below, this cannot be performed in a manner that is completely independent from the subsequent upscaling layers, specifically in case the target size of the final output 2205 of the neural network (see FIG. 20) of the decoder is already fixed. One exception to this might be the case when all necessary information about resizing is provided explicitly in a bitstream to the decoder.

Nevertheless, if there is more than one upsampling layer, for example the layer 2220 and the layer 2240 as shown in FIG. 20, the upsampling may be applied after the bitstream has been processed by the layer 2210 and before it is processed by the upsampling 2220. Likewise, the second upsampling may occur after the processing with the layer 2230 and before the processing with the upsampling layer 2240.

In the context of FIG. 22 and the method 2400, an input may be received at step 2401 having size T. The receiving of this input may be corresponding to the provision of an output with the previous layer. In any case, the bitstream in step 2401 has the size T in at least one dimension like, for example, the horizontal dimension in case the bitstream represents a two-dimensional matrix having horizontal and vertical components.

Before processing this input with the upsampling layer, a determination is made in step 2402. In general, this determination may be considered to take into account whether, if an upsampling is applied to the input with the size T, the corresponding output will have a size that matches an intended target size. The intended target size may be the size that is intended after the processing of this specific layer. It may, however, also comprise an evaluation in view of additional information like the upsamplings that are to be performed after this specific upsampling operation until the final decoded bitstream is obtained at the end of the processing of the encoded bitstream through the neural network. In such a case, it may be determined in step 2402 whether the size $T_i=uT$ obtained after the upsampling of the input by the upsampling layer (with the upsampling ratio u) equals the intended size $\hat{T}$ where this intended size is given by $$\hat{T} = \operatorname{ceil}\left(\frac{T_{target}}{\prod_i u_i}\right)$$

with $u_i$ being me upsampling ratios of the subsequent upsampling layers. In the case of all upsampling ratios being equal, this product may be replaced with $u^N$ where N is the number of subsequent upsampling layers.

Considering an intended size or target size of the output as $\hat{T}=256$. This target size of the output may be obtained from the target output size $T_{target}$ of the decoded or reconstructed image. This may be, for example, 1024 and the upsampling ratios $u_i=u=2$ for remaining two upsampling layers. My calculating the value for $$\operatorname{ceil}\left(\frac{T_{target}}{\prod_i u_i}\right),$$

$\hat{T}$=256 will the be obtained. If the size $T_i$ is, for example, 258, because the input to the upsampling layer had a size of 129, the size $T_i$ does not match $\hat{T}$ and, thus, a rescaling may be necessary.

This determination step 2402 may be provided as explicit determination as indicated above. However, it may not be performed as explicit step or as separate step in the method described. For example, in some embodiments, by default, a rescaling is applied so as to change the size T to $$\text{ceil}\left(\frac{T_{target}}{\prod_i u_i}\right).$$

If T is already $$\text{ceil}\left(\frac{T_{target}}{\prod_i u_i}\right),$$

then this will not result in a change of the size T. If, on the other hand, T is not already equal to $$\text{ceil}\left(\frac{T_{target}}{\prod_i u_i}\right),$$

then a resizing (for example increase using padding or decrease using cropping) of the size may be provided. However, in this embodiment, no separate determination like in step 2402 will be performed but this check is implicit already part of the calculation that applies the rescaling.

In general the intended size $\hat{T}$ can be obtained by a resizing function of the form $\hat{T}=f(u_i, u_j, u_k, \ldots, T_{target})$ or $\hat{T}=f(u_i, u_j, u_k, \ldots, T_{target}, T)$, where the $u_i, u_j, u_k, \ldots,$ are the upsampling ratios of the subsequent upsampling layers in processing order of the input.

Another example of $f(u_i, u_j, u_k, \ldots, T_{target})$ might be $$\hat{T} = \text{floor}\left(\frac{T_{target}}{\prod_i u_i}\right).$$

The actual size of the output that is to be provided by the current upsampling layer for processing by subsequent upsampling layers thus depends on the subsequent upsamplings that will be necessary but not on the upsamplings already performed. It is, however, clear that the previous upsampling processes that have potentially been performed may be obtained with a corresponding decision where then, of course also some of the preceding layers will be taken into account. Thereby, already the size T of the input was at least somehow dependent on the upsampling ratios of the full neural network.

The ceil-function is a function that gives as a result the division without rest. The outcome of this operation and specifically of step 2402 may indicate that $T_i > \hat{T}$ or $T_i < \hat{T}$ or $T_i = \hat{T}$.

The case $T_i = \hat{T}$ results in the determination in step 2410 upon which it is determined that no further rescaling of the input with the size T is necessary after the upsampling and, in step 2411, the upsampling operation for upsampling the input from the size T to the size $\overline{T}$ (also referred to as $T_i$ in the FIG. 22 as output of the upsampling layer i) can be performed and the output with the size $\overline{T}$ can be provided in step 2412 for the further processing by, for example, further upsampling layers.

If it is, on the other hand, determined in step 2402 that the size $\overline{T}$ does not equal $\hat{T}$ (2420), a rescaling of the output with size $T_i$ is necessary in step 2421 to obtain $T_i=\hat{T}$. This rescaling may comprise either increasing the size $T_i$ to the size $\hat{T}$ by applying one of the above-mentioned means like interpolation or padding with 0s or repetition padding or reflection padding or the like. Alternatively, if $T_i > \hat{T}$, the rescaling may comprise cutting, cropping or any other operation that reduces the size $T_i$ so that it matches the intended size $\hat{T}$.

If a rescaling was necessary, the rescaled output can then be provided as output for subsequent processing with, for example, other upsampling layers.

No matter what decision was taken at step 2402, the output provided after the application of the upsampling in step 2411 will have the size $\overline{T}$ that can be further processed by the subsequent layers to arrive at an output that has the appropriate size.

The checking step in 2402 might be optional and can be incorporated in the resizing (rescaling) operation/function. In this case, the resizing function might output a $\hat{T}$ that is equal to $T_i$. This can be the case if, before processing an output of a preceding upsampling layer by a proceeding upsampling layer, the size T is rescaled to $$\hat{T} = \text{ceil}\left(\frac{T_{target}}{\prod_i u_i}\right).$$

If, in some cases, $$T = \text{ceil}\left(\frac{T_{target}}{\prod_i u_i}\right),$$

this is will result in a "zero"-rescaling or identical rescaling where the size of the output is not changed. This might especially be useful if the checking step already includes the performing of the resizing function $f(u_i, u_j, u_k, \ldots, T_{target})$. In such a case, the checking step may be considered to be an implicit step that is not performed independent from the rescaling, but already forms part of the rescaling. For example in FIG. 22, the function f( ) is equal to $$\text{ceil}\left(\frac{T_{target}}{\prod u_{j>i}}\right).$$

and it needs to be performed to decide whether resizing is necessary or not. Therefore, in some implementations, this checking step might not be provided and can be interpreted as part of the resizing operation (2421).

However, in other implementations where the checking step does not include performing of the resizing operation in an identical manner, the checking step may be implemented separately. An example might be that the checking step 2402 might include checking the layer ID (the layer number in processing order). This checking operation does not include the resizing operation. Therefore, the checking operation is necessary in this example.

At the next upsampling layer, a corresponding determination may be made and rescaling (resizing) may be performed or not.

The terms resizing and rescaling are used interchangeably and both refer to changing of the size of an input outside of actually processing it by the downsampling layer of the neural network or the upsampling layer.

In the above described embodiment, the decision 2402 is made before the processing of the input by the upsampling layer. It can, however, also be provided that this decision is made once the upsampling has been performed or even immediately before a subsequent upsampling layer. In any case, the rescaling is to be performed after the upsampling has been performed.

For making the decision 2402, the decoder and specifically the neural network may have to be aware of additional information that may be obtained in different ways. Specifically, the determination whether or not the rescaling has to be applied in the way in which the rescaling is actually applied may, in view of the equation provided above, depend on the target size that is actually to be obtained when decoding an encoded bitstream. For example, if the final target size of the decoded bitstream is 1024×512 when represented as a two-dimensional matrix, a different rescaling may be necessary compared to a target size of 2048× 1024 at a specific point within the neural network. Therefore, each layer of the neural network or the neural network as such or the decoder may have to be aware of, for example, the target size.

Alternatively or additionally, it can be preferred if the neural network is aware of the output size $\hat{T}_i$ that is to be output after each upsampling layer i. This makes knowledge of the target size potentially no longer necessary. Furthermore, it will not be necessary to perform, each time when determining whether rescaling is necessary, the ceiling-function mentioned above.

Alternatively, the respective output sizes $\hat{T}_i$ could already be provided in a given format, like a lookup table, LUT. In that lookup table, the sizes $\hat{T}_i$ may be provided so that they can be fetched from a matrix. The entries of the matrix may be defined depending on the target size and the number of the upsampling layer i, so that when i and the target size are known, $\hat{T}_i$ can be fetched from the LUT by using a pointer that points to the respective position in the LUT.

Furthermore, in order to reliably determine whether or not rescaling is necessary in step 2402, also the upsampling ratios that will have influence on this determination may need to be known at this point in the processing of the encoded bitstream through the neural network.

Such information can, as already indicated above, be provided in different ways. As the advantage of some embodiments lies in the reduction of the encoded bitstream, it is preferable but still not necessary to provide as much information as possible independent of the encoded bitstream so as to not increase the encoded bitstream in size.

Therefore, for example, information regarding the target size of the intermediate target sizes $\hat{T}_i$ which are to be obtained after each upsampling layer or information regarding the upsampling ratios may be provided in a separate bitstream that is not part of the encoded bitstream. Alternatively, this necessary information can also be provided in the bitstream as long as the overall size of the bitstream can be kept small.

A further alternative is to provide some or all of this information, specifically as regards to the upsampling ratio of the upsampling layers and/or the target size already on the decoder. In this way, the decoder is specifically designed to obtain, from an input, a decoded bitstream having a fixed target size by applying fixed (or at least known) upsamplings in a specific order. This information will thus not need to be included in the bitstream, keeping its size as small as possible. The bitstream may, however, comprise a flag or pointer that indicates its target size in case the decoder is able to provide outputs with different target sizes.

This information, together with information indicating which kind of rescaling to apply (as explained in FIGS. 13 to 15) can be included in the bitstream itself or a separate bitstream, as explained above also with respect to FIGS. 13 to 15. Specifically, the bitstream (or a further bitstream) may include indications like methodIdx, SCIdx and RFIdx as explained above and these may be used by the encoder in order to determine which kind of rescaling to apply.

FIG. 23 shows a further method 2500 for deciding whether to increase the size of an input in step 2321 of FIG. 21 or to decrease the size of the input before performing the downsampling.

The method 2500 begins with the step 2501 in which it is already determined or has been determined in line with step 2320 that the received input has a size $S \neq lr_m$.

Having made this determination in step 2501, the next step 2502 can comprise a more detailed evaluation of the input. Specifically, it can comprise a determination that the size S is $lr_m \leq S \leq r_m(l+1)$.

As it is clear for a person skilled in art, the step 2501 might be unnecessary and absent.

Once this is determined, a condition can be used in step 2503 based on the result of which in steps 2510 or 2520 different further steps are taken. This means that the evaluation of the size S against the condition can lead to a first result that has the consequences that the size S is increased to $\overline{S} = r_m(l+1)$ while a second result 2520 of the evaluation of the condition can result in a decrease of the size to $\overline{S} = lr_m$ in step 2521 before the downsampling is performed in step 2530.

Exemplarily, the condition can make use of $\text{Min}(|S-lr_m|, |S-r_m(l+1)|)$, where the values of l and l+1 can be determined in line with what was said above in relation to FIG. 21. Specifically, l may be obtained from $$l = \text{floor}\left(\frac{S}{r_m}\right)$$

and l+1 may be obtained by adding 1 to this result or calculating $$l+1 = \text{ceil}\left(\frac{S}{r_m}\right).$$

Having obtained l, or by using $$\text{floor}\left(\frac{S}{r_m}\right) \text{ and } \text{ceil}\left(\frac{S}{r_m}\right)$$

directly in the above Min-function, it can be determined whether the difference between $S-lr_m$ or the difference to the next larger integer multiple $S-r_m(l+1)$ is smaller, thus requiring the least number of additional information being provided to the input or the least number of information being taken away from the original input.

For example, if $r_m=4$ and $S=513$, as already referred to above as one example, $l=128$ and the size S of the input is closer to the closest smaller integer multiple of $r_m$ than to the closest larger integer multiple of $r_m$. If S would be $S=515$, then the size S of the input would be closer to the closest larger integer multiple of $r_m$ than to the closest smaller integer multiple of $r_m$.

Based on the above Min-evaluation, the number of computational steps that need to be performed can thus be determined and kept at a minimum.

A condition that makes use of the above Min-evaluation may be to keep the computational steps for performing the rescaling operation small. If, for example, in a one-dimensional case, the downsampling ratio $r_m$ is 4 and the size $S=kr_m+1$, then it may be computationally more efficient to reduce the size S to $\overline{S}=kr_m$ and not increasing it to $\overline{S}=(k+1)r_m$.

In case the number of operations that need to be performed in the rescaling is equal with respect to increasing the size S and decreasing the size S, the condition may further be to either add as few redundant information as possible or to take away as little as possible information from the input. In the above case, it may be decided for a size $S=kr_m+2$ to increase the size to $\overline{S}=(k+1)r_m$ by padding with zeros. This increases the amount of redundant information but does not result in a loss of information.

In general, if it is thus determined by evaluating the size S of the input against the condition in step 2503 that the difference between the size $S-r_m(l+1)$ is smaller than the difference $S-lr_m$, and it is, for example, determined that it may be computationally more efficient to increase 2511, from the result 2510 the size S to the size $\overline{S}=r_m(l+1)$ before performing the downsampling.

On the other hand, if it is determined that the difference $S-lr_m$ is smaller than the difference $S-r_m(l+1)$, and if it is, for example, determined that it may be computationally more efficient to decrease the size S to the size $\overline{S}=r_m l$, the size S may be decreased to $\overline{S}=r_m l$.

However, this is only one embodiment that can be used to specifically implement a condition with which the evaluation can be made whether to increase or to decrease the size of an input before performing the downsampling. In this respect, it can also be taken into account that the smaller the input size S actually is, the fewer computations are usually necessary in order to perform the downsampling. Also, any other conditions that are deemed appropriate may be used in order to make this determination.

In view of the above, in any case, the rescaling of an input before processing it by the downsampling layer will result in an increased or a decreased size of the input in the specific dimension.

In the above examples, arbitrary downsampling ratios and upsampling ratios were used. However, some preferred embodiments may comprise that the downsampling ratios of all downsampling layers of a neural network of an encoder may be identical. Likewise or alternatively, the upsampling ratios of all upsampling layers of a neural network of a decoder may be identical. The invention is, however, not limited in this regard and the upsampling and/or downsampling ratios may take any integer values that can be thought of. However, preferred embodiments refer to upsampling and/or downsampling ratios that are within the range of 2 and 10.

In embodiments of encoding methods or encoders described herein the bitstream output, e.g. output by the NN, may be, for example, the output or bitstream of the last subnetwork or network layer of the NN.

In further embodiments of encoding methods or encoders described herein the bitstream output, e.g. output by the NN, may be, for example, a bitstream formed by or comprising two bitstreams, which may also be referred to as subbitstreams, e.g. bitstreams or subbitstreams bitstream1 and bitstream2, or more general, a first bitstream or first subbitstream and a second bitstream or second subbitstream (e.g. each bitstream or subbitstream being generated and/or output by a respective subnetwork of the NN). Both bitstreams or subbitstreams may be transmitted or stored separately or combined, e.g. multiplexed, as one bitstream.

In even further embodiments of encoding methods or encoders described herein the bitstream output, e.g. output by the NN, may be, for example, a bitstream formed by or comprising more than two bitstreams, which may also be referred to as subbitstreams, e.g. a first bitstream/sub-bitstream, a second bitstream/subbitstream, a third bitstream/subbitstream, and optionally further bitstreams/subbitstreams (e.g. each bitstream/subbitstream being generated and/or output by a respective subnetwork of the NN). The bitstreams/subbitstreams may be transmitted or stored separately or combined, e.g. multiplexed, as one bitstream or more than one combined bitstream.

In embodiments of decoding methods or decoders described herein the received bitstream, e.g. received by the NN, may be, for example, used as input of the first subnetwork or network layer of the NN.

In further embodiments of decoding methods or decoders described herein the received bitstream may be, for example, a bitstream formed by or comprising two bitstreams, which may also be referred to as subbitstreams, e.g. bitstreams/subbitstreams bitstream1 and bitstream2, or more general, a first bitstream/subbitstream and a second bitstream/subbitstream (e.g. each bitstream/subbitstream being received and/or processed by a respective subnetwork of the NN). Both bitstreams/subbitstreams may be received or stored separately or combined, e.g. multiplexed, as one bitstream, and demultiplexed to obtain the bitstreams/subbitstreams.

In even further embodiments of decoding methods or decoders described herein the received bitstream may be, for example, a bitstream formed by or comprising more than two bitstreams, which may also be referred to as subbitstreams, e.g. a first bitstream/subbitstream, a second bitstream/subbitstream, a third bitstream/subbitstream, and optionally further bitstreams/subbitstreams (e.g. each bitstream/subbitstream being received and/or processed by a respective subnetwork of the NN). The bitstreams/subbitstreams may be received or stored separately or combined, e.g. multiplexed, as one bitstream or more than one combined bitstream, and demultiplexed to obtain the bitstreams/subbitstreams.

Mathematical Operators

The mathematical operators used in this application are similar to those used in the C programming language. However, the results of integer division and arithmetic shift operations are defined more precisely, and additional operations are defined, such as exponentiation and real-valued division. Numbering and counting conventions generally begin from 0, e.g., "the first" is equivalent to the 0-th, "the second" is equivalent to the 1-th, etc.

Arithmetic Operators

The following arithmetic operators are defined as follows:

\+ Addition

− Subtraction (as a two-argument operator) or negation (as a unary prefix operator)

\* Multiplication, including matrix multiplication $x^y$ Exponentiation. Specifies x to the power of y. In other contexts, such notation is used for superscripting not intended for interpretation as exponentiation.

/ Integer division with truncation of the result toward zero. For example, 7/4 and −7/−4 are truncated to 1 and −7/4 and 7/−4 are truncated to −1.

÷ Used to denote division in mathematical equations where no truncation or rounding is intended.

$$\frac{x}{y}$$

Used to denote division in mathematical equations where no truncation or rounding is intended $$\sum_{i=x}^{y} f(i)$$

The summation of f(i) with i taking all integer values from x up to and including y.

x % y Modulus. Remainder of x divided by y, defined only for integers x and y with x>=0 and y>1.

Logical Operators

The following logical operators are defined as follows:

x && y Boolean logical "and" of x and y x||y Boolean logical "or" of x and y

! Boolean logical "not"

x?y:z If x is TRUE or not equal to 0, evaluates to the value of y; otherwise, evaluates to the value of z.

Relational Operators

The following relational operators are defined as follows:

\> Greater than

\>= Greater than or equal to

< Less than

<= Less than or equal to

== Equal to

!= Not equal to

When a relational operator is applied to a syntax element or variable that has been assigned the value "na" (not applicable), the value "na" is treated as a distinct value for the syntax element or variable. The value "na" is considered not to be equal to any other value.

Bit-Wise Operators

The following bit-wise operators are defined as follows:

& Bit-wise "and". When operating on integer arguments, operates on a two's complement representation of the integer value. When operating on a binary argument that contains fewer bits than another argument, the shorter argument is extended by adding more significant bits equal to 0.

| Bit-wise "or". When operating on integer arguments, operates on a two's complement representation of the integer value. When operating on a binary argument that contains fewer bits than another argument, the shorter argument is extended by adding more significant bits equal to 0.

^ Bit-wise "exclusive or". When operating on integer arguments, operates on a two's complement representation of the integer value. When operating on a binary argument that contains fewer bits than another argument, the shorter argument is extended by adding more significant bits equal to 0.

x>>y Arithmetic right shift of a two's complement integer representation of x by y binary digits. This function is defined only for non-negative integer values of y. Bits shifted into the most significant bits (MSBs) as a result of the right shift have a value equal to the MSB of x prior to the shift operation.

x<<y Arithmetic left shift of a two's complement integer representation of x by y binary digits. This function is defined only for non-negative integer values of y. Bits shifted into the least significant bits (LSBs) as a result of the left shift have a value equal to 0.

Assignment Operators

The following arithmetic operators are defined as follows:

= Assignment operator

++ Increment, i.e., x++ is equivalent to x=x+1; when used in an array index, evaluates to the value of the variable prior to the increment operation.

−− Decrement, i.e., x−− is equivalent to x=x−1; when used in an array index, evaluates to the value of the variable prior to the decrement operation.

+= Increment by amount specified, i.e., x+=3 is equivalent to x=x+3, and x+=(−3) is equivalent to x=x+(−3).

−= Decrement by amount specified, i.e., x−=3 is equivalent to x=x−3, and x−=(−3) is equivalent to x=x−(−3).

Range Notation

The following notation is used to specify a range of values:

x=y . . . z x takes on integer values starting from y to z, inclusive, with x, y, and z being integer numbers and z being greater than y.

Mathematical Functions

The following mathematical functions are defined:

$$Abs(x) = \begin{cases} x; & x >= 0 \\ -x; & x < 0 \end{cases}$$

A sin(x) the trigonometric inverse sine function, operating on an argument x that is in the range of −1.0 to 1.0, inclusive, with an output value in the range of −π÷2 to π÷2, inclusive, in units radians A tan(x) the trigonometric inverse tangent function, operating on an argument x, with an output value in the range of −π÷2 to π÷2, inclusive, in units of radians $$A\tan2(y, x) = \begin{cases} A\tan\left(\frac{y}{x}\right); & x > 0 \\ A\tan\left(\frac{y}{x}\right) + \pi; & x < 0 \;\&\&\; y >= 0 \\ A\tan\left(\frac{y}{x}\right) - \pi; & x < 0 \;\&\&\; y < 0 \\ +\frac{\pi}{2}; & x == 0 \;\&\&\; y >= 0 \\ -\frac{\pi}{2}; & \text{otherwise} \end{cases}$$

Ceil(x) the smallest integer greater than or equal to x.

$Clip1_Y(x) = Clip3(0, (1 << BitDepth_Y) - 1, x)$ $Clip1_C(x) = Clip3(0, (1 << BitDepth_C) - 1, x)$ $$Clip3(x,\ y\ z) = \begin{cases} x; & z < x \\ y; & z > y \\ z; & \text{otherwise} \end{cases}$$

Cos(x) the trigonometric cosine function operating on an argument x in units of radians.

Floor(x) the largest integer less than or equal to x.

$$GetCurrMbs(a,\ b,\ c,\ d) = \begin{cases} c+d; & b-a >= d/2 \\ c-d; & a-b > d/2 \\ c; & \text{otherwise} \end{cases}$$

Ln(x) the natural logarithm of x (the base-e logarithm, where e is the natural logarithm base constant 2.718 281 828 . . . ).

Log 2(x) the base-2 logarithm of x.

Log 10(x) the base-10 logarithm of x.

$$\text{Min}(x,\ y) = \begin{cases} x; & x <= y \\ y; & x > y \end{cases}$$

$$\text{Max}(x,\ y) = \begin{cases} x; & x >= y \\ y; & x < y \end{cases}$$

Round(x)=Sign(x)*Floor(Abs(x)+0.5)

$$\text{Sign}(x) = \begin{cases} 1; & x > 0 \\ 0; & x == 0 \\ -1; & x < 0 \end{cases}$$

Sin(x) the trigonometric sine function operating on an argument x in units of radians Sqrt(x)=$\sqrt{x}$ Swap(x,y)=(y,x)

Tan(x) the trigonometric tangent function operating on an argument x in units of radians Order of Operation Precedence When an order of precedence in an expression is not indicated explicitly by use of parentheses, the following rules apply:

Operations of a higher precedence are evaluated before any operation of a lower precedence.

Operations of the same precedence are evaluated sequentially from left to right.

The table below specifies the precedence of operations from highest to lowest; a higher position in the table indicates a higher precedence.

For those operators that are also used in the C programming language, the order of precedence used in this Specification is the same as used in the C programming language.

TABLE

| Operation precedence from highest (at top of table) to lowest (at bottom of table) |
|---|
| operations (with operands x, y, and z) |
| "x++", "x− −" |
| "!x", "−x" (as a unary prefix operator) |
| $x^y$ |

TABLE-continued

| Operation precedence from highest (at top of table) to lowest (at bottom of table) |
|---|
| operations (with operands x, y, and z) |
| "x * y", "x / y", "x ÷ y", "$\frac{x}{y}$", "x % y" |
| "x + y", "x − y" (as a two-argument operator), |
| "$\sum_{i=x}^{y} f(i)$" |
| "x << y", "x >> y" |
| "x < y", "x <= y", "x > y", "x >= y" |
| "x == y", "x != y" |
| "x & y" |
| "x \| y" |
| "x && y" |
| "x \|\| y" |
| "x ? y : z" |
| "x . . . y" |
| "x = y", "x += y", "x −= y" |

Text Description of Logical Operations

In the text, a statement of logical operations as would be described mathematically in the following form:

```
if( condition 0 )
    statement 0
else if( condition 1 )
    statement 1
...
else /* informative remark on remaining condition */
    statement n
``` may be described in the following manner:

... as follows / ... the following applies:
- If condition 0, statement 0
- Otherwise, if condition 1, statement 1
- ...
- Otherwise (informative remark on remaining condition), statement n Each "If . . . . Otherwise, if . . . . Otherwise, . . . " statement in the text is introduced with " . . . as follows" or " . . . the following applies" immediately followed by "If . . . ". The last condition of the "If . . . . Otherwise, if . . . . Otherwise, . . . " is always an "Otherwise, . . . ". Interleaved "If . . . . Otherwise, if . . . . Otherwise, . . . " statements can be identified by matching " . . . as follows" or " . . . the following applies" with the ending "Otherwise, . . . ".

In the text, a statement of logical operations as would be described mathematically in the following form:

```
if( condition 0a && condition 0b )
    statement 0
else if( condition 1a || condition 1b )
    statement 1
...
else
    statement n
``` may be described in the following manner:

. . . as follows/ . . . the following applies:

If all of the following conditions are true, statement 0:

condition 0a condition 0b

Otherwise, if one or more of the following conditions are true, statement 1:
condition 1a
condition 1b
. . .
Otherwise, statement n In the text, a statement of logical operations as would be described mathematically in the following form:
if(condition 0)
statement 0
if(condition 1)
statement 1
may be described in the following manner:
When condition 0, statement 0
When condition 1, statement 1

Although embodiments have been primarily described based on video coding, it should be noted that embodiments of the coding system 10, encoder 20 and decoder 30 (and correspondingly the system 10) and the other embodiments described herein may also be configured for still picture processing or coding, i.e. the processing or coding of an individual picture independent of any preceding or consecutive picture as in video coding. In general only inter-prediction units 244 (encoder) and 344 (decoder) may not be available in case the picture processing coding is limited to a single picture 17. All other functionalities (also referred to as tools or technologies) of the video encoder 20 and video decoder 30 may equally be used for still picture processing, e.g. residual calculation 204/304, transform 206, quantization 208, inverse quantization 210/310, (inverse) transform 212/312, partitioning 262/362, intra-prediction 254/354, and/or loop filtering 220, 320, and entropy coding 270 and entropy decoding 304. In general, the embodiments of the present disclosure may be also applied to other source signals such as an audio signal or the like.

Embodiments, e.g. of the encoder 20 and the decoder 30, and functions described herein, e.g. with reference to the encoder 20 and the decoder 30, may be implemented in hardware, software, firmware, or any combination thereof. If implemented in software, the functions may be stored on a computer-readable medium or transmitted over communication media as one or more instructions or code and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limiting, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

What is claimed is:

1. A method for encoding a picture using a neural network (NN), wherein the NN comprises a plurality of layers comprising at least one downsampling layer that applies a downsampling operation, the method comprising:
   applying a rescaling to input representing a matrix having a size S in at least one dimension, wherein the rescaling comprises changing the size S in the at least one dimension to a rescaled size $\overline{S}=n \cdot r$, where $n \in \mathbb{N}$, $r>1$, and $r \in \mathbb{N}$, where r is a downsampling ratio;
   after the rescaling, processing the rescaled input by the downsampling layer and providing an output with a size $S_1 < S$; and
   providing, after processing the picture using the NN, a bitstream as output of the NN,
   wherein the NN comprises a further layer that applies a transformation operation that does not change the size in the at least one dimension,
   wherein the method further comprises:
   applying, in a processing order of the NN, the rescaling after processing by the further layer based on the rescaling resulting in an increase of the size in the at least one dimension, or applying, in a processing order of the NN, the rescaling before processing by the further layer based on the rescaling resulting in a decrease of the size in the at least one dimension.

2. The method according to claim 1, wherein the NN comprises a number of M∈N downsampling layers, wherein each downsampling layer m, m≤M, m∈N has an associated downsampling ratio $r_m > 1$, $r_m \in N$ and the method further comprises:

before processing an input representing a matrix having a size $S_m$ in at least one dimension with a downsampling layer m, applying, based on the size $S_m$ not being an integer multiple of the downsampling ratio $r_m$ of the downsampling layer m, a rescaling to the input, wherein the rescaling comprises changing the size $S_m$ in the at least one dimension so that $\overline{S_m} = n \cdot r_m$, $n \in N$; and before applying the rescaling to the input with the size $S_m$ a determination is made whether $S_m$ is an integer multiple of the downsampling ratio $r_m$ and, based on $S_m$ not being an integer multiple of the downsampling ratio $r_m$, the rescaling is applied to the input so that the size $S_m$ is changed in the at least one dimension so that $\overline{S_m} = n \cdot r_m$, $n \in N$.

3. The method according to claim 2, wherein the size $\overline{S_m}$ is determined using a function comprising at least one of ceil, int, floor.

4. The method according to claim 3, wherein:
the size $\overline{S_m}$ is determined using $$\text{floor}\left(\frac{S_m}{r_m}\right) \cdot r_m = \overline{S_m};$$

or
the size $\overline{S_m}$ is determined using $$\text{ceil}\left(\frac{S_m}{r_m}\right) \cdot r_m = \overline{S_m};$$

or
the size $\overline{S_m}$ is determined using $$\text{int}\left(\frac{S_m}{r_m}\right) \cdot r_m = \overline{S_m}.$$

5. The method according to claim 1, wherein the input to a downsampling layer m has a size $S_m$ in the at least one dimension that has a value that is between a closest smaller integer multiple of the downsampling ratio $r_m$ of the downsampling layer m and a closest larger integer multiple of the downsampling ratio $r_m$ of the downsampling layer m and wherein, depending on a condition, the size $S_m$ of the input is changed during the rescaling to either match the closest smaller integer multiple of the downsampling ratio $r_m$ or to match the closest larger integer multiple of the downsampling ratio $r_m$.

6. The method according to claim 5, wherein the input to a downsampling layer m has a size $S_m$ in the at least one dimension that has a value that is not an integer multiple of the downsampling ratio $r_m$ of the downsampling layer m, wherein the size $S_m$ of the input is changed during the rescaling to either match the closest smaller integer multiple of the downsampling ratio $r_m$ or to match the closest larger integer multiple of the downsampling ratio $r_m$.

7. The method according to claim 1, wherein, based on the size $S_m$ of the input being closer to a closest larger integer multiple of the downsampling ratio $r_m$ of the downsampling layer m than to a closest smaller integer multiple of the downsampling ratio $r_m$, the size $S_m$ of the input is increased to a size $\overline{S_m}$ that matches the closest larger integer multiple of the downsampling ratio $r_m$, wherein increasing the size $S_m$ of the input to the size $\overline{S_m}$ comprises padding the input with the size $S_m$ with zeros or with padding information obtained from the input with the size $S_m$.

8. The method according to claim 7, wherein the padding information obtained from the input with the size $S_m$ is applied as redundant padding information to increase the size $S_m$ of the input to the size $\overline{S_m}$, and wherein the padding with redundant padding information comprises at least one of reflection padding and repetition padding.

9. A method for decoding a bitstream representing a picture using a neural network (NN), wherein the NN comprises a plurality of layers comprising at least a first upsampling layer and a second upsampling layer that apply an upsampling to an input representing a matrix having a size T in at least one dimension, the method comprising:

processing the input by the first upsampling layer and providing an output of the first upsampling layer, wherein the output has a size $\overline{T_1} = T \cdot u_1$, $u_1 > 1$, $u_1 \in N$, wherein $u_1$ is the upsampling ratio of the first upsampling layer;

applying, before processing the output of the first upsampling layer by the second upsampling layer, a rescaling to the output of the first upsampling layer, wherein the rescaling comprises changing the size $\overline{T_1}$ of the output in the at least one dimension to a size $\hat{T}_1$ in the at least one dimension based on information obtained;

processing the rescaled output by the second upsampling layer and providing an output of the second upsampling layer, wherein the output has a size $\overline{T_2} = \hat{T}_1 \cdot u_2$, $u_2 > 1$, $u_2 \in N$ in the at least one dimension, wherein $u_2$ is the upsampling ratio of the second upsampling layer; and providing, after processing the bitstream using the NN, a decoded picture as output of the NN, wherein the NN comprises a further layer that applies a transformation operation that does not change the size in the at least one dimension, wherein the method further comprises:

applying, in a processing order of the NN, the rescaling after processing by the further layer based on the rescaling resulting in an increase of the size in the at least one dimension, or applying, in a processing order of the NN, the rescaling before processing by the further layer based on the rescaling resulting in a decrease of the size in the at least one dimension.

10. The method according to claim 9, wherein the upsampling layer comprises a transposed convolution or convolution layer.

11. The method according to claim 9, wherein the information comprises at least one of a target size of the decoded picture comprising at least one of a height H of the decoded picture and a width W of the decoded picture, the upsampling ratio $u_1$, the upsampling ratio $u_2$, a target output size $\overline{T_2}$ of the second upsampling layer, the size $\hat{T}_1$.

12. The method according to claim 9, wherein the information is obtained from at least one of: the bitstream, a second bitstream, information available at the decoder.

13. The method according to claim 9, wherein $$\hat{T}_1 = \left(\frac{T_{output}}{u^N}\right),$$

wherein $T_{output}$ is a target size of the output of the NN and u is an upsampling ratio.

14. The method according to claim 9, wherein the method further comprises determining whether $\overline{T}_1$ is larger than $\hat{T}_1$ or whether $\overline{T}_1$ is smaller than $\hat{T}_1$, wherein, based on $\overline{T}_1$ being larger than $\hat{T}_1$, the rescaling comprises applying a cropping to the output with the size $\overline{T}_1$ such that the size $\overline{T}_1$ is reduced to the size $\hat{T}_1$, and wherein, based on $\overline{T}_1$ being smaller than $\hat{T}_1$, the rescaling comprises applying a padding to the output with the size $\overline{T}_1$ such that the size $\overline{T}_1$ is increased to the size $\hat{T}_1$, wherein the padding comprises padding the output with the size $\overline{T}_1$ with zeros or with padding information obtained from the output with the size $\overline{T}_1$, wherein the padding information obtained from the output with the size $\overline{T}_1$ is applied as redundant padding information to increase the size $\overline{T}_1$ of the output to the size $\hat{T}_1$, and wherein the padding comprises reflection padding or repetition padding.

15. The method according to claim 1, wherein the further layer is or comprises a batch normalizer and/or a rectified linear unit (ReLU).

16. An encoder for encoding a picture, wherein the encoder comprises one or more processors for implementing a neural network (NN), wherein the one or more processors are adapted to perform the method according to claim 1.

17. A decoder for decoding a bitstream representing a picture, the decoder comprising:
one or more processors configured to implement a neural network (NN), wherein the one or more processors are adapted to perform the method according to claim 9.

18. The method according to claim 9, wherein the further layer is or comprises a batch normalizer and/or a rectified linear unit (ReLU).

* * * * *